(12) United States Patent
Suzuki

(10) Patent No.: US 10,302,830 B2
(45) Date of Patent: May 28, 2019

(54) WIRE GRID DEVICE

(71) Applicant: IBARAKI UNIVERSITY, Mito-shi, Ibaraki (JP)

(72) Inventor: Takehito Suzuki, Hitachi (JP)

(73) Assignee: IBARAKI UNIVERSITY, Mito-shi (JP)

( * ) Notice: Subject to any disclaimer, the term of this patent is extended or adjusted under 35 U.S.C. 154(b) by 181 days.

(21) Appl. No.: 15/502,077

(22) PCT Filed: Aug. 21, 2015

(86) PCT No.: PCT/JP2015/073570
§ 371 (c)(1),
(2) Date: Feb. 6, 2017

(87) PCT Pub. No.: WO2016/031725
PCT Pub. Date: Mar. 3, 2016

(65) Prior Publication Data
US 2017/0227697 A1    Aug. 10, 2017

(30) Foreign Application Priority Data

Aug. 25, 2014 (JP) ................................. 2014-170354
Aug. 19, 2015 (JP) ................................. 2015-162114

(51) Int. Cl.
*G02B 5/30* (2006.01)
*H01Q 15/00* (2006.01)
*H01Q 15/24* (2006.01)

(52) U.S. Cl.
CPC ............. *G02B 5/3058* (2013.01); *G02B 5/30* (2013.01); *H01Q 15/0013* (2013.01); *H01Q 15/24* (2013.01)

(58) Field of Classification Search
CPC ...... G02B 5/30; G02B 5/3025; G02B 5/3058; G02B 5/204; G02B 5/208; H01Q 15/00;

(Continued)

(56) References Cited

U.S. PATENT DOCUMENTS

| | | | | |
|---|---|---|---|---|
| 9,964,678 B2 * | 5/2018 | Suzuki | ................. | G02B 5/3058 |
| 2009/0136777 A1 * | 5/2009 | Fujii | .................... | G02B 5/3058 |
| | | | | 428/593 |
| 2015/0205079 A1 * | 7/2015 | Takayanagi | ........ | G01N 21/3581 |
| | | | | 250/338.1 |

FOREIGN PATENT DOCUMENTS

| | | |
|---|---|---|
| EP | 2 816 667 B1 | 5/2017 |
| GB | 683535 A | 12/1952 |

(Continued)

OTHER PUBLICATIONS

Jan. 11, 2018 Supplemental Search Report issued in European Patent Application No. 15 83 6997.

(Continued)

*Primary Examiner* — Derek S. Chapel
*Assistant Examiner* — Adam W Booher
(74) *Attorney, Agent, or Firm* — Oliff PLC

(57) ABSTRACT

A wire grid device having transmission power characteristics and a power extinction ratio in a terahertz wave band that cannot be achieved conventionally. A cutout is formed between one end and an opposite end of a rectangular metal thin plate to form a plurality of grid plates each having an elongated grid part between the one end and the opposite end. The grid plates are stacked in such a manner that the grid parts of the grid plates are spaced at a given interval and face each other, thereby forming a grid plate stack. In this case, spacers are inserted between one ends and between opposite ends of adjacent ones of the grid plates to form parallel flat plates configured by the grid parts. The grid plate stack forming the parallel flat plates operates as a polarizer for a terahertz wave band.

10 Claims, 80 Drawing Sheets

(58) Field of Classification Search
CPC ............... H01Q 15/24; G01N 21/3581; G01N 21/3586; G02F 2203/13
See application file for complete search history.

(56) References Cited

FOREIGN PATENT DOCUMENTS

| | | |
|---|---|---|
| JP | 2004-015408 A | 1/2004 |
| JP | 2009-223010 A | 10/2009 |
| JP | 5141320 B2 | 2/2013 |
| JP | 2014-074824 A | 4/2014 |
| WO | 97/22158 A1 | 6/1997 |
| WO | 2013/121686 A1 | 8/2013 |

OTHER PUBLICATIONS

Fujii et al., "Stopping effect of metal wire-grid on its thickness ranging through Thz region," Extended Abstracts (70th Scientific Meeting) of the Japan Society of Applied Physics, 8p-M-17, Sep. 8, 2009, vol. 3.
Nov. 17, 2015 International Search Report issued in International Patent Application No. PCT/JP2015/073570.
Nov. 17, 2015 Written Opinion of the International Searching Authoirty issued in International Patent Application No. PCT/JP2015/073570.

\* cited by examiner

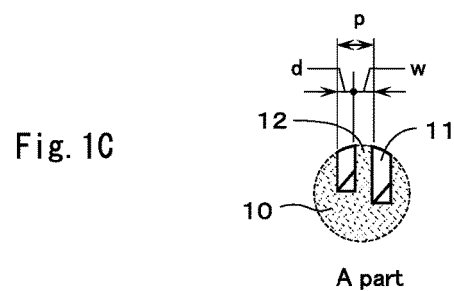
Fig. 1C
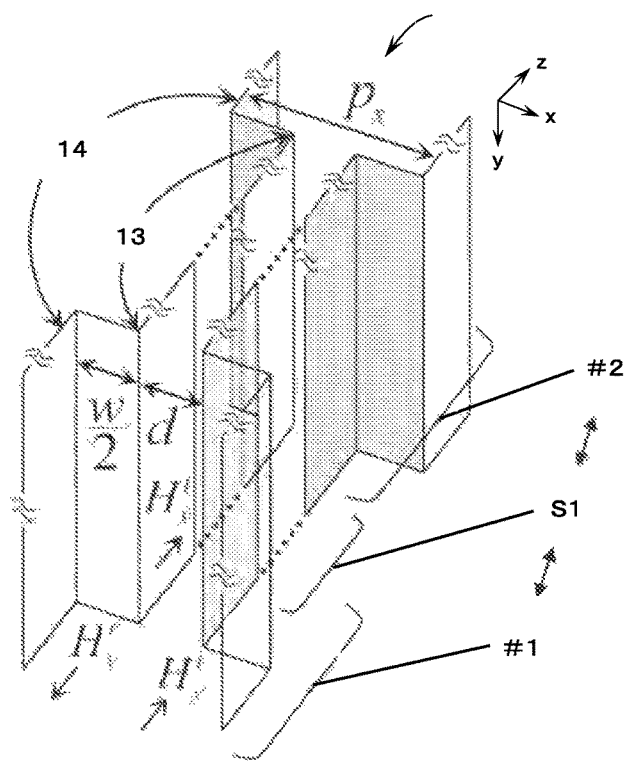
Fig. 2A
| $d$ | 50 μm | $a$ | 2.0 mm | $l$ | 18 mm |
Fig. 2B

| d2 | 50 μm | a2 | 2.0mm | t2 | 20 μm | L2 | 11mm |

Table Parameters of the wire-grid polarizer

| $a2\ (\mu m)$ | $d2\ (\mu m)$ | $p2\ (\mu m)$ | $t2\ (\mu m)$ | 0.1 THz | | 0.5 THz | | 1.0 THz | |
|---|---|---|---|---|---|---|---|---|---|
| | | | | TM Transmission power (%) | Power extinction ratio (dB) | TM Transmission power (%) | Power extinction ratio (dB) | TM Transmission power (%) | Power extinction ratio (dB) |
| 50 | 10 | 11 | 1 | 99.11 | <-100 | 99.32 | <-100 | 99.77 | <-100 |
| | | 15 | 5 | 85.35 | <-100 | 88.52 | <-100 | 95.93 | <-100 |
| | | 20 | 10 | 64.26 | <-100 | 70.53 | <-100 | 88.32 | <-100 |
| | | 50 | 40 | 14.95 | <-100 | 19.39 | <-100 | 47.13 | <-100 |
| | | 100 | 90 | 3.97 | <-100 | 5.49 | <-100 | 20.52 | <-100 |
| | | 300 | 290 | 0.45 | <-100 | 0.66 | <-100 | 0.03 | -99.2 |
| | 50 | 51 | 1 | 99.96 | -27.3 | 99.97 | -26.9 | 99.99 | -25.7 |
| | | 55 | 5 | 99.11 | -27.2 | 99.32 | -26.9 | 99.77 | -25.7 |
| | | 60 | 10 | 96.78 | -27.1 | 97.55 | -26.8 | 99.18 | -25.7 |
| | | 100 | 50 | 64.28 | -25.4 | 71.05 | -25.4 | 90.36 | -25.3 |
| | | 300 | 250 | 10.67 | -17.6 | 15.68 | -18.2 | 0.00 | 18.7 |
| | 100 | 101 | 1 | 99.99 | -13.6 | 99.99 | -12.9 | 100.00 | -10.2 |
| | | 105 | 5 | 99.76 | -13.6 | 99.82 | -12.9 | 99.94 | -10.2 |
| | | 110 | 10 | 99.11 | -13.6 | 99.32 | -12.8 | 99.77 | -10.2 |
| | | 300 | 200 | 36.29 | -9.2 | 44.22 | -9.4 | 0.00 | 33.1 |
| | 150 | 151 | 1 | 100.00 | -9.0 | 100.00 | -7.9 | 100.00 | 0.0 |
| | | 155 | 5 | 99.89 | -9.0 | 92.92 | -7.9 | 99.97 | 0.0 |
| | | 160 | 10 | 99.59 | -9.0 | 99.69 | -7.9 | 99.89 | 0.0 |
| | | 300 | 150 | 64.24 | -7.3 | 70.31 | -6.3 | 0.89 | 0.0 |

| $a2\ (\mu m)$ | $d2\ (\mu m)$ | $p2\ (\mu m)$ | $t2\ (\mu m)$ | 1.5 THz | | 2.0 THz | | 2.5 THz | |
|---|---|---|---|---|---|---|---|---|---|
| | | | | TM Transmission power (%) | Power extinction ratio (dB) | TM Transmission power (%) | Power extinction ratio (dB) | TM Transmission power (%) | Power extinction ratio (dB) |
| 50 | 10 | 11 | 1 | 100.00 | <-100 | 99.77 | <-100 | 99.32 | <-100 |
| | | 15 | 5 | 100.00 | <-100 | 95.63 | <-100 | 88.19 | <-100 |
| | | 20 | 10 | 99.96 | <-100 | 86.15 | <-100 | 68.86 | <-100 |
| | | 50 | 40 | 91.89 | <-100 | 29.35 | <-100 | 14.67 | <-100 |
| | | 100 | 90 | 49.51 | <-100 | 6.05 | <-100 | 2.61 | <-100 |
| | | 300 | 290 | 4.52 | <-100 | 0.02 | -97.6 | 0.27 | <-100 |
| | 50 | 51 | 1 | 100.00 | -23.6 | 99.99 | -20.3 | 99.97 | -15.1 |
| | | 55 | 5 | 100.00 | -23.6 | 99.77 | -20.3 | 99.30 | -15.0 |
| | | 60 | 10 | 100.00 | -23.6 | 99.08 | -20.3 | 97.31 | -14.9 |
| | | 100 | 50 | 98.52 | -23.6 | 71.64 | -18.9 | 42.80 | -11.4 |
| | | 300 | 250 | 9.08 | -13.2 | 0.01 | 22.2 | 2.86 | 0.4 |
| | 100 | 101 | 1 | 100.00 | 0.0 | 100.00 | 0.0 | 99.99 | 0.0 |
| | | 105 | 5 | 100.00 | 0.0 | 99.94 | 0.0 | 99.81 | 0.0 |
| | | 110 | 10 | 100.00 | 0.0 | 99.75 | 0.0 | 99.16 | 0.0 |
| | | 300 | 200 | 13.89 | 0.0 | 1.03 | 0.0 | 10.14 | 0.0 |
| | 150 | 151 | 1 | 100.00 | 0.0 | 99.80 | 0.0 | 99.28 | 0.0 |
| | | 155 | 5 | 100.00 | 0.0 | 98.52 | 0.0 | 99.36 | 0.0 |
| | | 160 | 10 | 100.00 | 0.0 | 95.72 | 0.0 | 98.26 | 0.0 |
| | | 300 | 150 | 21.77 | 0.0 | 26.68 | 0.0 | 26.77 | 0.0 |

Fig. 10

| $a2\ (\mu m)$ | $d2\ (\mu m)$ | $p2\ (\mu m)$ | $t2\ (\mu m)$ | 0.1 THz | | 0.5 THz | | 1.0 THz | |
|---|---|---|---|---|---|---|---|---|---|
| | | | | TM Transmission power (%) | Power extinction ratio (dB) | TM Transmission power (%) | Power extinction ratio (dB) | TM Transmission power (%) | Power extinction ratio (dB) |
| 1000 | 10 | 11 | 1 | 99.77 | <-100 | 99.78 | <-100 | 99.76 | <-100 |
| | | 15 | 5 | 95.81 | <-100 | 95.98 | <-100 | 95.55 | <-100 |
| | | 20 | 10 | 87.55 | <-100 | 88.25 | <-100 | 86.45 | <-100 |
| | | 50 | 40 | 40.28 | <-100 | 44.64 | <-100 | 34.28 | <-100 |
| | | 100 | 90 | 13.49 | <-100 | 17.22 | <-100 | 9.43 | <-100 |
| | | 300 | 290 | 1.63 | <-100 | 2.63 | <-100 | 0.02 | <-100 |
| | 50 | 51 | 1 | 99.99 | <-100 | 99.99 | <-100 | 99.99 | <-100 |
| | | 55 | 5 | 99.77 | <-100 | 99.78 | <-100 | 99.76 | <-100 |
| | | 60 | 10 | 99.16 | <-100 | 99.19 | <-100 | 99.10 | <-100 |
| | | 100 | 50 | 87.28 | <-100 | 89.38 | <-100 | 82.85 | <-100 |
| | | 300 | 250 | 28.85 | <-100 | 54.23 | <-100 | 0.00 | <-100 |
| | 100 | 101 | 1 | 100.00 | <-100 | 100.00 | <-100 | 100.00 | <-100 |
| | | 105 | 5 | 99.94 | <-100 | 99.94 | <-100 | 99.94 | <-100 |
| | | 110 | 10 | 99.77 | <-100 | 99.78 | <-100 | 99.76 | <-100 |
| | | 300 | 200 | 66.29 | <-100 | 82.32 | <-100 | 0.00 | <-100 |
| | 150 | 151 | 1 | 100.00 | <-100 | 100.00 | <-100 | 100.00 | 0.0 |
| | | 155 | 5 | 99.97 | <-100 | 99.97 | <-100 | 99.97 | 0.0 |
| | | 160 | 10 | 99.90 | <-100 | 99.90 | <-100 | 99.89 | 0.0 |
| | | 300 | 150 | 86.25 | <-100 | 91.76 | <-100 | 0.41 | 0.0 |

| $a2\ (\mu m)$ | $d2\ (\mu m)$ | $p2\ (\mu m)$ | $t2\ (\mu m)$ | 1.5 THz | | 2.0 THz | | 2.5 THz | |
|---|---|---|---|---|---|---|---|---|---|
| | | | | TM Transmission power (%) | Power extinction ratio (dB) | TM Transmission power (%) | Power extinction ratio (dB) | TM Transmission power (%) | Power extinction ratio (dB) |
| 1000 | 10 | 11 | 1 | 99.10 | <-100 | 99.79 | <-100 | 99.74 | <-100 |
| | | 15 | 5 | 85.18 | <-100 | 96.37 | <-100 | 95.09 | <-100 |
| | | 20 | 10 | 63.89 | <-100 | 89.39 | <-100 | 84.44 | <-100 |
| | | 50 | 40 | 14.48 | <-100 | 52.48 | <-100 | 24.96 | <-100 |
| | | 100 | 90 | 3.73 | <-100 | 40.78 | <-100 | 3.27 | <-100 |
| | | 300 | 290 | 0.36 | <-100 | 0.02 | <-100 | 0.43 | <-100 |
| | 50 | 51 | 1 | 99.96 | <-100 | 99.99 | <-100 | 99.99 | <-100 |
| | | 55 | 5 | 99.09 | <-100 | 99.79 | <-100 | 99.73 | <-100 |
| | | 60 | 10 | 96.68 | <-100 | 99.25 | <-100 | 98.94 | <-100 |
| | | 100 | 50 | 59.91 | <-100 | 94.06 | <-100 | 54.00 | <-100 |
| | | 300 | 250 | 4.59 | <-100 | 0.01 | <-100 | 3.08 | <-100 |
| | 100 | 101 | 1 | 99.99 | 0.0 | 100.00 | 0.0 | 100.00 | 0.0 |
| | | 105 | 5 | 99.76 | 0.0 | 99.95 | 0.0 | 99.93 | 0.0 |
| | | 110 | 10 | 99.06 | 0.0 | 99.79 | 0.0 | 99.66 | 0.0 |
| | | 300 | 200 | 12.43 | 0.0 | 1.72 | 0.0 | 10.03 | 0.0 |
| | 150 | 151 | 1 | 100.00 | 0.0 | 99.89 | 0.0 | 99.98 | 0.0 |
| | | 155 | 5 | 99.89 | 0.0 | 98.53 | 0.0 | 99.61 | 0.0 |
| | | 160 | 10 | 99.56 | 0.0 | 95.77 | 0.0 | 98.46 | 0.0 |
| | | 300 | 150 | 23.04 | 0.0 | 27.96 | 0.0 | 27.55 | 0.0 |

Fig. 11

| a2 (μm) | d2 (μm) | p2 (μm) | l2 (μm) | 0.1 THz | | 0.5 THz | | 1.0 THz | |
|---|---|---|---|---|---|---|---|---|---|
| | | | | TM Transmission power (%) | Power extinction ratio (dB) | TM Transmission power (%) | Power extinction ratio (dB) | TM Transmission power (%) | Power extinction ratio (dB) |
| 2000 | 10 | 11 | 1 | 99.77 | <-100 | 99.76 | <-100 | 99.79 | <-100 |
| | | 15 | 5 | 95.89 | <-100 | 95.60 | <-100 | 96.30 | <-100 |
| | | 20 | 10 | 87.84 | <-100 | 86.81 | <-100 | 89.33 | <-100 |
| | | 50 | 40 | 41.81 | <-100 | 37.05 | <-100 | 50.02 | <-100 |
| | | 100 | 90 | 14.67 | <-100 | 11.32 | <-100 | 22.79 | <-100 |
| | | 300 | 290 | 1.89 | <-100 | 1.20 | <-100 | 0.02 | <-100 |
| | 50 | 51 | 1 | 99.99 | <-100 | 99.99 | <-100 | 99.99 | <-100 |
| | | 55 | 5 | 99.78 | <-100 | 99.76 | <-100 | 99.79 | <-100 |
| | | 60 | 10 | 99.18 | <-100 | 99.11 | <-100 | 99.26 | <-100 |
| | | 70 | 20 | 97.19 | <-100 | 96.88 | <-100 | 97.55 | <-100 |
| | | 100 | 50 | 88.09 | <-100 | 85.24 | <-100 | 91.38 | <-100 |
| | | 300 | 250 | 35.47 | <-100 | 17.20 | <-100 | 0.00 | <-100 |
| | 100 | 101 | 1 | 100.00 | <-100 | 100.00 | <-100 | 100.00 | <-100 |
| | | 105 | 5 | 99.94 | <-100 | 99.94 | <-100 | 99.95 | <-100 |
| | | 110 | 10 | 99.78 | <-100 | 99.76 | <-100 | 99.79 | <-100 |
| | | 300 | 200 | 72.04 | <-100 | 49.44 | <-100 | 0.00 | <-100 |
| | 150 | 151 | 1 | 100.00 | <-100 | 100.00 | <-100 | 100.00 | 0.0 |
| | | 155 | 5 | 99.97 | <-100 | 99.97 | <-100 | 99.98 | 0.0 |
| | | 160 | 10 | 99.90 | <-100 | 99.89 | <-100 | 99.90 | 0.0 |
| | | 300 | 150 | 88.69 | <-100 | 78.40 | <-100 | 0.84 | 0.0 |

| a2 (μm) | d2 (μm) | p2 (μm) | l2 (μm) | 1.5 THz | | 2.0 THz | | 2.5 THz | |
|---|---|---|---|---|---|---|---|---|---|
| | | | | TM Transmission power (%) | Power extinction ratio (dB) | TM Transmission power (%) | Power extinction ratio (dB) | TM Transmission power (%) | Power extinction ratio (dB) |
| 2000 | 10 | 11 | 1 | 99.10 | <-100 | 99.73 | <-100 | 99.83 | <-100 |
| | | 15 | 5 | 85.20 | <-100 | 94.85 | <-100 | 96.94 | <-100 |
| | | 20 | 10 | 63.95 | <-100 | 84.08 | <-100 | 91.66 | <-100 |
| | | 50 | 40 | 14.35 | <-100 | 26.74 | <-100 | 68.04 | <-100 |
| | | 100 | 90 | 3.76 | <-100 | 5.51 | <-100 | 84.51 | <-100 |
| | | 300 | 290 | 0.36 | <-100 | 0.02 | <-100 | 3.88 | <-100 |
| | 50 | 51 | 1 | 99.96 | <-100 | 99.99 | <-100 | 99.99 | <-100 |
| | | 55 | 5 | 99.09 | <-100 | 99.72 | <-100 | 99.82 | <-100 |
| | | 60 | 10 | 96.68 | <-100 | 98.91 | <-100 | 99.36 | <-100 |
| | | 70 | 20 | 88.97 | <-100 | 95.64 | <-100 | 97.97 | <-100 |
| | | 100 | 50 | 60.09 | <-100 | 69.32 | <-100 | 96.43 | <-100 |
| | | 300 | 250 | 4.65 | <-100 | 0.01 | <-100 | 4.76 | <-100 |
| | 100 | 101 | 1 | 99.99 | 0.0 | 100.00 | 0.0 | 100.00 | 0.0 |
| | | 105 | 5 | 99.76 | 0.0 | 99.93 | 0.0 | 99.95 | 0.0 |
| | | 110 | 10 | 99.07 | 0.0 | 99.71 | 0.0 | 99.78 | 0.0 |
| | | 300 | 200 | 12.48 | 0.0 | 1.05 | 0.0 | 11.33 | 0.0 |
| | 150 | 151 | 1 | 100.00 | 0.0 | 99.89 | 0.0 | 99.98 | 0.0 |
| | | 155 | 5 | 99.89 | 0.0 | 98.51 | 0.0 | 99.62 | 0.0 |
| | | 160 | 10 | 99.57 | 0.0 | 95.70 | 0.0 | 98.52 | 0.0 |
| | | 300 | 150 | 23.07 | 0.0 | 26.60 | 0.0 | 30.38 | 0.0 |

Fig. 12

| a2 (μm) | d2 (μm) | p2 (μm) | t2 (μm) | 0.1 THz | | 0.5 THz | | 1.0 THz | |
|---|---|---|---|---|---|---|---|---|---|
| | | | | TM Transmission power (%) | Power extinction ratio (dB) | TM Transmission power (%) | Power extinction ratio (dB) | TM Transmission power (%) | Power extinction ratio (dB) |
| 300 | 10 | 11 | 1 | 99.10 | <-100 | 99.10 | <-100 | 99.10 | <-100 |
| | | 15 | 5 | 85.23 | <-100 | 85.23 | <-100 | 85.22 | <-100 |
| | | 20 | 10 | 64.00 | <-100 | 64.00 | <-100 | 64.01 | <-100 |
| | | 50 | 40 | 14.79 | <-100 | 14.78 | <-100 | 14.72 | <-100 |
| | | 100 | 90 | 3.92 | <-100 | 3.91 | <-100 | 3.87 | <-100 |
| | | 300 | 290 | 0.44 | <-100 | 0.44 | <-100 | 0.05 | <-100 |
| | 50 | 51 | 1 | 99.96 | <-100 | 99.96 | <-100 | 99.96 | <-100 |
| | | 55 | 5 | 99.10 | <-100 | 99.10 | <-100 | 99.10 | <-100 |
| | | 60 | 10 | 96.75 | <-100 | 96.74 | <-100 | 96.72 | <-100 |
| | | 100 | 50 | 63.92 | <-100 | 63.66 | <-100 | 62.52 | <-100 |
| | | 300 | 250 | 10.49 | <-100 | 9.59 | <-100 | 0.11 | <-100 |
| | 100 | 101 | 1 | 99.99 | <-100 | 99.99 | <-100 | 99.99 | <-100 |
| | | 105 | 5 | 99.76 | <-100 | 99.76 | <-100 | 99.76 | <-100 |
| | | 110 | 10 | 99.10 | <-100 | 99.09 | <-100 | 99.08 | <-100 |
| | | 300 | 200 | 35.86 | <-100 | 32.18 | <-100 | 0.13 | <-100 |
| | 150 | 151 | 1 | 100.00 | <-100 | 100.00 | <-100 | 100.00 | 0.0 |
| | | 155 | 5 | 99.89 | <-100 | 99.89 | <-100 | 99.89 | 0.0 |
| | | 160 | 10 | 99.58 | <-100 | 99.58 | <-100 | 99.58 | 0.0 |
| | | 300 | 150 | 63.86 | <-100 | 59.91 | <-100 | 3.45 | 0.0 |

| a2 (μm) | d2 (μm) | p2 (μm) | t2 (μm) | 1.5 THz | | 2.0 THz | | 2.5 THz | |
|---|---|---|---|---|---|---|---|---|---|
| | | | | TM Transmission power (%) | Power extinction ratio (dB) | TM Transmission power (%) | Power extinction ratio (dB) | TM Transmission power (%) | Power extinction ratio (dB) |
| 300 | 10 | 11 | 1 | 99.10 | <-100 | 99.10 | <-100 | 99.11 | <-100 |
| | | 15 | 5 | 85.24 | <-100 | 85.26 | <-100 | 85.29 | <-100 |
| | | 20 | 10 | 64.02 | <-100 | 64.04 | <-100 | 64.07 | <-100 |
| | | 50 | 40 | 14.63 | <-100 | 14.50 | <-100 | 14.31 | <-100 |
| | | 100 | 90 | 3.80 | <-100 | 3.67 | <-100 | 3.36 | <-100 |
| | | 300 | 290 | 0.36 | <-100 | 0.05 | <-100 | 0.31 | <-100 |
| | 50 | 51 | 1 | 99.96 | <-100 | 99.96 | <-100 | 99.96 | <-100 |
| | | 55 | 5 | 99.09 | <-100 | 99.09 | <-100 | 99.09 | <-100 |
| | | 60 | 10 | 96.69 | <-100 | 96.64 | <-100 | 96.58 | <-100 |
| | | 100 | 50 | 60.29 | <-100 | 56.12 | <-100 | 47.24 | <-100 |
| | | 300 | 250 | 4.71 | <-100 | 0.14 | <-100 | 3.39 | <-100 |
| | 100 | 101 | 1 | 99.99 | 0.0 | 99.99 | 0.0 | 99.99 | 0.0 |
| | | 105 | 5 | 99.76 | 0.0 | 99.76 | 0.0 | 99.75 | 0.0 |
| | | 110 | 10 | 99.07 | 0.0 | 99.04 | 0.0 | 98.93 | 0.0 |
| | | 300 | 200 | 12.54 | 0.0 | 3.90 | 0.0 | 11.02 | 0.0 |
| | 150 | 151 | 1 | 100.00 | 0.0 | 99.88 | 0.0 | 99.93 | 0.0 |
| | | 155 | 5 | 99.89 | 0.0 | 98.45 | 0.0 | 99.54 | 0.0 |
| | | 160 | 10 | 99.57 | 0.0 | 95.48 | 0.0 | 98.17 | 0.0 |
| | | 300 | 150 | 23.11 | 0.0 | 26.63 | 0.0 | 27.85 | 0.0 |

Fig. 13

| | | | | 3 THz | |
|---|---|---|---|---|---|
| a2 (μm) | d2 (μm) | p2 (μm) | t2 (μm) | TM Transmission power (%) | Power extinction ratio (dB) |
| 50 | 1 | 2 | 1 | 99.97 | <-100 |
| | | 6 | 5 | 97.23 | <-100 |
| | | 11 | 10 | 85.41 | <-100 |
| | | 21 | 20 | 56.51 | <-100 |
| | | 71 | 70 | 6.83 | <-100 |
| | | 300 | 299 | 0.03 | <-100 |
| | 5 | 6 | 1 | 100.00 | <-100 |
| | | 10 | 5 | 99.39 | <-100 |
| | | 15 | 10 | 95.32 | <-100 |
| | | 25 | 20 | 73.05 | <-100 |
| | | 85 | 80 | 3.85 | <-100 |
| | | 300 | 295 | 0.03 | <-100 |
| | 10 | 11 | 1 | 100.00 | <-100 |
| | | 15 | 5 | 99.72 | <-100 |
| | | 20 | 10 | 97.58 | <-100 |
| | | 30 | 20 | 82.89 | <-100 |
| | | 100 | 90 | 0.03 | -99.7 |
| | | 300 | 290 | 0.03 | -98.9 |
| | 23 | 24 | 1 | 100.00 | -52.8 |
| | | 28 | 5 | 99.89 | -52.8 |
| | | 33 | 10 | 99.00 | -52.8 |
| | | 43 | 20 | 91.01 | -52.4 |
| | | 93 | 70 | 5.16 | -39.9 |
| | | 300 | 277 | 0.04 | -18.7 |
| | 50 | 51 | 1 | 100.00 | 0.0 |
| | | 55 | 5 | 99.97 | 0.0 |
| | | 60 | 10 | 99.55 | 0.0 |
| | | 70 | 20 | 95.01 | 0.0 |
| | | 300 | 250 | 0.45 | 0.0 |
| | 100 | 101 | 1 | 99.78 | 0.0 |
| | | 105 | 5 | 97.21 | 0.0 |
| | | 110 | 10 | 92.04 | 0.0 |
| | | 300 | 200 | 11.98 | 0.0 |
| | 150 | 151 | 1 | 99.99 | 0.0 |
| | | 155 | 5 | 99.70 | 0.0 |
| | | 160 | 10 | 98.72 | 0.0 |
| | | 300 | 150 | 16.57 | 0.0 |

Fig. 14

| | | | | 4 THz | |
|---|---|---|---|---|---|
| a2(μm) | d2(μm) | p2(μm) | r2(μm) | TM Transmission power (%) | Power extinction ratio (dB) |
| 50 | 1 | 2 | 1 | 69.62 | <-100 |
| | | 6 | 5 | 12.59 | <-100 |
| | | 11 | 10 | 3.86 | <-100 |
| | | 21 | 20 | 1.07 | <-100 |
| | | 71 | 70 | 0.08 | <-100 |
| | | 300 | 299 | 0.01 | <-100 |
| | 5 | 6 | 1 | 97.41 | <-100 |
| | | 10 | 5 | 67.15 | <-100 |
| | | 15 | 10 | 37.52 | <-100 |
| | | 25 | 20 | 14.47 | <-100 |
| | | 85 | 80 | 1.14 | <-100 |
| | | 300 | 295 | 0.03 | <-100 |
| | 10 | 11 | 1 | 99.28 | <-100 |
| | | 15 | 5 | 86.52 | <-100 |
| | | 20 | 10 | 64.25 | <-100 |
| | | 30 | 20 | 33.45 | <-100 |
| | | 100 | 90 | 2.69 | <-100 |
| | | 300 | 290 | 0.02 | -95.0 |
| | 23 | 24 | 1 | 99.86 | -47.0 |
| | | 28 | 5 | 96.42 | -46.8 |
| | | 33 | 10 | 87.21 | -46.4 |
| | | 43 | 20 | 63.58 | -45.0 |
| | | 93 | 70 | 7.38 | -35.6 |
| | | 300 | 277 | 0.02 | -9.4 |
| | 50 | 51 | 1 | 99.97 | 0.0 |
| | | 55 | 5 | 99.10 | 0.0 |
| | | 60 | 10 | 95.93 | 0.0 |
| | | 70 | 20 | 82.54 | 0.0 |
| | | 300 | 250 | 2.89 | 0.0 |
| | 100 | 101 | 1 | 99.96 | 0.0 |
| | | 105 | 5 | 99.06 | 0.0 |
| | | 110 | 10 | 96.18 | 0.0 |
| | | 300 | 200 | 7.97 | 0.0 |
| | 150 | 151 | 1 | 99.87 | 0.0 |
| | | 155 | 5 | 98.08 | 0.0 |
| | | 160 | 10 | 93.97 | 0.0 |
| | | 300 | 150 | 25.73 | 0.0 |

Fig. 15

| | | | | 5 THz | |
|---|---|---|---|---|---|
| $a2(\mu m)$ | $d2(\mu m)$ | $p2(\mu m)$ | $t2(\mu m)$ | TM Transmission power (%) | Power extinction ratio (dB) |
| 50 | 1 | 2 | 1 | 71.25 | <-100 |
| | | 6 | 5 | 15.02 | <-100 |
| | | 11 | 10 | 5.00 | <-100 |
| | | 21 | 20 | 1.44 | <-100 |
| | | 71 | 70 | 0.12 | <-100 |
| | | 300 | 299 | 0.01 | <-100 |
| | 5 | 6 | 1 | 97.70 | <-100 |
| | | 10 | 5 | 74.85 | <-100 |
| | | 15 | 10 | 52.79 | <-100 |
| | | 25 | 20 | 32.30 | <-100 |
| | | 85 | 80 | 2.60 | <-100 |
| | | 300 | 295 | 0.13 | <-100 |
| | 10 | 11 | 1 | 99.37 | <-100 |
| | | 15 | 5 | 91.05 | <-100 |
| | | 20 | 10 | 80.17 | <-100 |
| | | 30 | 20 | 70.69 | <-100 |
| | | 100 | 90 | 7.85 | <-100 |
| | | 300 | 290 | 0.41 | <-100 |
| | 23 | 24 | 1 | 99.87 | -38.2 |
| | | 28 | 5 | 98.03 | -38.1 |
| | | 33 | 10 | 95.48 | -38.0 |
| | | 43 | 20 | 97.72 | -38.1 |
| | | 93 | 70 | 10.91 | -28.6 |
| | | 300 | 277 | 1.03 | -18.3 |
| | 50 | 51 | 1 | 99.97 | 0.0 |
| | | 55 | 5 | 99.62 | 0.0 |
| | | 60 | 10 | 95.73 | 0.0 |
| | | 70 | 20 | 44.59 | 0.0 |
| | | 300 | 250 | 2.87 | 0.0 |
| | 100 | 101 | 1 | 99.97 | 0.0 |
| | | 105 | 5 | 99.24 | 0.0 |
| | | 110 | 10 | 96.72 | 0.0 |
| | | 300 | 200 | 11.85 | 0.0 |
| | 150 | 151 | 1 | 99.97 | 0.0 |
| | | 155 | 5 | 99.29 | 0.0 |
| | | 160 | 10 | 96.85 | 0.0 |
| | | 300 | 150 | 27.07 | 0.0 |

Fig. 16

| | | | | 6 THz | |
|---|---|---|---|---|---|
| a2(μm) | d2(μm) | p2(μm) | r2(μm) | TM Transmission power (%) | Power extinction ratio (dB) |
| 50 | 1 | 2 | 1 | 99.89 | <-100 |
| | | 6 | 5 | 89.70 | <-100 |
| | | 11 | 10 | 58.88 | <-100 |
| | | 21 | 20 | 22.99 | <-100 |
| | | 71 | 70 | 3.29 | <-100 |
| | | 300 | 299 | 0.97 | <-100 |
| | 5 | 6 | 1 | 99.98 | <-100 |
| | | 10 | 5 | 97.53 | <-100 |
| | | 15 | 10 | 82.72 | <-100 |
| | | 25 | 20 | 36.36 | <-100 |
| | | 85 | 80 | 2.63 | <-100 |
| | | 300 | 295 | 0.99 | <-100 |
| | 10 | 11 | 1 | 100.00 | <-100 |
| | | 15 | 5 | 98.83 | <-100 |
| | | 20 | 10 | 89.98 | <-100 |
| | | 30 | 20 | 47.19 | <-100 |
| | | 100 | 90 | 0.04 | -91.5 |
| | | 300 | 290 | 1.03 | <-100 |
| | 23 | 24 | 1 | 100.00 | -23.4 |
| | | 28 | 5 | 99.51 | -23.4 |
| | | 33 | 10 | 94.73 | -23.1 |
| | | 43 | 20 | 49.73 | -20.3 |
| | | 93 | 70 | 9.03 | -12.9 |
| | | 300 | 277 | 1.28 | -4.5 |
| | 50 | 51 | 1 | 99.33 | 0.0 |
| | | 55 | 5 | 92.04 | 0.0 |
| | | 60 | 10 | 79.05 | 0.0 |
| | | 70 | 20 | 55.87 | 0.0 |
| | | 300 | 250 | 3.09 | 0.0 |
| | 100 | 101 | 1 | 99.75 | 0.0 |
| | | 105 | 5 | 96.31 | 0.0 |
| | | 110 | 10 | 88.73 | 0.0 |
| | | 300 | 200 | 12.32 | 0.0 |
| | 150 | 151 | 1 | 99.83 | 0.0 |
| | | 155 | 5 | 97.50 | 0.0 |
| | | 160 | 10 | 92.20 | 0.0 |
| | | 300 | 150 | 27.58 | 0.0 |

Fig. 17

| $a2(\mu m)$ | $d2(\mu m)$ | $p2(\mu m)$ | $t2(\mu m)$ | 7 THz | |
|---|---|---|---|---|---|
| | | | | TM Transmission power (%) | Power extinction ratio (dB) |
| 50 | 1 | 2 | 1 | 69.09 | <-100 |
| | | 6 | 5 | 11.97 | <-100 |
| | | 11 | 10 | 3.60 | <-100 |
| | | 21 | 20 | 0.98 | <-100 |
| | | 71 | 70 | 0.09 | <-100 |
| | | 300 | 299 | 0.01 | <-100 |
| | 5 | 6 | 1 | 97.32 | <-100 |
| | | 10 | 5 | 64.94 | <-100 |
| | | 15 | 10 | 34.37 | <-100 |
| | | 25 | 20 | 12.40 | <-100 |
| | | 85 | 80 | 1.38 | <-100 |
| | | 300 | 295 | 0.14 | <-100 |
| | 10 | 11 | 1 | 99.25 | <-100 |
| | | 15 | 5 | 85.01 | <-100 |
| | | 20 | 10 | 60.13 | <-100 |
| | | 30 | 20 | 29.01 | <-100 |
| | | 100 | 90 | 1.86 | <-100 |
| | | 300 | 290 | 0.44 | -97.5 |
| | 23 | 24 | 1 | 99.85 | 0.0 |
| | | 28 | 5 | 95.72 | 0.0 |
| | | 33 | 10 | 83.57 | 0.0 |
| | | 43 | 20 | 3.72 | 0.0 |
| | | 93 | 70 | 4.52 | 0.0 |
| | | 300 | 277 | 1.20 | 0.0 |
| | 50 | 51 | 1 | 99.82 | 0.0 |
| | | 55 | 5 | 95.76 | 0.0 |
| | | 60 | 10 | 84.69 | 0.0 |
| | | 70 | 20 | 58.09 | 0.0 |
| | | 300 | 250 | 3.33 | 0.0 |
| | 100 | 101 | 1 | 99.93 | 0.0 |
| | | 105 | 5 | 98.16 | 0.0 |
| | | 110 | 10 | 91.80 | 0.0 |
| | | 300 | 200 | 12.59 | 0.0 |
| | 150 | 151 | 1 | 99.94 | 0.0 |
| | | 155 | 5 | 98.50 | 0.0 |
| | | 160 | 10 | 94.06 | 0.0 |
| | | 300 | 150 | 27.78 | 0.0 |

Fig. 18

| a2(μm) | d2(μm) | p2(μm) | t2(μm) | 8 THz | |
|---|---|---|---|---|---|
| | | | | TM Transmission power (%) | Power extinction ratio (dB) |
| 50 | 1 | 2 | 1 | 71.82 | <-100 |
| | | 6 | 5 | 16.10 | <-100 |
| | | 11 | 10 | 5.60 | <-100 |
| | | 21 | 20 | 1.68 | <-100 |
| | | 71 | 70 | 0.15 | <-100 |
| | | 300 | 299 | 0.01 | <-100 |
| | 5 | 6 | 1 | 97.80 | <-100 |
| | | 10 | 5 | 77.98 | <-100 |
| | | 15 | 10 | 62.16 | <-100 |
| | | 25 | 20 | 64.45 | <-100 |
| | | 85 | 80 | 1.44 | <-100 |
| | | 300 | 295 | 0.14 | <-100 |
| | 10 | 11 | 1 | 99.40 | <-100 |
| | | 15 | 5 | 92.76 | <-100 |
| | | 20 | 10 | 88.51 | <-100 |
| | | 30 | 20 | 94.96 | <-100 |
| | | 100 | 90 | 3.13 | <-100 |
| | | 300 | 290 | 0.45 | -92.3 |
| | 23 | 24 | 1 | 99.88 | 0.0 |
| | | 28 | 5 | 98.70 | 0.0 |
| | | 33 | 10 | 99.71 | 0.0 |
| | | 43 | 20 | 15.35 | 0.0 |
| | | 93 | 70 | 6.27 | 0.0 |
| | | 300 | 277 | 1.24 | 0.0 |
| | 50 | 51 | 1 | 99.85 | 0.0 |
| | | 55 | 5 | 96.64 | 0.0 |
| | | 60 | 10 | 86.47 | 0.0 |
| | | 70 | 20 | 49.70 | 0.0 |
| | | 300 | 250 | 3.43 | 0.0 |
| | 100 | 101 | 1 | 99.94 | 0.0 |
| | | 105 | 5 | 98.31 | 0.0 |
| | | 110 | 10 | 85.71 | 0.0 |
| | | 300 | 200 | 12.74 | 0.0 |
| | 150 | 151 | 1 | 99.80 | 0.0 |
| | | 155 | 5 | 96.95 | 0.0 |
| | | 160 | 10 | 90.74 | 0.0 |
| | | 300 | 150 | 27.93 | 0.0 |

Fig. 19

| $a2(\mu m)$ | $d2(\mu m)$ | $p2(\mu m)$ | $t2(\mu m)$ | 9 THz ||
| | | | | TM Transmission power (%) | Power extinction ratio (dB) |
|---|---|---|---|---|---|
| 50 | 1 | 2 | 1 | 99.74 | <-100 |
| | | 6 | 5 | 79.27 | <-100 |
| | | 11 | 10 | 37.96 | <-100 |
| | | 21 | 20 | 9.98 | <-100 |
| | | 71 | 70 | 1.07 | <-100 |
| | | 300 | 299 | 1.12 | <-100 |
| | 5 | 6 | 1 | 99.96 | <-100 |
| | | 10 | 5 | 94.38 | <-100 |
| | | 15 | 10 | 65.53 | <-100 |
| | | 25 | 20 | 14.31 | <-100 |
| | | 85 | 80 | 1.75 | <-100 |
| | | 300 | 295 | 1.14 | <-100 |
| | 10 | 11 | 1 | 99.99 | <-100 |
| | | 15 | 5 | 97.16 | <-100 |
| | | 20 | 10 | 75.94 | <-100 |
| | | 30 | 20 | 12.13 | <-100 |
| | | 100 | 90 | 0.05 | -76.9 |
| | | 300 | 290 | 1.19 | -90.3 |
| | 23 | 24 | 1 | 100.00 | 0.0 |
| | | 28 | 5 | 98.34 | 0.0 |
| | | 33 | 10 | 59.42 | 0.0 |
| | | 43 | 20 | 21.61 | 0.0 |
| | | 93 | 70 | 7.10 | 0.0 |
| | | 300 | 277 | 1.46 | 0.0 |
| | 50 | 51 | 1 | 99.89 | 0.0 |
| | | 55 | 5 | 96.83 | 0.0 |
| | | 60 | 10 | 82.38 | 0.0 |
| | | 70 | 20 | 41.07 | 0.0 |
| | | 300 | 250 | 3.53 | 0.0 |
| | 100 | 101 | 1 | 99.66 | 0.0 |
| | | 105 | 5 | 95.10 | 0.0 |
| | | 110 | 10 | 85.71 | 0.0 |
| | | 300 | 200 | 12.88 | 0.0 |
| | 150 | 151 | 1 | 99.92 | 0.0 |
| | | 155 | 5 | 97.93 | 0.0 |
| | | 160 | 10 | 92.48 | 0.0 |
| | | 300 | 150 | 28.10 | 0.0 |

Fig. 20

| a2(μm) | d2(μm) | p2(μm) | t2(μm) | 10 THz | |
| --- | --- | --- | --- | --- | --- |
| | | | | TM Transmission power (%) | Power extinction ratio (dB) |
| 50 | 1 | 2 | 1 | 68.58 | <-100 |
| | | 6 | 5 | 11.42 | <-100 |
| | | 11 | 10 | 3.37 | <-100 |
| | | 21 | 20 | 0.89 | <-100 |
| | | 71 | 70 | 0.09 | <-100 |
| | | 300 | 299 | 0.01 | <-100 |
| | 5 | 6 | 1 | 97.22 | <-100 |
| | | 10 | 5 | 62.83 | <-100 |
| | | 15 | 10 | 31.74 | <-100 |
| | | 25 | 20 | 11.45 | <-100 |
| | | 85 | 80 | 0.91 | <-100 |
| | | 300 | 295 | 0.14 | <-100 |
| | 10 | 11 | 1 | 99.22 | <-100 |
| | | 15 | 5 | 83.40 | <-100 |
| | | 20 | 10 | 56.17 | -99.6 |
| | | 30 | 20 | 0.01 | -62.0 |
| | | 100 | 90 | 1.34 | -83.4 |
| | | 300 | 290 | 0.45 | -78.6 |
| | 23 | 24 | 1 | 99.84 | 0.0 |
| | | 28 | 5 | 94.28 | 0.0 |
| | | 33 | 10 | 39.01 | 0.0 |
| | | 43 | 20 | 24.62 | 0.0 |
| | | 93 | 70 | 5.42 | 0.0 |
| | | 300 | 277 | 1.26 | 0.0 |
| | 50 | 51 | 1 | 99.87 | 0.0 |
| | | 55 | 5 | 96.00 | 0.0 |
| | | 60 | 10 | 60.69 | 0.0 |
| | | 70 | 20 | 46.41 | 0.0 |
| | | 300 | 250 | 3.53 | 0.0 |
| | 100 | 101 | 1 | 99.85 | 0.0 |
| | | 105 | 5 | 96.41 | 0.0 |
| | | 110 | 10 | 87.46 | 0.0 |
| | | 300 | 200 | 12.89 | 0.0 |
| | 150 | 151 | 1 | 99.92 | 0.0 |
| | | 155 | 5 | 98.10 | 0.0 |
| | | 160 | 10 | 93.01 | 0.0 |
| | | 300 | 150 | 28.09 | 0.0 |

Fig. 21

|  |  |  |  | 3 THz ||
| $a2(\mu m)$ | $d2(\mu m)$ | $p2(\mu m)$ | $t2(\mu m)$ | TM Transmission power (%) | Power extinction ratio (dB) |
| --- | --- | --- | --- | --- | --- |
| 1000 | 1 | 2 | 1 | 99.78 | <-100 |
|  |  | 6 | 5 | 92.51 | <-100 |
|  |  | 11 | 10 | 71.60 | <-100 |
|  |  | 21 | 20 | 37.43 | <-100 |
|  |  | 71 | 70 | 3.71 | <-100 |
|  |  | 300 | 299 | 0.03 | <-100 |
|  | 5 | 6 | 1 | 99.98 | <-100 |
|  |  | 10 | 5 | 98.84 | <-100 |
|  |  | 15 | 10 | 93.01 | <-100 |
|  |  | 25 | 20 | 67.05 | <-100 |
|  |  | 85 | 80 | 3.44 | <-100 |
|  |  | 300 | 295 | 0.03 | <-100 |
|  | 10 | 11 | 1 | 99.99 | <-100 |
|  |  | 15 | 5 | 99.52 | <-100 |
|  |  | 20 | 10 | 96.62 | <-100 |
|  |  | 30 | 20 | 79.64 | <-100 |
|  |  | 100 | 90 | 0.03 | <-100 |
|  |  | 300 | 290 | 0.03 | <-100 |
|  | 23 | 24 | 1 | 100.00 | <-100 |
|  |  | 28 | 5 | 99.84 | <-100 |
|  |  | 33 | 10 | 98.69 | <-100 |
|  |  | 43 | 20 | 89.66 | <-100 |
|  |  | 93 | 70 | 5.20 | <-100 |
|  |  | 300 | 277 | 0.04 | <-100 |
|  | 50 | 51 | 1 | 100.00 | 0.0 |
|  |  | 55 | 5 | 99.95 | 0.0 |
|  |  | 60 | 10 | 99.45 | 0.0 |
|  |  | 70 | 20 | 94.47 | 0.0 |
|  |  | 300 | 250 | 0.48 | 0.0 |
|  | 100 | 101 | 1 | 99.78 | 0.0 |
|  |  | 105 | 5 | 97.20 | 0.0 |
|  |  | 110 | 10 | 92.03 | 0.0 |
|  |  | 300 | 200 | 11.98 | 0.0 |
|  | 150 | 151 | 1 | 99.99 | 0.0 |
|  |  | 155 | 5 | 99.70 | 0.0 |
|  |  | 160 | 10 | 98.71 | 0.0 |
|  |  | 300 | 150 | 16.61 | 0.0 |

Fig. 22

| | | | | 4 THz | |
|---|---|---|---|---|---|
| a2(μm) | d2(μm) | p2(μm) | t2(μm) | TM Transmission power (%) | Power extinction ratio (dB) |
| 1000 | 1 | 2 | 1 | 72.47 | <-100 |
| | | 6 | 5 | 15.69 | <-100 |
| | | 11 | 10 | 5.23 | <-100 |
| | | 21 | 20 | 1.50 | <-100 |
| | | 71 | 70 | 0.16 | <-100 |
| | | 300 | 299 | 0.01 | <-100 |
| | 5 | 6 | 1 | 97.83 | <-100 |
| | | 10 | 5 | 75.54 | <-100 |
| | | 15 | 10 | 52.96 | <-100 |
| | | 25 | 20 | 30.69 | <-100 |
| | | 85 | 80 | 1.96 | <-100 |
| | | 300 | 295 | 0.03 | <-100 |
| | 10 | 11 | 1 | 99.40 | <-100 |
| | | 15 | 5 | 91.28 | <-100 |
| | | 20 | 10 | 79.82 | <-100 |
| | | 30 | 20 | 65.86 | <-100 |
| | | 100 | 90 | 5.40 | <-100 |
| | | 300 | 290 | 0.02 | <-100 |
| | 23 | 24 | 1 | 99.88 | <-100 |
| | | 28 | 5 | 98.05 | <-100 |
| | | 33 | 10 | 95.08 | <-100 |
| | | 43 | 20 | 93.48 | <-100 |
| | | 93 | 70 | 7.60 | <-100 |
| | | 300 | 277 | 0.01 | <-100 |
| | 50 | 51 | 1 | 99.97 | 0.0 |
| | | 55 | 5 | 99.57 | 0.0 |
| | | 60 | 10 | 99.13 | 0.0 |
| | | 70 | 20 | 99.94 | 0.0 |
| | | 300 | 250 | 2.38 | 0.0 |
| | 100 | 101 | 1 | 99.96 | 0.0 |
| | | 105 | 5 | 99.14 | 0.0 |
| | | 110 | 10 | 96.67 | 0.0 |
| | | 300 | 200 | 7.82 | 0.0 |
| | 150 | 151 | 1 | 99.87 | 0.0 |
| | | 155 | 5 | 98.09 | 0.0 |
| | | 160 | 10 | 94.05 | 0.0 |
| | | 300 | 150 | 25.73 | 0.0 |

Fig. 23

| $a2(\mu m)$ | $d2(\mu m)$ | $p2(\mu m)$ | $r2(\mu m)$ | 5 THz ||
| --- | --- | --- | --- | --- | --- |
| | | | | TM Transmission power (%) | Power extinction ratio (dB) |
| 1000 | 1 | 2 | 1 | 68.05 | <-100 |
| | | 6 | 5 | 11.79 | <-100 |
| | | 11 | 10 | 3.59 | <-100 |
| | | 21 | 20 | 0.99 | <-100 |
| | | 71 | 70 | 0.09 | <-100 |
| | | 300 | 299 | 0.01 | <-100 |
| | 5 | 6 | 1 | 97.22 | <-100 |
| | | 10 | 5 | 65.42 | <-100 |
| | | 15 | 10 | 35.75 | <-100 |
| | | 25 | 20 | 13.61 | <-100 |
| | | 85 | 80 | 1.16 | <-100 |
| | | 300 | 295 | 0.13 | <-100 |
| | 10 | 11 | 1 | 99.23 | <-100 |
| | | 15 | 5 | 85.56 | <-100 |
| | | 20 | 10 | 62.43 | <-100 |
| | | 30 | 20 | 32.02 | <-100 |
| | | 100 | 90 | 2.73 | <-100 |
| | | 300 | 290 | 0.39 | <-100 |
| | 23 | 24 | 1 | 99.85 | <-100 |
| | | 28 | 5 | 96.11 | <-100 |
| | | 33 | 10 | 86.16 | <-100 |
| | | 43 | 20 | 61.99 | <-100 |
| | | 93 | 70 | 9.62 | <-100 |
| | | 300 | 277 | 1.02 | <-100 |
| | 50 | 51 | 1 | 99.97 | 0.0 |
| | | 55 | 5 | 98.96 | 0.0 |
| | | 60 | 10 | 90.74 | 0.0 |
| | | 70 | 20 | 45.61 | 0.0 |
| | | 300 | 250 | 2.87 | 0.0 |
| | 100 | 101 | 1 | 99.97 | 0.0 |
| | | 105 | 5 | 99.13 | 0.0 |
| | | 110 | 10 | 96.02 | 0.0 |
| | | 300 | 200 | 11.85 | 0.0 |
| | 150 | 151 | 1 | 99.97 | 0.0 |
| | | 155 | 5 | 99.25 | 0.0 |
| | | 160 | 10 | 96.61 | 0.0 |
| | | 300 | 150 | 27.07 | 0.0 |

Fig. 24

| a2(μm) | d2(μm) | p2(μm) | t2(μm) | TM Transmission power (%) | Power extinction ratio (dB) |
|---|---|---|---|---|---|
| | | | | 6 THz | |
| 1000 | 1 | 2 | 1 | 99.14 | <-100 |
| | | 6 | 5 | 75.55 | <-100 |
| | | 11 | 10 | 38.48 | <-100 |
| | | 21 | 20 | 12.46 | <-100 |
| | | 71 | 70 | 1.65 | <-100 |
| | | 300 | 299 | 0.38 | <-100 |
| | 5 | 6 | 1 | 99.93 | <-100 |
| | | 10 | 5 | 95.48 | <-100 |
| | | 15 | 10 | 76.20 | <-100 |
| | | 25 | 20 | 30.90 | <-100 |
| | | 85 | 80 | 2.26 | <-100 |
| | | 300 | 295 | 0.93 | <-100 |
| | 10 | 11 | 1 | 99.98 | <-100 |
| | | 15 | 5 | 98.05 | <-100 |
| | | 20 | 10 | 86.79 | <-100 |
| | | 30 | 20 | 43.25 | <-100 |
| | | 100 | 90 | 0.04 | <-100 |
| | | 300 | 290 | 1.01 | <-100 |
| | 23 | 24 | 1 | 100.00 | <-100 |
| | | 28 | 5 | 99.27 | <-100 |
| | | 33 | 10 | 93.54 | <-100 |
| | | 43 | 20 | 48.35 | <-100 |
| | | 93 | 70 | 8.90 | <-100 |
| | | 300 | 277 | 1.28 | <-100 |
| | 50 | 51 | 1 | 99.33 | 0.0 |
| | | 55 | 5 | 92.02 | 0.0 |
| | | 60 | 10 | 79.01 | 0.0 |
| | | 70 | 20 | 55.84 | 0.0 |
| | | 300 | 250 | 3.09 | 0.0 |
| | 100 | 101 | 1 | 99.75 | 0.0 |
| | | 105 | 5 | 96.31 | 0.0 |
| | | 110 | 10 | 88.72 | 0.0 |
| | | 300 | 200 | 12.32 | 0.0 |
| | 150 | 151 | 1 | 99.83 | 0.0 |
| | | 155 | 5 | 97.50 | 0.0 |
| | | 160 | 10 | 92.20 | 0.0 |
| | | 300 | 150 | 27.58 | 0.0 |

Fig. 25

| | | | | 7 THz | |
|---|---|---|---|---|---|
| $a2(\mu m)$ | $d2(\mu m)$ | $p2(\mu m)$ | $t2(\mu m)$ | TM Transmission power (%) | Power extinction ratio (dB) |
| 1000 | 1 | 2 | 1 | 74.26 | <-100 |
| | | 6 | 5 | 17.93 | <-100 |
| | | 11 | 10 | 6.33 | <-100 |
| | | 21 | 20 | 1.90 | <-100 |
| | | 71 | 70 | 0.15 | <-100 |
| | | 300 | 299 | 0.01 | <-100 |
| | 5 | 6 | 1 | 98.05 | <-100 |
| | | 10 | 5 | 80.23 | <-100 |
| | | 15 | 10 | 65.01 | <-100 |
| | | 25 | 20 | 60.83 | <-100 |
| | | 85 | 80 | 0.73 | <-100 |
| | | 300 | 295 | 0.15 | <-100 |
| | 10 | 11 | 1 | 99.47 | <-100 |
| | | 15 | 5 | 93.63 | <-100 |
| | | 20 | 10 | 89.32 | <-100 |
| | | 30 | 20 | 99.80 | <-100 |
| | | 100 | 90 | 2.39 | <-100 |
| | | 300 | 290 | 0.47 | <-100 |
| | 23 | 24 | 1 | 99.89 | 0.0 |
| | | 28 | 5 | 98.82 | 0.0 |
| | | 33 | 10 | 99.09 | 0.0 |
| | | 43 | 20 | 1.43 | 0.0 |
| | | 93 | 70 | 4.39 | 0.0 |
| | | 300 | 277 | 1.22 | 0.0 |
| | 50 | 51 | 1 | 99.83 | 0.0 |
| | | 55 | 5 | 96.18 | 0.0 |
| | | 60 | 10 | 86.21 | 0.0 |
| | | 70 | 20 | 59.05 | 0.0 |
| | | 300 | 250 | 3.33 | 0.0 |
| | 100 | 101 | 1 | 99.93 | 0.0 |
| | | 105 | 5 | 98.26 | 0.0 |
| | | 110 | 10 | 92.28 | 0.0 |
| | | 300 | 200 | 12.60 | 0.0 |
| | 150 | 151 | 1 | 99.94 | 0.0 |
| | | 155 | 5 | 98.52 | 0.0 |
| | | 160 | 10 | 94.19 | 0.0 |
| | | 300 | 150 | 27.78 | 0.0 |

Fig. 26

| $a2(\mu m)$ | $d2(\mu m)$ | $p2(\mu m)$ | $t2(\mu m)$ | 8 THz | |
|---|---|---|---|---|---|
| | | | | TM Transmission power (%) | Power extinction ratio (dB) |
| 1000 | 1 | 2 | 1 | 66.91 | <-100 |
| | | 6 | 5 | 11.08 | <-100 |
| | | 11 | 10 | 3.33 | <-100 |
| | | 21 | 20 | 0.90 | <-100 |
| | | 71 | 70 | 0.08 | <-100 |
| | | 300 | 299 | 0.01 | <-100 |
| | 5 | 6 | 1 | 97.05 | <-100 |
| | | 10 | 5 | 63.29 | <-100 |
| | | 15 | 10 | 33.40 | <-100 |
| | | 25 | 20 | 12.61 | <-100 |
| | | 85 | 80 | 0.94 | <-100 |
| | | 300 | 295 | 0.12 | <-100 |
| | 10 | 11 | 1 | 99.18 | <-100 |
| | | 15 | 5 | 84.15 | <-100 |
| | | 20 | 10 | 59.48 | <-100 |
| | | 30 | 20 | 32.34 | <-100 |
| | | 100 | 90 | 2.10 | <-100 |
| | | 300 | 290 | 0.41 | <-100 |
| | 23 | 24 | 1 | 99.84 | 0.0 |
| | | 28 | 5 | 95.43 | 0.0 |
| | | 33 | 10 | 83.18 | 0.0 |
| | | 43 | 20 | 16.22 | 0.0 |
| | | 93 | 70 | 6.27 | 0.0 |
| | | 300 | 277 | 1.21 | 0.0 |
| | 50 | 51 | 1 | 99.85 | 0.0 |
| | | 55 | 5 | 96.17 | 0.0 |
| | | 60 | 10 | 84.79 | 0.0 |
| | | 70 | 20 | 50.57 | 0.0 |
| | | 300 | 250 | 3.42 | 0.0 |
| | 100 | 101 | 1 | 99.94 | 0.0 |
| | | 105 | 5 | 98.16 | 0.0 |
| | | 110 | 10 | 85.61 | 0.0 |
| | | 300 | 200 | 12.73 | 0.0 |
| | 150 | 151 | 1 | 99.80 | 0.0 |
| | | 155 | 5 | 96.94 | 0.0 |
| | | 160 | 10 | 90.74 | 0.0 |
| | | 300 | 150 | 27.92 | 0.0 |

Fig. 27

| | | | | 9 THz | |
|---|---|---|---|---|---|
| $a2(\mu m)$ | $d2(\mu m)$ | $p2(\mu m)$ | $t2(\mu m)$ | TM Transmission power (%) | Power extinction ratio (dB) |
| 1000 | 1 | 2 | 1 | 98.09 | <-100 |
| | | 6 | 5 | 57.91 | <-100 |
| | | 11 | 10 | 21.52 | <-100 |
| | | 21 | 20 | 5.36 | <-100 |
| | | 71 | 70 | 0.72 | <-100 |
| | | 300 | 299 | 0.23 | <-100 |
| | 5 | 6 | 1 | 99.83 | <-100 |
| | | 10 | 5 | 90.19 | <-100 |
| | | 15 | 10 | 57.01 | <-100 |
| | | 25 | 20 | 12.52 | <-100 |
| | | 85 | 80 | 1.55 | <-100 |
| | | 300 | 295 | 0.99 | <-100 |
| | 10 | 11 | 1 | 99.95 | <-100 |
| | | 15 | 5 | 95.46 | <-100 |
| | | 20 | 10 | 71.04 | <-100 |
| | | 30 | 20 | 12.18 | <-100 |
| | | 100 | 90 | 0.06 | <-100 |
| | | 300 | 290 | 1.15 | <-100 |
| | 23 | 24 | 1 | 99.99 | 0.0 |
| | | 28 | 5 | 97.76 | 0.0 |
| | | 33 | 10 | 58.88 | 0.0 |
| | | 43 | 20 | 21.68 | 0.0 |
| | | 93 | 70 | 7.09 | 0.0 |
| | | 300 | 277 | 1.46 | 0.0 |
| | 50 | 51 | 1 | 99.89 | 0.0 |
| | | 55 | 5 | 96.75 | 0.0 |
| | | 60 | 10 | 82.14 | 0.0 |
| | | 70 | 20 | 41.10 | 0.0 |
| | | 300 | 250 | 3.52 | 0.0 |
| | 100 | 101 | 1 | 99.66 | 0.0 |
| | | 105 | 5 | 95.10 | 0.0 |
| | | 110 | 10 | 85.70 | 0.0 |
| | | 300 | 200 | 12.88 | 0.0 |
| | 150 | 151 | 1 | 99.92 | 0.0 |
| | | 155 | 5 | 97.93 | 0.0 |
| | | 160 | 10 | 92.48 | 0.0 |
| | | 300 | 150 | 28.10 | 0.0 |

Fig. 28

| | | | | 10 THz | |
|---|---|---|---|---|---|
| $a2(\mu m)$ | $d2(\mu m)$ | $p2(\mu m)$ | $t2(\mu m)$ | TM Transmission power (%) | Power extinction ratio (dB) |
| 1000 | 1 | 2 | 1 | 76.19 | <-100 |
| | | 6 | 5 | 20.99 | <-100 |
| | | 11 | 10 | 8.10 | <-100 |
| | | 21 | 20 | 2.78 | <-100 |
| | | 71 | 70 | 0.15 | <-100 |
| | | 300 | 299 | 0.01 | <-100 |
| | 5 | 6 | 1 | 98.29 | <-100 |
| | | 10 | 5 | 85.54 | <-100 |
| | | 15 | 10 | 82.64 | <-100 |
| | | 25 | 20 | 60.58 | <-100 |
| | | 85 | 80 | 2.95 | <-100 |
| | | 300 | 295 | 0.16 | <-100 |
| | 10 | 11 | 1 | 99.54 | <-100 |
| | | 15 | 5 | 96.12 | <-100 |
| | | 20 | 10 | 99.03 | <-100 |
| | | 30 | 20 | 0.01 | <-100 |
| | | 100 | 90 | 1.41 | <-100 |
| | | 300 | 290 | 0.51 | <-100 |
| | 23 | 24 | 1 | 99.91 | 0.0 |
| | | 28 | 5 | 99.83 | 0.0 |
| | | 33 | 10 | 36.42 | 0.0 |
| | | 43 | 20 | 24.38 | 0.0 |
| | | 93 | 70 | 5.32 | 0.0 |
| | | 300 | 277 | 1.30 | 0.0 |
| | 50 | 51 | 1 | 99.88 | 0.0 |
| | | 55 | 5 | 96.80 | 0.0 |
| | | 60 | 10 | 57.46 | 0.0 |
| | | 70 | 20 | 46.32 | 0.0 |
| | | 300 | 250 | 3.54 | 0.0 |
| | 100 | 101 | 1 | 99.86 | 0.0 |
| | | 105 | 5 | 96.48 | 0.0 |
| | | 110 | 10 | 87.61 | 0.0 |
| | | 300 | 200 | 12.90 | 0.0 |
| | 150 | 151 | 1 | 99.93 | 0.0 |
| | | 155 | 5 | 98.11 | 0.0 |
| | | 160 | 10 | 93.02 | 0.0 |
| | | 300 | 150 | 28.11 | 0.0 |

Fig. 29

| $a2(\mu m)$ | $d2(\mu m)$ | $p2(\mu m)$ | $t2(\mu m)$ | 3 THz ||
|---|---|---|---|---|---|
| | | | | TM Transmission power (%) | Power extinction ratio (dB) |
| 2000 | 1 | 2 | 1 | 99.39 | <-100 |
| | | 6 | 5 | 85.84 | <-100 |
| | | 11 | 10 | 57.68 | <-100 |
| | | 21 | 20 | 25.09 | <-100 |
| | | 71 | 70 | 2.26 | <-100 |
| | | 300 | 299 | 0.03 | <-100 |
| | 5 | 6 | 1 | 99.95 | <-100 |
| | | 10 | 5 | 98.10 | <-100 |
| | | 15 | 10 | 90.23 | <-100 |
| | | 25 | 20 | 61.08 | <-100 |
| | | 85 | 80 | 3.08 | <-100 |
| | | 300 | 295 | 0.03 | <-100 |
| | 10 | 11 | 1 | 99.99 | <-100 |
| | | 15 | 5 | 99.25 | <-100 |
| | | 20 | 10 | 95.48 | <-100 |
| | | 30 | 20 | 76.20 | <-100 |
| | | 100 | 90 | 0.03 | <-100 |
| | | 300 | 290 | 0.03 | <-100 |
| | 23 | 24 | 1 | 100.00 | <-100 |
| | | 28 | 5 | 99.77 | <-100 |
| | | 33 | 10 | 98.33 | <-100 |
| | | 43 | 20 | 88.21 | <-100 |
| | | 93 | 70 | 5.26 | <-100 |
| | | 300 | 277 | 0.04 | <-100 |
| | 50 | 51 | 1 | 100.00 | 0.0 |
| | | 55 | 5 | 99.94 | 0.0 |
| | | 60 | 10 | 99.34 | 0.0 |
| | | 70 | 20 | 93.90 | 0.0 |
| | | 300 | 250 | 0.51 | 0.0 |
| | 100 | 101 | 1 | 99.78 | 0.0 |
| | | 105 | 5 | 97.20 | 0.0 |
| | | 110 | 10 | 92.02 | 0.0 |
| | | 300 | 200 | 11.98 | 0.0 |
| | 150 | 151 | 1 | 99.99 | 0.0 |
| | | 155 | 5 | 99.70 | 0.0 |
| | | 160 | 10 | 98.70 | 0.0 |
| | | 300 | 150 | 16.65 | 0.0 |

Fig. 30

| | | | | 4 THz | |
|---|---|---|---|---|---|
| $a2(\mu m)$ | $d2(\mu m)$ | $p2(\mu m)$ | $t2(\mu m)$ | TM Transmission power (%) | Power extinction ratio (dB) |
| 2000 | 1 | 2 | 1 | 67.41 | <-100 |
| | | 6 | 5 | 11.63 | <-100 |
| | | 11 | 10 | 3.56 | <-100 |
| | | 21 | 20 | 0.98 | <-100 |
| | | 71 | 70 | 0.08 | <-100 |
| | | 300 | 299 | 0.00 | <-100 |
| | 5 | 6 | 1 | 97.15 | <-100 |
| | | 10 | 5 | 65.48 | <-100 |
| | | 15 | 10 | 36.24 | <-100 |
| | | 25 | 20 | 14.12 | <-100 |
| | | 85 | 80 | 1.12 | <-100 |
| | | 300 | 295 | 0.03 | <-100 |
| | 10 | 11 | 1 | 99.21 | <-100 |
| | | 15 | 5 | 85.71 | <-100 |
| | | 20 | 10 | 63.29 | <-100 |
| | | 30 | 20 | 33.40 | <-100 |
| | | 100 | 90 | 2.73 | <-100 |
| | | 300 | 290 | 0.02 | <-100 |
| | 23 | 24 | 1 | 99.84 | <-100 |
| | | 28 | 5 | 96.22 | <-100 |
| | | 33 | 10 | 86.96 | <-100 |
| | | 43 | 20 | 64.45 | <-100 |
| | | 93 | 70 | 7.41 | <-100 |
| | | 300 | 277 | 0.02 | <-100 |
| | 50 | 51 | 1 | 99.97 | 0.0 |
| | | 55 | 5 | 99.06 | 0.0 |
| | | 60 | 10 | 95.97 | 0.0 |
| | | 70 | 20 | 84.48 | 0.0 |
| | | 300 | 250 | 2.95 | 0.0 |
| | 100 | 101 | 1 | 99.96 | 0.0 |
| | | 105 | 5 | 99.05 | 0.0 |
| | | 110 | 10 | 96.17 | 0.0 |
| | | 300 | 200 | 7.94 | 0.0 |
| | 150 | 151 | 1 | 99.87 | 0.0 |
| | | 155 | 5 | 98.07 | 0.0 |
| | | 160 | 10 | 93.97 | 0.0 |
| | | 300 | 150 | 25.73 | 0.0 |

Fig. 31

|  |  |  |  | 5 THz | |
|---|---|---|---|---|---|
| $a2(\mu m)$ | $d2(\mu m)$ | $p2(\mu m)$ | $t2(\mu m)$ | TM Transmission power (%) | Power extinction ratio (dB) |
| 2000 | 1 | 2 | 1 | 75.15 | <-100 |
|  |  | 6 | 5 | 18.12 | <-100 |
|  |  | 11 | 10 | 6.27 | <-100 |
|  |  | 21 | 20 | 1.83 | <-100 |
|  |  | 71 | 70 | 0.14 | <-100 |
|  |  | 300 | 299 | 0.01 | <-100 |
|  | 5 | 6 | 1 | 98.12 | <-100 |
|  |  | 10 | 5 | 79.48 | <-100 |
|  |  | 15 | 10 | 60.75 | <-100 |
|  |  | 25 | 20 | 42.87 | <-100 |
|  |  | 85 | 80 | 3.36 | <-100 |
|  |  | 300 | 295 | 0.16 | <-100 |
|  | 10 | 11 | 1 | 99.49 | <-100 |
|  |  | 15 | 5 | 93.11 | <-100 |
|  |  | 20 | 10 | 85.54 | <-100 |
|  |  | 30 | 20 | 82.64 | <-100 |
|  |  | 100 | 90 | 8.56 | <-100 |
|  |  | 300 | 290 | 0.45 | <-100 |
|  | 23 | 24 | 1 | 99.90 | <-100 |
|  |  | 28 | 5 | 98.57 | <-100 |
|  |  | 33 | 10 | 97.20 | <-100 |
|  |  | 43 | 20 | 99.86 | <-100 |
|  |  | 93 | 70 | 10.95 | <-100 |
|  |  | 300 | 277 | 1.04 | <-100 |
|  | 50 | 51 | 1 | 99.98 | 0.0 |
|  |  | 55 | 5 | 99.75 | 0.0 |
|  |  | 60 | 10 | 95.39 | 0.0 |
|  |  | 70 | 20 | 44.40 | 0.0 |
|  |  | 300 | 250 | 2.87 | 0.0 |
|  | 100 | 101 | 1 | 99.97 | 0.0 |
|  |  | 105 | 5 | 99.27 | 0.0 |
|  |  | 110 | 10 | 96.80 | 0.0 |
|  |  | 300 | 200 | 11.86 | 0.0 |
|  | 150 | 151 | 1 | 99.97 | 0.0 |
|  |  | 155 | 5 | 99.30 | 0.0 |
|  |  | 160 | 10 | 96.88 | 0.0 |
|  |  | 300 | 150 | 27.07 | 0.0 |

Fig. 32

| $a2(\mu m)$ | $d2(\mu m)$ | $p2(\mu m)$ | $t2(\mu m)$ | 6 THz ||
| --- | --- | --- | --- | --- | --- |
| | | | | TM Transmission power (%) | Power extinction ratio (dB) |
| 2000 | 1 | 2 | 1 | 97.64 | <-100 |
| | | 6 | 5 | 60.54 | <-100 |
| | | 11 | 10 | 25.55 | <-100 |
| | | 21 | 20 | 7.56 | <-100 |
| | | 71 | 70 | 0.93 | <-100 |
| | | 300 | 299 | 0.14 | <-100 |
| | 5 | 6 | 1 | 99.82 | <-100 |
| | | 10 | 5 | 92.83 | <-100 |
| | | 15 | 10 | 69.52 | <-100 |
| | | 25 | 20 | 26.47 | <-100 |
| | | 85 | 80 | 1.96 | <-100 |
| | | 300 | 295 | 0.80 | <-100 |
| | 10 | 11 | 1 | 99.95 | <-100 |
| | | 15 | 5 | 97.05 | <-100 |
| | | 20 | 10 | 83.37 | <-100 |
| | | 30 | 20 | 39.79 | <-100 |
| | | 100 | 90 | 0.04 | <-100 |
| | | 300 | 290 | 0.98 | <-100 |
| | 23 | 24 | 1 | 99.99 | <-100 |
| | | 28 | 5 | 98.99 | <-100 |
| | | 33 | 10 | 92.27 | <-100 |
| | | 43 | 20 | 47.28 | <-100 |
| | | 93 | 70 | 8.79 | <-100 |
| | | 300 | 277 | 1.28 | <-100 |
| | 50 | 51 | 1 | 99.33 | 0.0 |
| | | 55 | 5 | 92.00 | 0.0 |
| | | 60 | 10 | 78.96 | 0.0 |
| | | 70 | 20 | 55.81 | 0.0 |
| | | 300 | 250 | 3.09 | 0.0 |
| | 100 | 101 | 1 | 99.75 | 0.0 |
| | | 105 | 5 | 96.30 | 0.0 |
| | | 110 | 10 | 88.70 | 0.0 |
| | | 300 | 200 | 12.32 | 0.0 |
| | 150 | 151 | 1 | 99.83 | 0.0 |
| | | 155 | 5 | 97.50 | 0.0 |
| | | 160 | 10 | 92.20 | 0.0 |
| | | 300 | 150 | 27.58 | 0.0 |

Fig. 33

| | | | | 7 THz | |
|---|---|---|---|---|---|
| a2(μm) | d2(μm) | p2(μm) | r2(μm) | TM Transmission power (%) | Power extinction ratio (dB) |
| 2000 | 1 | 2 | 1 | 65.78 | <-100 |
| | | 6 | 5 | 10.81 | <-100 |
| | | 11 | 10 | 3.28 | <-100 |
| | | 21 | 20 | 0.90 | <-100 |
| | | 71 | 70 | 0.08 | <-100 |
| | | 300 | 299 | 0.00 | <-100 |
| | 5 | 6 | 1 | 96.93 | <-100 |
| | | 10 | 5 | 63.32 | <-100 |
| | | 15 | 10 | 34.12 | <-100 |
| | | 25 | 20 | 13.37 | <-100 |
| | | 85 | 80 | 3.05 | <-100 |
| | | 300 | 295 | 0.12 | <-100 |
| | 10 | 11 | 1 | 99.15 | <-100 |
| | | 15 | 5 | 84.39 | <-100 |
| | | 20 | 10 | 60.93 | <-100 |
| | | 30 | 20 | 33.50 | <-100 |
| | | 100 | 90 | 1.91 | <-100 |
| | | 300 | 290 | 0.39 | <-100 |
| | 23 | 24 | 1 | 99.83 | 0.0 |
| | | 28 | 5 | 95.70 | 0.0 |
| | | 33 | 10 | 85.20 | 0.0 |
| | | 43 | 20 | 2.70 | 0.0 |
| | | 93 | 70 | 4.49 | 0.0 |
| | | 300 | 277 | 1.17 | 0.0 |
| | 50 | 51 | 1 | 99.81 | 0.0 |
| | | 55 | 5 | 95.74 | 0.0 |
| | | 60 | 10 | 84.87 | 0.0 |
| | | 70 | 20 | 58.46 | 0.0 |
| | | 300 | 250 | 3.32 | 0.0 |
| | 100 | 101 | 1 | 99.93 | 0.0 |
| | | 105 | 5 | 98.15 | 0.0 |
| | | 110 | 10 | 91.87 | 0.0 |
| | | 300 | 200 | 12.58 | 0.0 |
| | 150 | 151 | 1 | 99.94 | 0.0 |
| | | 155 | 5 | 98.49 | 0.0 |
| | | 160 | 10 | 94.07 | 0.0 |
| | | 300 | 150 | 27.76 | 0.0 |

Fig. 34

| a2(μm) | d2(μm) | p2(μm) | t2(μm) | 8 THz TM Transmission power (%) | Power extinction ratio (dB) |
|---|---|---|---|---|---|
| 2000 | 1 | 2 | 1 | 78.58 | <-100 |
| | | 6 | 5 | 22.98 | <-100 |
| | | 11 | 10 | 8.82 | <-100 |
| | | 21 | 20 | 2.82 | <-100 |
| | | 71 | 70 | 0.25 | <-100 |
| | | 300 | 299 | 0.01 | <-100 |
| | 5 | 6 | 1 | 98.50 | <-100 |
| | | 10 | 5 | 86.28 | <-100 |
| | | 15 | 10 | 79.56 | <-100 |
| | | 25 | 20 | 98.14 | <-100 |
| | | 85 | 80 | 1.68 | <-100 |
| | | 300 | 295 | 0.18 | <-100 |
| | 10 | 11 | 1 | 99.59 | <-100 |
| | | 15 | 5 | 96.13 | <-100 |
| | | 20 | 10 | 96.60 | <-100 |
| | | 30 | 20 | 70.41 | <-100 |
| | | 100 | 90 | 3.12 | <-100 |
| | | 300 | 290 | 0.54 | <-100 |
| | 23 | 24 | 1 | 99.92 | 0.0 |
| | | 28 | 5 | 99.49 | 0.0 |
| | | 33 | 10 | 99.65 | 0.0 |
| | | 43 | 20 | 15.45 | 0.0 |
| | | 93 | 70 | 6.26 | 0.0 |
| | | 300 | 277 | 1.28 | 0.0 |
| | 50 | 51 | 1 | 99.86 | 0.0 |
| | | 55 | 5 | 96.78 | 0.0 |
| | | 60 | 10 | 86.54 | 0.0 |
| | | 70 | 20 | 49.09 | 0.0 |
| | | 300 | 250 | 3.44 | 0.0 |
| | 100 | 101 | 1 | 99.94 | 0.0 |
| | | 105 | 5 | 98.34 | 0.0 |
| | | 110 | 10 | 85.50 | 0.0 |
| | | 300 | 200 | 12.75 | 0.0 |
| | 150 | 151 | 1 | 99.80 | 0.0 |
| | | 155 | 5 | 96.95 | 0.0 |
| | | 160 | 10 | 90.75 | 0.0 |
| | | 300 | 150 | 27.94 | 0.0 |

Fig. 35

| $a2(\mu m)$ | $d2(\mu m)$ | $p2(\mu m)$ | $r2(\mu m)$ | 9 THz | |
|---|---|---|---|---|---|
| | | | | TM Transmission power (%) | Power extinction ratio (dB) |
| 2000 | 1 | 2 | 1 | 94.93 | <-100 |
| | | 6 | 5 | 41.05 | <-100 |
| | | 11 | 10 | 13.37 | <-100 |
| | | 21 | 20 | 3.31 | <-100 |
| | | 71 | 70 | 0.45 | <-100 |
| | | 300 | 299 | 0.07 | <-100 |
| | 5 | 6 | 1 | 99.61 | <-100 |
| | | 10 | 5 | 85.31 | <-100 |
| | | 15 | 10 | 49.73 | <-100 |
| | | 25 | 20 | 11.25 | <-100 |
| | | 85 | 80 | 1.38 | <-100 |
| | | 300 | 295 | 0.71 | <-100 |
| | 10 | 11 | 1 | 99.89 | <-100 |
| | | 15 | 5 | 93.46 | <-100 |
| | | 20 | 10 | 66.59 | <-100 |
| | | 30 | 20 | 12.57 | <-100 |
| | | 100 | 90 | 0.05 | <-100 |
| | | 300 | 290 | 1.04 | <-100 |
| | 23 | 24 | 1 | 99.98 | 0.0 |
| | | 28 | 5 | 97.12 | 0.0 |
| | | 33 | 10 | 59.07 | 0.0 |
| | | 43 | 20 | 21.73 | 0.0 |
| | | 93 | 70 | 7.08 | 0.0 |
| | | 300 | 277 | 1.44 | 0.0 |
| | 50 | 51 | 1 | 99.89 | 0.0 |
| | | 55 | 5 | 96.65 | 0.0 |
| | | 60 | 10 | 81.95 | 0.0 |
| | | 70 | 20 | 41.13 | 0.0 |
| | | 300 | 250 | 3.52 | 0.0 |
| | 100 | 101 | 1 | 99.66 | 0.0 |
| | | 105 | 5 | 95.09 | 0.0 |
| | | 110 | 10 | 85.69 | 0.0 |
| | | 300 | 200 | 12.87 | 0.0 |
| | 150 | 151 | 1 | 99.92 | 0.0 |
| | | 155 | 5 | 97.92 | 0.0 |
| | | 160 | 10 | 92.48 | 0.0 |
| | | 300 | 150 | 28.09 | 0.0 |

Fig. 36

|         |         |         |         | 10 THz | |
|---------|---------|---------|---------|--------|------|
| a2(μm) | d2(μm) | p2(μm) | t2(μm) | TM Transmission power (%) | Power extinction ratio (dB) |
| 2000 | 1 | 2 | 1 | 64.65 | <-100 |
| | | 6 | 5 | 10.38 | <-100 |
| | | 11 | 10 | 3.15 | <-100 |
| | | 21 | 20 | 0.86 | <-100 |
| | | 71 | 70 | 0.08 | <-100 |
| | | 300 | 299 | 0.00 | <-100 |
| | 5 | 6 | 1 | 96.77 | <-100 |
| | | 10 | 5 | 62.46 | <-100 |
| | | 15 | 10 | 34.32 | <-100 |
| | | 25 | 20 | 17.99 | <-100 |
| | | 85 | 80 | 1.09 | <-100 |
| | | 300 | 295 | 0.11 | <-100 |
| | 10 | 11 | 1 | 99.10 | <-100 |
| | | 15 | 5 | 83.86 | <-100 |
| | | 20 | 10 | 62.07 | <-100 |
| | | 30 | 20 | 0.01 | <-100 |
| | | 100 | 90 | 1.36 | <-100 |
| | | 300 | 290 | 0.39 | <-100 |
| | 23 | 24 | 1 | 99.82 | 0.0 |
| | | 28 | 5 | 95.31 | 0.0 |
| | | 33 | 10 | 38.77 | 0.0 |
| | | 43 | 20 | 24.56 | 0.0 |
| | | 93 | 70 | 5.41 | 0.0 |
| | | 300 | 277 | 1.22 | 0.0 |
| | 50 | 51 | 1 | 99.86 | 0.0 |
| | | 55 | 5 | 96.11 | 0.0 |
| | | 60 | 10 | 60.70 | 0.0 |
| | | 70 | 20 | 46.37 | 0.0 |
| | | 300 | 250 | 3.52 | 0.0 |
| | 100 | 101 | 1 | 99.85 | 0.0 |
| | | 105 | 5 | 96.41 | 0.0 |
| | | 110 | 10 | 87.50 | 0.0 |
| | | 300 | 200 | 12.87 | 0.0 |
| | 150 | 151 | 1 | 99.92 | 0.0 |
| | | 155 | 5 | 98.09 | 0.0 |
| | | 160 | 10 | 93.00 | 0.0 |
| | | 300 | 150 | 28.07 | 0.0 |

Fig. 37

| | | | | 3 THz | |
|---|---|---|---|---|---|
| $a2(\mu m)$ | $d2(\mu m)$ | $p2(\mu m)$ | $r2(\mu m)$ | TM Transmission power (%) | Power extinction ratio (dB) |
| 3000 | 1 | 2 | 1 | 98.82 | <-100 |
| | | 6 | 5 | 78.27 | <-100 |
| | | 11 | 10 | 46.07 | <-100 |
| | | 21 | 20 | 17.65 | <-100 |
| | | 71 | 70 | 1.53 | <-100 |
| | | 300 | 299 | 0.02 | <-100 |
| | 5 | 6 | 1 | 99.92 | <-100 |
| | | 10 | 5 | 97.19 | <-100 |
| | | 15 | 10 | 87.19 | <-100 |
| | | 25 | 20 | 55.57 | <-100 |
| | | 85 | 80 | 2.78 | <-100 |
| | | 300 | 295 | 0.03 | <-100 |
| | 10 | 11 | 1 | 99.98 | <-100 |
| | | 15 | 5 | 98.93 | <-100 |
| | | 20 | 10 | 94.21 | <-100 |
| | | 30 | 20 | 72.82 | <-100 |
| | | 100 | 90 | 0.03 | <-100 |
| | | 300 | 290 | 0.03 | <-100 |
| | 23 | 24 | 1 | 100.00 | <-100 |
| | | 28 | 5 | 99.68 | <-100 |
| | | 33 | 10 | 97.94 | <-100 |
| | | 43 | 20 | 86.74 | <-100 |
| | | 93 | 70 | 5.34 | <-100 |
| | | 300 | 277 | 0.04 | <-100 |
| | 50 | 51 | 1 | 100.00 | 0.0 |
| | | 55 | 5 | 99.91 | 0.0 |
| | | 60 | 10 | 99.22 | 0.0 |
| | | 70 | 20 | 93.33 | 0.0 |
| | | 300 | 250 | 0.54 | 0.0 |
| | 100 | 101 | 1 | 99.78 | 0.0 |
| | | 105 | 5 | 97.20 | 0.0 |
| | | 110 | 10 | 92.01 | 0.0 |
| | | 300 | 200 | 11.98 | 0.0 |
| | 150 | 151 | 1 | 99.99 | 0.0 |
| | | 155 | 5 | 99.69 | 0.0 |
| | | 160 | 10 | 99.69 | 0.0 |
| | | 300 | 150 | 16.69 | 0.0 |

Fig. 38

| $a2(\mu m)$ | $d2(\mu m)$ | $p2(\mu m)$ | $t2(\mu m)$ | 4 THz TM Transmission power (%) | 4 THz Power extinction ratio (dB) |
|---|---|---|---|---|---|
| 3000 | 1 | 2 | 1 | 97.93 | <-100 |
| | | 6 | 5 | 67.11 | <-100 |
| | | 11 | 10 | 32.60 | <-100 |
| | | 21 | 20 | 10.76 | <-100 |
| | | 71 | 70 | 0.52 | <-100 |
| | | 300 | 299 | 0.02 | <-100 |
| | 5 | 6 | 1 | 99.85 | <-100 |
| | | 10 | 5 | 95.13 | <-100 |
| | | 15 | 10 | 79.35 | <-100 |
| | | 25 | 20 | 41.07 | <-100 |
| | | 85 | 80 | 2.44 | <-100 |
| | | 300 | 295 | 0.03 | <-100 |
| | 10 | 11 | 1 | 99.96 | <-100 |
| | | 15 | 5 | 98.13 | <-100 |
| | | 20 | 10 | 90.11 | <-100 |
| | | 30 | 20 | 59.42 | <-100 |
| | | 100 | 90 | 3.88 | <-100 |
| | | 300 | 290 | 0.03 | <-100 |
| | 23 | 24 | 1 | 99.99 | <-100 |
| | | 28 | 5 | 99.43 | <-100 |
| | | 33 | 10 | 96.28 | <-100 |
| | | 43 | 20 | 76.82 | <-100 |
| | | 93 | 70 | 7.32 | <-100 |
| | | 300 | 277 | 0.05 | <-100 |
| | 50 | 51 | 1 | 100.00 | 0.0 |
| | | 55 | 5 | 99.83 | 0.0 |
| | | 60 | 10 | 98.33 | 0.0 |
| | | 70 | 20 | 80.36 | 0.0 |
| | | 300 | 250 | 2.16 | 0.0 |
| | 100 | 101 | 1 | 99.97 | 0.0 |
| | | 105 | 5 | 99.22 | 0.0 |
| | | 110 | 10 | 96.67 | 0.0 |
| | | 300 | 200 | 8.05 | 0.0 |
| | 150 | 151 | 1 | 99.87 | 0.0 |
| | | 155 | 5 | 98.12 | 0.0 |
| | | 160 | 10 | 98.12 | 0.0 |
| | | 300 | 150 | 25.73 | 0.0 |

Fig. 39

| $a2(\mu m)$ | $d2(\mu m)$ | $p2(\mu m)$ | $t2(\mu m)$ | 5 THz | |
|---|---|---|---|---|---|
| | | | | TM Transmission power (%) | Power extinction ratio (dB) |
| 3000 | 1 | 2 | 1 | 96.83 | <-100 |
| | | 6 | 5 | 56.84 | <-100 |
| | | 11 | 10 | 23.78 | <-100 |
| | | 21 | 20 | 7.17 | <-100 |
| | | 71 | 70 | 0.79 | <-100 |
| | | 300 | 299 | 0.09 | <-100 |
| | 5 | 6 | 1 | 99.77 | <-100 |
| | | 10 | 5 | 92.66 | <-100 |
| | | 15 | 10 | 71.20 | <-100 |
| | | 25 | 20 | 30.56 | <-100 |
| | | 85 | 80 | 2.52 | <-100 |
| | | 300 | 295 | 0.64 | <-100 |
| | 10 | 11 | 1 | 99.94 | <-100 |
| | | 15 | 5 | 97.12 | <-100 |
| | | 20 | 10 | 85.29 | <-100 |
| | | 30 | 20 | 47.32 | <-100 |
| | | 100 | 90 | 2.97 | <-100 |
| | | 300 | 290 | 0.81 | <-100 |
| | 23 | 24 | 1 | 99.99 | <-100 |
| | | 28 | 5 | 99.09 | <-100 |
| | | 33 | 10 | 94.03 | <-100 |
| | | 43 | 20 | 63.98 | <-100 |
| | | 93 | 70 | 9.65 | <-100 |
| | | 300 | 277 | 1.09 | <-100 |
| | 50 | 51 | 1 | 100.00 | 0.0 |
| | | 55 | 5 | 99.66 | 0.0 |
| | | 60 | 10 | 88.30 | 0.0 |
| | | 70 | 20 | 44.51 | 0.0 |
| | | 300 | 250 | 2.86 | 0.0 |
| | 100 | 101 | 1 | 99.97 | 0.0 |
| | | 105 | 5 | 99.30 | 0.0 |
| | | 110 | 10 | 96.39 | 0.0 |
| | | 300 | 200 | 11.86 | 0.0 |
| | 150 | 151 | 1 | 99.97 | 0.0 |
| | | 155 | 5 | 99.32 | 0.0 |
| | | 160 | 10 | 99.32 | 0.0 |
| | | 300 | 150 | 27.10 | 0.0 |

Fig. 40

| a2(μm) | d2(μm) | p2(μm) | t2(μm) | 6 THz | |
|---|---|---|---|---|---|
| | | | | TM Transmission power (%) | Power extinction ratio (dB) |
| 3000 | 1 | 2 | 1 | 95.53 | <-100 |
| | | 6 | 5 | 48.04 | <-100 |
| | | 11 | 10 | 17.96 | <-100 |
| | | 21 | 20 | 5.09 | <-100 |
| | | 71 | 70 | 0.59 | <-100 |
| | | 300 | 299 | 0.07 | <-100 |
| | 5 | 6 | 1 | 99.67 | <-100 |
| | | 10 | 5 | 89.85 | <-100 |
| | | 15 | 10 | 63.34 | <-100 |
| | | 25 | 20 | 23.06 | <-100 |
| | | 85 | 80 | 1.73 | <-100 |
| | | 300 | 295 | 0.65 | <-100 |
| | 10 | 11 | 1 | 99.91 | <-100 |
| | | 15 | 5 | 95.92 | <-100 |
| | | 20 | 10 | 79.99 | <-100 |
| | | 30 | 20 | 36.97 | <-100 |
| | | 100 | 90 | 0.03 | <-100 |
| | | 300 | 290 | 0.92 | <-100 |
| | 23 | 24 | 1 | 99.98 | <-100 |
| | | 28 | 5 | 98.67 | <-100 |
| | | 33 | 10 | 91.02 | <-100 |
| | | 43 | 20 | 46.57 | <-100 |
| | | 93 | 70 | 8.73 | <-100 |
| | | 300 | 277 | 1.27 | <-100 |
| | 50 | 51 | 1 | 99.33 | 0.0 |
| | | 55 | 5 | 91.98 | 0.0 |
| | | 60 | 10 | 78.92 | 0.0 |
| | | 70 | 20 | 55.79 | 0.0 |
| | | 300 | 250 | 3.09 | 0.0 |
| | 100 | 101 | 1 | 99.75 | 0.0 |
| | | 105 | 5 | 96.29 | 0.0 |
| | | 110 | 10 | 88.69 | 0.0 |
| | | 300 | 200 | 12.32 | 0.0 |
| | 150 | 151 | 1 | 99.83 | 0.0 |
| | | 155 | 5 | 97.50 | 0.0 |
| | | 160 | 10 | 97.50 | 0.0 |
| | | 300 | 150 | 27.58 | 0.0 |

Fig. 41

| a2(μm) | d2(μm) | p2(μm) | t2(μm) | 7 THz | |
|---|---|---|---|---|---|
| | | | | TM Transmission power (%) | Power extinction ratio (dB) |
| 3000 | 1 | 2 | 1 | 94.07 | <-100 |
| | | 6 | 5 | 40.76 | <-100 |
| | | 11 | 10 | 14.00 | <-100 |
| | | 21 | 20 | 3.79 | <-100 |
| | | 71 | 70 | 0.41 | <-100 |
| | | 300 | 299 | 0.05 | <-100 |
| | 5 | 6 | 1 | 99.56 | <-100 |
| | | 10 | 5 | 86.81 | <-100 |
| | | 15 | 10 | 56.12 | <-100 |
| | | 25 | 20 | 17.63 | <-100 |
| | | 85 | 80 | 0.35 | <-100 |
| | | 300 | 295 | 0.60 | <-100 |
| | 10 | 11 | 1 | 99.88 | <-100 |
| | | 15 | 5 | 94.55 | <-100 |
| | | 20 | 10 | 74.40 | <-100 |
| | | 30 | 20 | 28.20 | <-100 |
| | | 100 | 90 | 1.93 | <-100 |
| | | 300 | 290 | 0.95 | <-100 |
| | 23 | 24 | 1 | 99.98 | 0.0 |
| | | 28 | 5 | 98.14 | 0.0 |
| | | 33 | 10 | 86.84 | 0.0 |
| | | 43 | 20 | 6.17 | 0.0 |
| | | 93 | 70 | 4.53 | 0.0 |
| | | 300 | 277 | 1.35 | 0.0 |
| | 50 | 51 | 1 | 99.84 | 0.0 |
| | | 55 | 5 | 96.15 | 0.0 |
| | | 60 | 10 | 85.07 | 0.0 |
| | | 70 | 20 | 57.24 | 0.0 |
| | | 300 | 250 | 3.35 | 0.0 |
| | 100 | 101 | 1 | 99.94 | 0.0 |
| | | 105 | 5 | 98.27 | 0.0 |
| | | 110 | 10 | 91.89 | 0.0 |
| | | 300 | 200 | 12.63 | 0.0 |
| | 150 | 151 | 1 | 99.94 | 0.0 |
| | | 155 | 5 | 98.54 | 0.0 |
| | | 160 | 10 | 98.54 | 0.0 |
| | | 300 | 150 | 27.83 | 0.0 |

Fig. 42

|  |  |  |  | 8 THz ||
| --- | --- | --- | --- | --- | --- |
| $a2(\mu m)$ | $d2(\mu m)$ | $p2(\mu m)$ | $t2(\mu m)$ | TM Transmission power (%) | Power extinction ratio (dB) |
| 3000 | 1 | 2 | 1 | 92.47 | <-100 |
| | | 6 | 5 | 34.84 | <-100 |
| | | 11 | 10 | 11.22 | <-100 |
| | | 21 | 20 | 2.91 | <-100 |
| | | 71 | 70 | 0.25 | <-100 |
| | | 300 | 299 | 0.04 | <-100 |
| | 5 | 6 | 1 | 99.44 | <-100 |
| | | 10 | 5 | 83.64 | <-100 |
| | | 15 | 10 | 49.69 | <-100 |
| | | 25 | 20 | 13.59 | <-100 |
| | | 85 | 80 | 1.26 | <-100 |
| | | 300 | 295 | 0.55 | <-100 |
| | 10 | 11 | 1 | 99.84 | <-100 |
| | | 15 | 5 | 93.04 | <-100 |
| | | 20 | 10 | 68.69 | <-100 |
| | | 30 | 20 | 20.56 | <-100 |
| | | 100 | 90 | 1.95 | <-100 |
| | | 300 | 290 | 0.94 | <-100 |
| | 23 | 24 | 1 | 99.97 | 0.0 |
| | | 28 | 5 | 97.46 | 0.0 |
| | | 33 | 10 | 80.19 | 0.0 |
| | | 43 | 20 | 16.84 | 0.0 |
| | | 93 | 70 | 6.23 | 0.0 |
| | | 300 | 277 | 1.39 | 0.0 |
| | 50 | 51 | 1 | 99.87 | 0.0 |
| | | 55 | 5 | 96.56 | 0.0 |
| | | 60 | 10 | 84.65 | 0.0 |
| | | 70 | 20 | 48.51 | 0.0 |
| | | 300 | 250 | 3.45 | 0.0 |
| | 100 | 101 | 1 | 99.95 | 0.0 |
| | | 105 | 5 | 98.26 | 0.0 |
| | | 110 | 10 | 84.85 | 0.0 |
| | | 300 | 200 | 12.78 | 0.0 |
| | 150 | 151 | 1 | 99.80 | 0.0 |
| | | 155 | 5 | 96.97 | 0.0 |
| | | 160 | 10 | 96.97 | 0.0 |
| | | 300 | 150 | 27.98 | 0.0 |

Fig. 43

|  |  |  |  | 9 THz | |
|---|---|---|---|---|---|
| $a2(\mu m)$ | $d2(\mu m)$ | $p2(\mu m)$ | $t2(\mu m)$ | TM Transmission power (%) | Power extinction ratio (dB) |
| 3000 | 1 | 2 | 1 | 90.77 | <-100 |
|  |  | 6 | 5 | 30.06 | <-100 |
|  |  | 11 | 10 | 9.21 | <-100 |
|  |  | 21 | 20 | 2.30 | <-100 |
|  |  | 71 | 70 | 0.30 | <-100 |
|  |  | 300 | 299 | 0.03 | <-100 |
|  | 5 | 6 | 1 | 99.30 | <-100 |
|  |  | 10 | 5 | 80.41 | <-100 |
|  |  | 15 | 10 | 44.07 | <-100 |
|  |  | 25 | 20 | 10.43 | <-100 |
|  |  | 85 | 80 | 1.24 | <-100 |
|  |  | 300 | 295 | 0.49 | <-100 |
|  | 10 | 11 | 1 | 99.80 | <-100 |
|  |  | 15 | 5 | 91.41 | <-100 |
|  |  | 20 | 10 | 62.97 | <-100 |
|  |  | 30 | 20 | 13.35 | <-100 |
|  |  | 100 | 90 | 0.05 | <-100 |
|  |  | 300 | 290 | 0.91 | <-100 |
|  | 23 | 24 | 1 | 99.96 | 0.0 |
|  |  | 28 | 5 | 96.52 | 0.0 |
|  |  | 33 | 10 | 60.03 | 0.0 |
|  |  | 43 | 20 | 21.77 | 0.0 |
|  |  | 93 | 70 | 7.07 | 0.0 |
|  |  | 300 | 277 | 1.42 | 0.0 |
|  | 50 | 51 | 1 | 99.89 | 0.0 |
|  |  | 55 | 5 | 96.55 | 0.0 |
|  |  | 60 | 10 | 81.83 | 0.0 |
|  |  | 70 | 20 | 41.14 | 0.0 |
|  |  | 300 | 250 | 3.52 | 0.0 |
|  | 100 | 101 | 1 | 99.66 | 0.0 |
|  |  | 105 | 5 | 95.08 | 0.0 |
|  |  | 110 | 10 | 85.69 | 0.0 |
|  |  | 300 | 200 | 12.87 | 0.0 |
|  | 150 | 151 | 1 | 99.92 | 0.0 |
|  |  | 155 | 5 | 97.92 | 0.0 |
|  |  | 160 | 10 | 97.92 | 0.0 |
|  |  | 300 | 150 | 28.08 | 0.0 |

Fig. 44

|  |  |  |  | 10 THz ||
| --- | --- | --- | --- | --- | --- |
| $a2(\mu m)$ | $d2(\mu m)$ | $p2(\mu m)$ | $t2(\mu m)$ | TM Transmission power (%) | Power extinction ratio (dB) |
| 3000 | 1 | 2 | 1 | 88.99 | <-100 |
| | | 6 | 5 | 26.19 | <-100 |
| | | 11 | 10 | 7.72 | <-100 |
| | | 21 | 20 | 1.85 | <-100 |
| | | 71 | 70 | 0.27 | <-100 |
| | | 300 | 299 | 0.03 | <-100 |
| | 5 | 6 | 1 | 99.15 | <-100 |
| | | 10 | 5 | 77.20 | <-100 |
| | | 15 | 10 | 39.21 | <-100 |
| | | 25 | 20 | 7.81 | <-100 |
| | | 85 | 80 | 0.91 | <-100 |
| | | 300 | 295 | 0.44 | <-100 |
| | 10 | 11 | 1 | 99.76 | <-100 |
| | | 15 | 5 | 89.67 | <-100 |
| | | 20 | 10 | 57.27 | <-100 |
| | | 30 | 20 | 0.06 | <-100 |
| | | 100 | 90 | 1.33 | <-100 |
| | | 300 | 290 | 0.88 | <-100 |
| | 23 | 24 | 1 | 99.95 | 0.0 |
| | | 28 | 5 | 94.88 | 0.0 |
| | | 33 | 10 | 37.94 | 0.0 |
| | | 43 | 20 | 24.62 | 0.0 |
| | | 93 | 70 | 5.37 | 0.0 |
| | | 300 | 277 | 1.43 | 0.0 |
| | 50 | 51 | 1 | 99.89 | 0.0 |
| | | 55 | 5 | 96.22 | 0.0 |
| | | 60 | 10 | 58.55 | 0.0 |
| | | 70 | 20 | 46.45 | 0.0 |
| | | 300 | 250 | 3.56 | 0.0 |
| | 100 | 101 | 1 | 99.86 | 0.0 |
| | | 105 | 5 | 96.47 | 0.0 |
| | | 110 | 10 | 87.46 | 0.0 |
| | | 300 | 200 | 12.93 | 0.0 |
| | 150 | 151 | 1 | 99.93 | 0.0 |
| | | 155 | 5 | 98.14 | 0.0 |
| | | 160 | 10 | 98.14 | 0.0 |
| | | 300 | 150 | 28.15 | 0.0 |

Fig. 45

|  |  |  |  | 0.1 THz | | 0.5 THz | |
| --- | --- | --- | --- | --- | --- | --- | --- |
| $a3$ (μm) | $d3$ (μm) | $p3$ (μm) | $t3$ (μm) | TM Transmission power (%) | Power extinction ratio (dB) | TM Transmission power (%) | Power extinction ratio (dB) |
| 50 | 10 | 10.01 | 0.01 | 84.14 | <-100 | 91.30 | <-100 |
|  |  | 10.1 | 0.1 | 83.54 | <-100 | 90.95 | <-100 |
|  |  | 10.5 | 0.5 | 80.88 | <-100 | 89.36 | <-100 |
|  |  | 50 | 40 | 6.78 | <-100 | 13.32 | <-100 |
|  |  | 100 | 90 | 1.74 | <-100 | 3.73 | <-100 |
|  |  | 300 | 290 | 0.20 | <-100 | 0.45 | <-100 |
|  | 50 | 50.01 | 0.01 | 84.19 | -26.5 | 91.33 | -26.0 |
|  |  | 50.1 | 0.1 | 84.07 | -26.5 | 91.26 | -26.0 |
|  |  | 50.5 | 0.5 | 83.54 | -26.5 | 90.95 | -26.0 |
|  |  | 100 | 50 | 35.49 | -22.8 | 54.10 | -23.7 |
|  |  | 300 | 250 | 4.79 | -14.1 | 12.14 | -17.2 |
|  | 100 | 100.01 | 0.01 | 84.20 | -12.8 | 91.34 | -11.3 |
|  |  | 100.1 | 0.1 | 84.14 | -12.8 | 91.30 | -11.3 |
|  |  | 100.5 | 0.5 | 83.88 | -12.8 | 91.15 | -11.3 |
|  |  | 300 | 200 | 17.77 | -6.1 | 36.42 | -7.3 |
|  | 150 | 150.01 | 0.01 | 84.20 | -8.2 | 91.34 | -5.5 |
|  |  | 150.1 | 0.1 | 84.16 | -8.2 | 91.31 | -5.5 |
|  |  | 150.5 | 0.5 | 83.99 | -8.2 | 91.21 | -5.5 |
|  |  | 300 | 150 | 35.56 | -4.5 | 57.43 | -3.4 |

|  |  |  |  | 1.0 THz | | 1.5 THz | |
| --- | --- | --- | --- | --- | --- | --- | --- |
| $a3$ (μm) | $d3$ (μm) | $p3$ (μm) | $t3$ (μm) | TM Transmission power (%) | Power extinction ratio (dB) | TM Transmission power (%) | Power extinction ratio (dB) |
| 50 | 10 | 10.01 | 0.01 | 99.63 | <-100 | 89.95 | <-100 |
|  |  | 10.1 | 0.1 | 99.63 | <-100 | 89.56 | <-100 |
|  |  | 10.5 | 0.5 | 99.62 | <-100 | 87.81 | <-100 |
|  |  | 50 | 40 | 90.54 | <-100 | 9.96 | <-100 |
|  |  | 100 | 90 | 54.79 | <-100 | 2.36 | <-100 |
|  |  | 300 | 290 | 0.03 | -99.9 | 0.23 | <-100 |
|  | 50 | 50.01 | 0.01 | 99.63 | -23.5 | 89.98 | -17.1 |
|  |  | 50.1 | 0.1 | 99.63 | -23.5 | 89.91 | -17.1 |
|  |  | 50.5 | 0.5 | 99.63 | -23.5 | 89.56 | -17.1 |
|  |  | 100 | 50 | 97.67 | -23.4 | 43.03 | -13.9 |
|  |  | 300 | 250 | 0.01 | 18.1 | 3.00 | -2.3 |
|  | 100 | 100.01 | 0.01 | 99.63 | 0.0 | 89.99 | 0.0 |
|  |  | 100.1 | 0.1 | 99.63 | 0.0 | 89.95 | 0.0 |
|  |  | 100.5 | 0.5 | 99.63 | 0.0 | 89.78 | 0.0 |
|  |  | 300 | 200 | 0.00 | 0.0 | 9.41 | 0.0 |
|  | 150 | 150.01 | 0.01 | 99.63 | 0.0 | 89.99 | 0.0 |
|  |  | 150.1 | 0.1 | 99.63 | 0.0 | 89.96 | 0.0 |
|  |  | 150.5 | 0.5 | 99.63 | 0.0 | 89.85 | 0.0 |
|  |  | 300 | 150 | 0.08 | 0.0 | 20.52 | 0.0 |

Fig. 51

|  |  |  |  | 0.1 THz | | 0.5 THz | |
|---|---|---|---|---|---|---|---|
| $a3$ (μm) | $d3$ (μm) | $p3$ (μm) | $t3$ (μm) | TM Transmission power (%) | Power extinction ratio (dB) | TM Transmission power (%) | Power extinction ratio (dB) |
| 1000 | 10 | 10.01 | 0.01 | 83.29 | <-100 | 82.27 | <-100 |
|  |  | 10.1 | 0.1 | 82.69 | <-100 | 81.73 | <-100 |
|  |  | 10.5 | 0.5 | 80.01 | <-100 | 79.29 | <-100 |
|  |  | 50 | 40 | 6.59 | <-100 | 7.15 | <-100 |
|  |  | 100 | 90 | 1.69 | <-100 | 1.86 | <-100 |
|  |  | 300 | 290 | 0.19 | <-100 | 0.21 | <-100 |
|  | 50 | 50.01 | 0.01 | 83.34 | <-100 | 82.32 | <-100 |
|  |  | 50.1 | 0.1 | 83.22 | <-100 | 82.21 | <-100 |
|  |  | 50.5 | 0.5 | 82.69 | <-100 | 81.73 | <-100 |
|  |  | 100 | 50 | 34.74 | <-100 | 36.47 | <-100 |
|  |  | 300 | 250 | 4.63 | <-100 | 5.28 | <-100 |
|  | 100 | 100.01 | 0.01 | 83.35 | <-100 | 82.33 | <-100 |
|  |  | 100.1 | 0.1 | 83.29 | <-100 | 82.27 | <-100 |
|  |  | 100.5 | 0.5 | 83.02 | <-100 | 82.03 | <-100 |
|  |  | 300 | 200 | 17.26 | <-100 | 18.85 | <-100 |
|  | 150 | 150.01 | 0.01 | 83.35 | <-100 | 82.33 | <-100 |
|  |  | 150.1 | 0.1 | 83.31 | <-100 | 82.29 | <-100 |
|  |  | 150.5 | 0.5 | 83.14 | <-100 | 82.13 | <-100 |
|  |  | 300 | 150 | 34.75 | <-100 | 36.71 | <-100 |

|  |  |  |  | 1.0 THz | | 1.5 THz | |
|---|---|---|---|---|---|---|---|
| $a3$ (μm) | $d3$ (μm) | $p3$ (μm) | $t3$ (μm) | TM Transmission power (%) | Power extinction ratio (dB) | TM Transmission power (%) | Power extinction ratio (dB) |
| 1000 | 10 | 10.01 | 0.01 | 83.03 | <-100 | 84.80 | <-100 |
|  |  | 10.1 | 0.1 | 82.62 | <-100 | 84.58 | <-100 |
|  |  | 10.5 | 0.5 | 80.79 | <-100 | 83.58 | <-100 |
|  |  | 50 | 40 | 9.99 | <-100 | 19.80 | <-100 |
|  |  | 100 | 90 | 2.78 | <-100 | 6.87 | <-100 |
|  |  | 300 | 290 | 0.03 | <-100 | 0.76 | <-100 |
|  | 50 | 50.01 | 0.01 | 83.07 | <-100 | 84.82 | <-100 |
|  |  | 50.1 | 0.1 | 82.98 | <-100 | 84.77 | <-100 |
|  |  | 50.5 | 0.5 | 82.62 | <-100 | 84.58 | <-100 |
|  |  | 100 | 50 | 44.78 | <-100 | 63.01 | <-100 |
|  |  | 300 | 250 | 0.02 | <-100 | 8.05 | <-100 |
|  | 100 | 100.01 | 0.01 | 83.07 | 0.0 | 84.82 | 0.0 |
|  |  | 100.1 | 0.1 | 83.03 | 0.0 | 84.80 | 0.0 |
|  |  | 100.5 | 0.5 | 82.85 | 0.0 | 84.70 | 0.0 |
|  |  | 300 | 200 | 0.01 | 0.0 | 12.34 | 0.0 |
|  | 150 | 150.01 | 0.01 | 83.07 | 0.0 | 84.82 | 0.0 |
|  |  | 150.1 | 0.1 | 83.04 | 0.0 | 84.81 | 0.0 |
|  |  | 150.5 | 0.5 | 82.92 | 0.0 | 84.74 | 0.0 |
|  |  | 300 | 150 | 0.34 | 0.0 | 21.94 | 0.0 |

Fig. 52

|  |  |  |  | 0.1 THz | | 0.5 THz | |
|---|---|---|---|---|---|---|---|
| a3 (μm) | d3 (μm) | p3 (μm) | t3 (μm) | TM Transmission power (%) | Power extinction ratio (dB) | TM Transmission power (%) | Power extinction ratio (dB) |
| 2000 | 10 | 10.01 | 0.01 | 82.87 | <-100 | 83.03 | <-100 |
|  |  | 10.1 | 0.1 | 82.28 | <-100 | 82.62 | <-100 |
|  |  | 10.5 | 0.5 | 79.64 | <-100 | 80.79 | <-100 |
|  |  | 50 | 40 | 6.63 | <-100 | 9.67 | <-100 |
|  |  | 100 | 90 | 1.70 | <-100 | 2.62 | <-100 |
|  |  | 300 | 290 | 0.19 | <-100 | 0.31 | <-100 |
|  | 50 | 50.01 | 0.01 | 82.93 | <-100 | 83.07 | <-100 |
|  |  | 50.1 | 0.1 | 82.81 | <-100 | 82.98 | <-100 |
|  |  | 50.5 | 0.5 | 82.28 | <-100 | 82.62 | <-100 |
|  |  | 100 | 50 | 34.80 | <-100 | 43.77 | <-100 |
|  |  | 300 | 250 | 4.67 | <-100 | 8.10 | <-100 |
|  | 100 | 100.01 | 0.01 | 82.93 | <-100 | 83.07 | <-100 |
|  |  | 100.1 | 0.1 | 82.87 | <-100 | 83.03 | <-100 |
|  |  | 100.5 | 0.5 | 82.61 | <-100 | 82.85 | <-100 |
|  |  | 300 | 200 | 17.37 | <-100 | 26.49 | <-100 |
|  | 150 | 150.01 | 0.01 | 82.94 | <-100 | 83.07 | <-100 |
|  |  | 150.1 | 0.1 | 82.90 | <-100 | 83.04 | <-100 |
|  |  | 150.5 | 0.5 | 82.72 | <-100 | 82.92 | <-100 |
|  |  | 300 | 150 | 34.85 | <-100 | 45.74 | <-100 |

|  |  |  |  | 1.0 THz | | 1.5 THz | |
|---|---|---|---|---|---|---|---|
| a3 (μm) | d3 (μm) | p3 (μm) | t3 (μm) | TM Transmission power (%) | Power extinction ratio (dB) | TM Transmission power (%) | Power extinction ratio (dB) |
| 2000 | 10 | 10.01 | 0.01 | 85.65 | <-100 | 78.85 | <-100 |
|  |  | 10.1 | 0.1 | 85.60 | <-100 | 78.76 | <-100 |
|  |  | 10.5 | 0.5 | 85.36 | <-100 | 78.34 | <-100 |
|  |  | 50 | 40 | 51.59 | <-100 | 21.36 | <-100 |
|  |  | 100 | 90 | 28.63 | <-100 | 5.20 | <-100 |
|  |  | 300 | 290 | 0.02 | <-100 | 0.49 | <-100 |
|  | 50 | 50.01 | 0.01 | 85.66 | <-100 | 78.86 | <-100 |
|  |  | 50.1 | 0.1 | 85.65 | <-100 | 78.84 | <-100 |
|  |  | 50.5 | 0.5 | 85.60 | <-100 | 78.76 | <-100 |
|  |  | 100 | 50 | 80.69 | <-100 | 56.04 | <-100 |
|  |  | 300 | 250 | 0.01 | <-100 | 4.28 | <-100 |
|  | 100 | 100.01 | 0.01 | 85.66 | 0.0 | 78.86 | 0.0 |
|  |  | 100.1 | 0.1 | 85.65 | 0.0 | 78.85 | 0.0 |
|  |  | 100.5 | 0.5 | 85.63 | 0.0 | 78.81 | 0.0 |
|  |  | 300 | 200 | 0.00 | 0.0 | 10.53 | 0.0 |
|  | 150 | 150.01 | 0.01 | 85.66 | 0.0 | 78.86 | 0.0 |
|  |  | 150.1 | 0.1 | 85.66 | 0.0 | 78.85 | 0.0 |
|  |  | 150.5 | 0.5 | 85.64 | 0.0 | 78.83 | 0.0 |
|  |  | 300 | 150 | 0.08 | 0.0 | 20.72 | 0.0 |

Fig. 53

| $a3(\mu m)$ | $d3(\mu m)$ | $p3(\mu m)$ | $l3(\mu m)$ | 2 THz ||
| --- | --- | --- | --- | --- | --- |
| | | | | TM Transmission power (%) | Power extinction ratio (dB) |
| 50 | 1 | 1.01 | 0.01 | 99.92 | <-100 |
| | | 1.1 | 0.1 | 99.87 | <-100 |
| | | 1.5 | 0.5 | 99.59 | <-100 |
| | | 11 | 10 | 58.50 | <-100 |
| | | 31 | 30 | 11.25 | <-100 |
| | | 300 | 299 | 0.02 | <-100 |
| | 5 | 5.01 | 0.01 | 99.92 | <-100 |
| | | 5.1 | 0.1 | 99.91 | <-100 |
| | | 5.5 | 0.5 | 99.87 | <-100 |
| | | 20 | 15 | 81.79 | <-100 |
| | | 85 | 80 | 6.20 | <-100 |
| | | 300 | 295 | 0.03 | <-100 |
| | 10 | 10.01 | 0.01 | 99.92 | <-100 |
| | | 10.1 | 0.1 | 99.91 | <-100 |
| | | 10.5 | 0.5 | 99.89 | <-100 |
| | | 50 | 40 | 44.61 | <-100 |
| | | 100 | 90 | 7.39 | <-100 |
| | | 300 | 290 | 0.03 | -98.4 |
| | 23 | 23.01 | 0.01 | 99.92 | -52.4 |
| | | 23.1 | 0.1 | 99.92 | -52.4 |
| | | 23.5 | 0.5 | 99.91 | -52.4 |
| | | 43 | 20 | 92.23 | -52.0 |
| | | 123 | 100 | 7.51 | -41.1 |
| | | 300 | 277 | 0.04 | -17.8 |
| | 50 | 50.01 | 0.01 | 99.92 | 0.0 |
| | | 50.1 | 0.1 | 99.92 | 0.0 |
| | | 50.5 | 0.5 | 99.91 | 0.0 |
| | | 100 | 50 | 61.43 | 0.0 |
| | | 300 | 250 | 0.07 | 0.0 |
| | 100 | 100.01 | 0.01 | 99.92 | 0.0 |
| | | 100.1 | 0.1 | 99.92 | 0.0 |
| | | 100.5 | 0.5 | 99.92 | 0.0 |
| | | 300 | 200 | 1.43 | 0.0 |
| | 150 | 150.01 | 0.01 | 99.92 | 0.0 |
| | | 150.1 | 0.1 | 99.92 | 0.0 |
| | | 150.5 | 0.5 | 99.91 | 0.0 |
| | | 300 | 150 | 26.78 | 0.0 |

Fig. 54

|  |  |  |  | 3 THz | |
|---|---|---|---|---|---|
| a3(μm) | d3(μm) | p3(μm) | r3(μm) | TM Transmission power (%) | Power extinction ratio (dB) |
| 50 | 1 | 1.01 | 0.01 | 83.35 | <-100 |
|  |  | 1.1 | 0.1 | 77.31 | <-100 |
|  |  | 1.5 | 0.5 | 53.91 | <-100 |
|  |  | 11 | 10 | 1.43 | <-100 |
|  |  | 31 | 30 | 0.18 | <-100 |
|  |  | 300 | 299 | 0.00 | <-100 |
|  | 5 | 5.01 | 0.01 | 83.89 | <-100 |
|  |  | 5.1 | 0.1 | 82.68 | <-100 |
|  |  | 5.5 | 0.5 | 77.32 | <-100 |
|  |  | 20 | 15 | 10.57 | <-100 |
|  |  | 85 | 80 | 0.72 | <-100 |
|  |  | 300 | 295 | 0.02 | <-100 |
|  | 10 | 10.01 | 0.01 | 83.95 | <-100 |
|  |  | 10.1 | 0.1 | 83.35 | <-100 |
|  |  | 10.5 | 0.5 | 80.67 | <-100 |
|  |  | 50 | 40 | 7.64 | <-100 |
|  |  | 100 | 90 | 0.01 | -89.7 |
|  |  | 300 | 290 | 0.03 | -94.2 |
|  | 23 | 23.01 | 0.01 | 83.99 | -41.4 |
|  |  | 23.1 | 0.1 | 83.73 | -41.3 |
|  |  | 23.5 | 0.5 | 82.56 | -41.3 |
|  |  | 43 | 20 | 41.06 | -38.2 |
|  |  | 123 | 100 | 4.12 | -28.3 |
|  |  | 300 | 277 | 0.02 | -4.7 |
|  | 50 | 50.01 | 0.01 | 84.01 | 0.0 |
|  |  | 50.1 | 0.1 | 83.89 | 0.0 |
|  |  | 50.5 | 0.5 | 83.35 | 0.0 |
|  |  | 100 | 50 | 0.09 | 0.0 |
|  |  | 300 | 250 | 0.07 | 0.0 |
|  | 100 | 100.01 | 0.01 | 84.01 | 0.0 |
|  |  | 100.1 | 0.1 | 83.95 | 0.0 |
|  |  | 100.5 | 0.5 | 83.68 | 0.0 |
|  |  | 300 | 200 | 9.88 | 0.0 |
|  | 150 | 150.01 | 0.01 | 84.01 | 0.0 |
|  |  | 150.1 | 0.1 | 83.97 | 0.0 |
|  |  | 150.5 | 0.5 | 83.79 | 0.0 |
|  |  | 300 | 150 | 15.96 | 0.0 |

Fig. 55

| $a3(\mu m)$ | $d3(\mu m)$ | $p3(\mu m)$ | $r3(\mu m)$ | 4 THz | |
|---|---|---|---|---|---|
| | | | | TM Transmission power (%) | Power extinction ratio (dB) |
| 50 | 1 | 1.01 | 0.01 | 99.66 | <-100 |
| | | 1.1 | 0.1 | 99.50 | <-100 |
| | | 1.5 | 0.5 | 98.39 | <-100 |
| | | 11 | 10 | 26.16 | <-100 |
| | | 31 | 30 | 3.03 | <-100 |
| | | 300 | 299 | 0.02 | <-100 |
| | 5 | 5.01 | 0.01 | 99.68 | <-100 |
| | | 5.1 | 0.1 | 99.64 | <-100 |
| | | 5.5 | 0.5 | 99.47 | <-100 |
| | | 20 | 15 | 52.60 | <-100 |
| | | 85 | 80 | 1.85 | <-100 |
| | | 300 | 295 | 0.02 | <-100 |
| | 10 | 10.01 | 0.01 | 99.68 | <-100 |
| | | 10.1 | 0.1 | 99.66 | <-100 |
| | | 10.5 | 0.5 | 99.57 | <-100 |
| | | 50 | 40 | 13.56 | <-100 |
| | | 100 | 90 | 3.23 | <-100 |
| | | 300 | 290 | 0.03 | -89.0 |
| | 23 | 23.01 | 0.01 | 99.68 | -20.4 |
| | | 23.1 | 0.1 | 99.67 | -20.4 |
| | | 23.5 | 0.5 | 99.63 | -20.4 |
| | | 43 | 20 | 71.17 | -18.9 |
| | | 123 | 100 | 5.80 | -8.0 |
| | | 300 | 277 | 0.05 | 0.0 |
| | 50 | 50.01 | 0.01 | 99.68 | 0.0 |
| | | 50.1 | 0.1 | 99.68 | 0.0 |
| | | 50.5 | 0.5 | 99.65 | 0.0 |
| | | 100 | 50 | 20.60 | 0.0 |
| | | 300 | 250 | 0.63 | 0.0 |
| | 100 | 100.01 | 0.01 | 99.68 | 0.0 |
| | | 100.1 | 0.1 | 99.68 | 0.0 |
| | | 100.5 | 0.5 | 99.66 | 0.0 |
| | | 300 | 200 | 7.81 | 0.0 |
| | 150 | 150.01 | 0.01 | 99.68 | 0.0 |
| | | 150.1 | 0.1 | 99.68 | 0.0 |
| | | 150.5 | 0.5 | 99.66 | 0.0 |
| | | 300 | 150 | 25.56 | 0.0 |

Fig. 56

| $a3(\mu m)$ | $d3(\mu m)$ | $p3(\mu m)$ | $t3(\mu m)$ | 5 THz | |
|---|---|---|---|---|---|
| | | | | TM Transmission power (%) | Power extinction ratio (dB) |
| 50 | 1 | 1.01 | 0.01 | 83.58 | <-100 |
| | | 1.1 | 0.1 | 77.61 | <-100 |
| | | 1.5 | 0.5 | 54.38 | <-100 |
| | | 11 | 10 | 1.49 | <-100 |
| | | 31 | 30 | 0.19 | <-100 |
| | | 300 | 299 | 0.00 | <-100 |
| | 5 | 5.01 | 0.01 | 84.11 | <-100 |
| | | 5.1 | 0.1 | 82.92 | <-100 |
| | | 5.5 | 0.5 | 77.64 | <-100 |
| | | 20 | 15 | 11.47 | <-100 |
| | | 85 | 80 | 0.70 | <-100 |
| | | 300 | 295 | 0.02 | <-100 |
| | 10 | 10.01 | 0.01 | 84.18 | <-100 |
| | | 10.1 | 0.1 | 83.58 | <-100 |
| | | 10.5 | 0.5 | 80.94 | <-100 |
| | | 50 | 40 | 14.08 | <-100 |
| | | 100 | 90 | 2.25 | <-100 |
| | | 300 | 290 | 0.03 | -81.4 |
| | 23 | 23.01 | 0.01 | 84.22 | 0.0 |
| | | 23.1 | 0.1 | 83.96 | 0.0 |
| | | 23.5 | 0.5 | 82.82 | 0.0 |
| | | 43 | 20 | 47.95 | 0.0 |
| | | 123 | 100 | 1.41 | 0.0 |
| | | 300 | 277 | 0.04 | 0.0 |
| | 50 | 50.01 | 0.01 | 84.23 | 0.0 |
| | | 50.1 | 0.1 | 84.11 | 0.0 |
| | | 50.5 | 0.5 | 83.58 | 0.0 |
| | | 100 | 50 | 21.47 | 0.0 |
| | | 300 | 250 | 2.27 | 0.0 |
| | 100 | 100.01 | 0.01 | 84.24 | 0.0 |
| | | 100.1 | 0.1 | 84.18 | 0.0 |
| | | 100.5 | 0.5 | 83.91 | 0.0 |
| | | 300 | 200 | 8.55 | 0.0 |
| | 150 | 150.01 | 0.01 | 84.24 | 0.0 |
| | | 150.1 | 0.1 | 84.20 | 0.0 |
| | | 150.5 | 0.5 | 84.02 | 0.0 |
| | | 300 | 150 | 19.38 | 0.0 |

Fig. 57

| $a3(\mu m)$ | $d3(\mu m)$ | $p3(\mu m)$ | $r3(\mu m)$ | 6 THz | |
|---|---|---|---|---|---|
| | | | | TM Transmission power (%) | Power extinction ratio (dB) |
| 50 | 1 | 1.01 | 0.01 | 99.25 | <-100 |
| | | 1.1 | 0.1 | 98.88 | <-100 |
| | | 1.5 | 0.5 | 96.48 | <-100 |
| | | 11 | 10 | 13.71 | <-100 |
| | | 31 | 30 | 1.32 | <-100 |
| | | 300 | 299 | 0.01 | <-100 |
| | 5 | 5.01 | 0.01 | 99.28 | <-100 |
| | | 5.1 | 0.1 | 99.21 | <-100 |
| | | 5.5 | 0.5 | 98.82 | <-100 |
| | | 20 | 15 | 32.52 | <-100 |
| | | 85 | 80 | 1.08 | <-100 |
| | | 300 | 295 | 0.02 | <-100 |
| | 10 | 10.01 | 0.01 | 99.28 | <-100 |
| | | 10.1 | 0.1 | 99.25 | <-100 |
| | | 10.5 | 0.5 | 99.05 | <-100 |
| | | 50 | 40 | 0.03 | -73.2 |
| | | 100 | 90 | 0.04 | -73.6 |
| | | 300 | 290 | 0.03 | -72.2 |
| | 23 | 23.01 | 0.01 | 99.28 | 0.0 |
| | | 23.1 | 0.1 | 99.27 | 0.0 |
| | | 23.5 | 0.5 | 99.18 | 0.0 |
| | | 43 | 20 | 37.57 | 0.0 |
| | | 123 | 100 | 3.66 | 0.0 |
| | | 300 | 277 | 0.08 | 0.0 |
| | 50 | 50.01 | 0.01 | 99.28 | 0.0 |
| | | 50.1 | 0.1 | 99.27 | 0.0 |
| | | 50.5 | 0.5 | 99.18 | 0.0 |
| | | 100 | 50 | 26.40 | 0.0 |
| | | 300 | 250 | 2.92 | 0.0 |
| | 100 | 100.01 | 0.01 | 99.28 | 0.0 |
| | | 100.1 | 0.1 | 99.28 | 0.0 |
| | | 100.5 | 0.5 | 99.24 | 0.0 |
| | | 300 | 200 | 11.26 | 0.0 |
| | 150 | 150.01 | 0.01 | 99.28 | 0.0 |
| | | 150.1 | 0.1 | 99.28 | 0.0 |
| | | 150.5 | 0.5 | 99.26 | 0.0 |
| | | 300 | 150 | 25.15 | 0.0 |

Fig. 58

|  |  |  |  | 7 THz | |
|---|---|---|---|---|---|
| a3(μm) | d3(μm) | p3(μm) | t3(μm) | TM Transmission power (%) | Power extinction ratio (dB) |
| 50 | 1 | 1.01 | 0.01 | 83.93 | <-100 |
| | | 1.1 | 0.1 | 78.06 | <-100 |
| | | 1.5 | 0.5 | 55.10 | <-100 |
| | | 11 | 10 | 1.58 | <-100 |
| | | 31 | 30 | 0.21 | <-100 |
| | | 300 | 299 | 0.00 | <-100 |
| | 5 | 5.01 | 0.01 | 84.45 | <-100 |
| | | 5.1 | 0.1 | 83.28 | <-100 |
| | | 5.5 | 0.5 | 78.11 | <-100 |
| | | 20 | 15 | 13.17 | <-100 |
| | | 85 | 80 | 8.92 | <-100 |
| | | 300 | 295 | 0.02 | <-100 |
| | 10 | 10.01 | 0.01 | 84.52 | -94.7 |
| | | 10.1 | 0.1 | 83.93 | -94.7 |
| | | 10.5 | 0.5 | 81.36 | -94.6 |
| | | 50 | 40 | 4.21 | -81.7 |
| | | 100 | 90 | 1.50 | -77.2 |
| | | 300 | 290 | 0.03 | -59.5 |
| | 23 | 23.01 | 0.01 | 84.56 | 0.0 |
| | | 23.1 | 0.1 | 84.30 | 0.0 |
| | | 23.5 | 0.5 | 83.19 | 0.0 |
| | | 43 | 20 | 0.73 | 0.0 |
| | | 123 | 100 | 4.14 | 0.0 |
| | | 300 | 277 | 0.10 | 0.0 |
| | 50 | 50.01 | 0.01 | 84.57 | 0.0 |
| | | 50.1 | 0.1 | 84.45 | 0.0 |
| | | 50.5 | 0.5 | 83.92 | 0.0 |
| | | 100 | 50 | 23.17 | 0.0 |
| | | 300 | 250 | 2.20 | 0.0 |
| | 100 | 100.01 | 0.01 | 84.58 | 0.0 |
| | | 100.1 | 0.1 | 84.52 | 0.0 |
| | | 100.5 | 0.5 | 84.25 | 0.0 |
| | | 300 | 200 | 8.77 | 0.0 |
| | 150 | 150.01 | 0.01 | 84.58 | 0.0 |
| | | 150.1 | 0.1 | 84.54 | 0.0 |
| | | 150.5 | 0.5 | 84.36 | 0.0 |
| | | 300 | 150 | 20.36 | 0.0 |

Fig. 59

|  |  |  |  | 8 THz | |
|---|---|---|---|---|---|
| a3(μm) | t3(μm) | p3(μm) | r3(μm) | TM Transmission power (%) | Power extinction ratio (dB) |
| 50 | 1 | 1.01 | 0.01 | 98.69 | <-100 |
| | | 1.1 | 0.1 | 98.05 | <-100 |
| | | 1.5 | 0.5 | 93.98 | <-100 |
| | | 11 | 10 | 8.29 | <-100 |
| | | 31 | 30 | 0.67 | <-100 |
| | | 300 | 299 | 0.01 | <-100 |
| | 5 | 5.01 | 0.01 | 98.74 | <-100 |
| | | 5.1 | 0.1 | 98.62 | <-100 |
| | | 5.5 | 0.5 | 97.94 | <-100 |
| | | 20 | 15 | 20.65 | <-100 |
| | | 85 | 80 | 0.82 | <-100 |
| | | 300 | 295 | 0.02 | <-100 |
| | 10 | 10.01 | 0.01 | 98.74 | -78.7 |
| | | 10.1 | 0.1 | 98.68 | -78.7 |
| | | 10.5 | 0.5 | 98.35 | -78.7 |
| | | 50 | 40 | 5.85 | -66.4 |
| | | 100 | 90 | 1.44 | -60.4 |
| | | 300 | 290 | 0.03 | -43.3 |
| | 23 | 23.01 | 0.01 | 98.75 | 0.0 |
| | | 23.1 | 0.1 | 98.72 | 0.0 |
| | | 23.5 | 0.5 | 98.57 | 0.0 |
| | | 43 | 20 | 16.65 | 0.0 |
| | | 123 | 100 | 2.79 | 0.0 |
| | | 300 | 277 | 0.16 | 0.0 |
| | 50 | 50.01 | 0.01 | 98.75 | 0.0 |
| | | 50.1 | 0.1 | 98.73 | 0.0 |
| | | 50.5 | 0.5 | 98.63 | 0.0 |
| | | 100 | 50 | 25.91 | 0.0 |
| | | 300 | 250 | 2.06 | 0.0 |
| | 100 | 100.01 | 0.01 | 98.75 | 0.0 |
| | | 100.1 | 0.1 | 98.74 | 0.0 |
| | | 100.5 | 0.5 | 98.69 | 0.0 |
| | | 300 | 200 | 10.21 | 0.0 |
| | 150 | 150.01 | 0.01 | 98.75 | 0.0 |
| | | 150.1 | 0.1 | 98.74 | 0.0 |
| | | 150.5 | 0.5 | 98.70 | 0.0 |
| | | 300 | 150 | 24.86 | 0.0 |

Fig. 60

| | | | | 9 THz | |
|---|---|---|---|---|---|
| $a3(\mu m)$ | $d3(\mu m)$ | $p3(\mu m)$ | $t3(\mu m)$ | TM Transmission power (%) | Power extinction ratio (dB) |
| 50 | 1 | 1.01 | 0.01 | 84.39 | <-100 |
| | | 1.1 | 0.1 | 78.65 | <-100 |
| | | 1.5 | 0.5 | 56.06 | <-100 |
| | | 11 | 10 | 1.71 | <-100 |
| | | 31 | 30 | 0.27 | <-100 |
| | | 300 | 299 | 0.00 | <-100 |
| | 5 | 5.01 | 0.01 | 84.90 | <-100 |
| | | 5.1 | 0.1 | 83.76 | <-100 |
| | | 5.5 | 0.5 | 78.74 | <-100 |
| | | 20 | 15 | 16.56 | <-100 |
| | | 85 | 80 | 0.86 | <-100 |
| | | 300 | 295 | 0.02 | <-100 |
| | 10 | 10.01 | 0.01 | 84.97 | -53.2 |
| | | 10.1 | 0.1 | 84.40 | -53.2 |
| | | 10.5 | 0.5 | 81.90 | -53.0 |
| | | 50 | 40 | 6.09 | -41.8 |
| | | 100 | 90 | 0.02 | -16.8 |
| | | 300 | 290 | 0.03 | -18.2 |
| | 23 | 23.01 | 0.01 | 85.00 | 0.0 |
| | | 23.1 | 0.1 | 84.75 | 0.0 |
| | | 23.5 | 0.5 | 83.67 | 0.0 |
| | | 43 | 20 | 21.52 | 0.0 |
| | | 123 | 100 | 3.08 | 0.0 |
| | | 300 | 277 | 0.29 | 0.0 |
| | 50 | 50.01 | 0.01 | 85.02 | 0.0 |
| | | 50.1 | 0.1 | 84.90 | 0.0 |
| | | 50.5 | 0.5 | 84.39 | 0.0 |
| | | 100 | 50 | 16.08 | 0.0 |
| | | 300 | 250 | 1.96 | 0.0 |
| | 100 | 100.01 | 0.01 | 85.02 | 0.0 |
| | | 100.1 | 0.1 | 84.96 | 0.0 |
| | | 100.5 | 0.5 | 84.70 | 0.0 |
| | | 300 | 200 | 9.61 | 0.0 |
| | 150 | 150.01 | 0.01 | 85.02 | 0.0 |
| | | 150.1 | 0.1 | 84.99 | 0.0 |
| | | 150.5 | 0.5 | 84.81 | 0.0 |
| | | 300 | 150 | 20.82 | 0.0 |

Fig. 61

| | | | | 10 THz ||
|---|---|---|---|---|---|
| $a3(\mu m)$ | $d3(\mu m)$ | $p3(\mu m)$ | $r3(\mu m)$ | TM Transmission power (%) | Power extinction ratio (dB) |
| 50 | 1 | 1.01 | 0.01 | 97.99 | <-100 |
| | | 1.1 | 0.1 | 97.03 | <-100 |
| | | 1.5 | 0.5 | 91.01 | <-100 |
| | | 11 | 10 | 5.55 | <-100 |
| | | 31 | 30 | 0.48 | <-100 |
| | | 300 | 299 | 0.01 | <-100 |
| | 5 | 5.01 | 0.01 | 98.06 | <-100 |
| | | 5.1 | 0.1 | 97.88 | <-100 |
| | | 5.5 | 0.5 | 96.86 | <-100 |
| | | 20 | 15 | 13.42 | <-100 |
| | | 85 | 80 | 0.51 | <-100 |
| | | 300 | 295 | 0.02 | <-100 |
| | 10 | 10.01 | 0.01 | 98.07 | 0.0 |
| | | 10.1 | 0.1 | 97.98 | 0.0 |
| | | 10.5 | 0.5 | 97.47 | 0.0 |
| | | 50 | 40 | 5.44 | 0.0 |
| | | 100 | 90 | 1.09 | 0.0 |
| | | 300 | 290 | 0.03 | 0.0 |
| | 23 | 23.01 | 0.01 | 98.08 | 0.0 |
| | | 23.1 | 0.1 | 98.03 | 0.0 |
| | | 23.5 | 0.5 | 97.73 | 0.0 |
| | | 43 | 20 | 25.89 | 0.0 |
| | | 123 | 100 | 3.01 | 0.0 |
| | | 300 | 277 | 0.44 | 0.0 |
| | 50 | 50.01 | 0.01 | 98.08 | 0.0 |
| | | 50.1 | 0.1 | 98.06 | 0.0 |
| | | 50.5 | 0.5 | 97.91 | 0.0 |
| | | 100 | 50 | 23.58 | 0.0 |
| | | 300 | 250 | 2.36 | 0.0 |
| | 100 | 100.01 | 0.01 | 98.08 | 0.0 |
| | | 100.1 | 0.1 | 98.07 | 0.0 |
| | | 100.5 | 0.5 | 97.99 | 0.0 |
| | | 300 | 200 | 10.27 | 0.0 |
| | 150 | 150.01 | 0.01 | 98.08 | 0.0 |
| | | 150.1 | 0.1 | 98.07 | 0.0 |
| | | 150.5 | 0.5 | 98.02 | 0.0 |
| | | 300 | 150 | 24.62 | 0.0 |

Fig. 62

| a3(μm) | d3(μm) | p3(μm) | t3(μm) | 2 THz | |
|---|---|---|---|---|---|
| | | | | TM Transmission power (%) | Power extinction ratio (dB) |
| 1000 | 1 | 1.01 | 0.01 | 84.23 | <-100 |
| | | 1.1 | 0.1 | 78.42 | <-100 |
| | | 1.5 | 0.5 | 55.44 | <-100 |
| | | 11 | 10 | 1.48 | <-100 |
| | | 31 | 30 | 0.19 | <-100 |
| | | 300 | 299 | 0.00 | <-100 |
| | 5 | 5.01 | 0.01 | 84.75 | <-100 |
| | | 5.1 | 0.1 | 83.59 | <-100 |
| | | 5.5 | 0.5 | 78.40 | <-100 |
| | | 20 | 15 | 10.38 | <-100 |
| | | 85 | 80 | 0.57 | <-100 |
| | | 300 | 295 | 0.02 | <-100 |
| | 10 | 10.01 | 0.01 | 84.81 | <-100 |
| | | 10.1 | 0.1 | 84.23 | <-100 |
| | | 10.5 | 0.5 | 81.64 | <-100 |
| | | 50 | 40 | 6.45 | <-100 |
| | | 100 | 90 | 1.59 | <-100 |
| | | 300 | 290 | 0.03 | <-100 |
| | 23 | 23.01 | 0.01 | 84.85 | <-100 |
| | | 23.1 | 0.1 | 84.60 | <-100 |
| | | 23.5 | 0.5 | 83.47 | <-100 |
| | | 43 | 20 | 38.71 | <-100 |
| | | 123 | 100 | 5.55 | <-100 |
| | | 300 | 277 | 0.02 | <-100 |
| | 50 | 50.01 | 0.01 | 84.86 | 0.0 |
| | | 50.1 | 0.1 | 84.75 | 0.0 |
| | | 50.5 | 0.5 | 84.23 | 0.0 |
| | | 100 | 50 | 32.92 | 0.0 |
| | | 300 | 250 | 0.01 | 0.0 |
| | 100 | 100.01 | 0.01 | 84.87 | 0.0 |
| | | 100.1 | 0.1 | 84.81 | 0.0 |
| | | 100.5 | 0.5 | 84.55 | 0.0 |
| | | 300 | 200 | 1.07 | 0.0 |
| | 150 | 150.01 | 0.01 | 84.87 | 0.0 |
| | | 150.1 | 0.1 | 84.83 | 0.0 |
| | | 150.5 | 0.5 | 84.66 | 0.0 |
| | | 300 | 150 | 21.98 | 0.0 |

Fig. 63

| $a3(\mu m)$ | $d3(\mu m)$ | $p3(\mu m)$ | $t3(\mu m)$ | 3 THz | |
| --- | --- | --- | --- | --- | --- |
| | | | | TM Transmission power (%) | Power extinction ratio (dB) |
| 1000 | 1 | 1.01 | 0.01 | 85.17 | <-100 |
| | | 1.1 | 0.1 | 79.63 | <-100 |
| | | 1.5 | 0.5 | 57.38 | <-100 |
| | | 11 | 10 | 1.69 | <-100 |
| | | 31 | 30 | 0.22 | <-100 |
| | | 300 | 299 | 0.00 | <-100 |
| | 5 | 5.01 | 0.01 | 85.65 | <-100 |
| | | 5.1 | 0.1 | 84.56 | <-100 |
| | | 5.5 | 0.5 | 79.67 | <-100 |
| | | 20 | 15 | 12.90 | <-100 |
| | | 85 | 80 | 1.14 | <-100 |
| | | 300 | 295 | 0.03 | <-100 |
| | 10 | 10.01 | 0.01 | 85.72 | <-100 |
| | | 10.1 | 0.1 | 85.17 | <-100 |
| | | 10.5 | 0.5 | 82.74 | <-100 |
| | | 50 | 40 | 10.91 | <-100 |
| | | 100 | 90 | 0.01 | <-100 |
| | | 300 | 290 | 0.03 | <-100 |
| | 23 | 23.01 | 0.01 | 85.75 | <-100 |
| | | 23.1 | 0.1 | 85.51 | <-100 |
| | | 23.5 | 0.5 | 84.46 | <-100 |
| | | 43 | 20 | 48.71 | <-100 |
| | | 123 | 100 | 4.67 | <-100 |
| | | 300 | 277 | 0.02 | <-100 |
| | 50 | 50.01 | 0.01 | 85.76 | 0.0 |
| | | 50.1 | 0.1 | 85.65 | 0.0 |
| | | 50.5 | 0.5 | 85.17 | 0.0 |
| | | 100 | 50 | 0.09 | 0.0 |
| | | 300 | 250 | 0.07 | 0.0 |
| | 100 | 100.01 | 0.01 | 85.77 | 0.0 |
| | | 100.1 | 0.1 | 85.71 | 0.0 |
| | | 100.5 | 0.5 | 85.47 | 0.0 |
| | | 300 | 200 | 10.27 | 0.0 |
| | 150 | 150.01 | 0.01 | 85.77 | 0.0 |
| | | 150.1 | 0.1 | 85.74 | 0.0 |
| | | 150.5 | 0.5 | 85.57 | 0.0 |
| | | 300 | 150 | 16.14 | 0.0 |

Fig. 64

| | | | | 4 THz | |
|---|---|---|---|---|---|
| $a3(\mu m)$ | $d3(\mu m)$ | $p3(\mu m)$ | $i3(\mu m)$ | TM Transmission power (%) | Power extinction ratio (dB) |
| 1000 | 1 | 1.01 | 0.01 | 94.89 | <-100 |
| | | 1.1 | 0.1 | 92.69 | <-100 |
| | | 1.5 | 0.5 | 81.66 | <-100 |
| | | 11 | 10 | 6.44 | <-100 |
| | | 31 | 30 | 1.00 | <-100 |
| | | 300 | 299 | 0.01 | <-100 |
| | 5 | 5.01 | 0.01 | 95.08 | <-100 |
| | | 5.1 | 0.1 | 94.66 | <-100 |
| | | 5.5 | 0.5 | 92.78 | <-100 |
| | | 20 | 15 | 48.28 | <-100 |
| | | 85 | 80 | 2.70 | <-100 |
| | | 300 | 295 | 0.03 | <-100 |
| | 10 | 10.01 | 0.01 | 95.10 | <-100 |
| | | 10.1 | 0.1 | 94.90 | <-100 |
| | | 10.5 | 0.5 | 94.00 | <-100 |
| | | 50 | 40 | 100.00 | <-100 |
| | | 100 | 90 | 6.22 | <-100 |
| | | 300 | 290 | 0.03 | <-100 |
| | 23 | 23.01 | 0.01 | 95.12 | <-100 |
| | | 23.1 | 0.1 | 95.03 | <-100 |
| | | 23.5 | 0.5 | 94.65 | <-100 |
| | | 43 | 20 | 95.63 | <-100 |
| | | 123 | 100 | 9.61 | <-100 |
| | | 300 | 277 | 0.03 | <-100 |
| | 50 | 50.01 | 0.01 | 95.12 | 0.0 |
| | | 50.1 | 0.1 | 95.08 | 0.0 |
| | | 50.5 | 0.5 | 94.91 | 0.0 |
| | | 100 | 50 | 20.31 | 0.0 |
| | | 300 | 250 | 0.60 | 0.0 |
| | 100 | 100.01 | 0.01 | 95.12 | 0.0 |
| | | 100.1 | 0.1 | 95.10 | 0.0 |
| | | 100.5 | 0.5 | 95.01 | 0.0 |
| | | 300 | 200 | 7.73 | 0.0 |
| | 150 | 150.01 | 0.01 | 95.12 | 0.0 |
| | | 150.1 | 0.1 | 95.11 | 0.0 |
| | | 150.5 | 0.5 | 95.04 | 0.0 |
| | | 300 | 150 | 24.77 | 0.0 |

Fig. 65

| $a3(\mu m)$ | $d3(\mu m)$ | $p3(\mu m)$ | $t3(\mu m)$ | 5 THz | |
|---|---|---|---|---|---|
| | | | | TM Transmission power (%) | Power extinction ratio (dB) |
| 1000 | 1 | 1.01 | 0.01 | 99.77 | <-100 |
| | | 1.1 | 0.1 | 99.66 | <-100 |
| | | 1.5 | 0.5 | 98.84 | <-100 |
| | | 11 | 10 | 27.07 | <-100 |
| | | 31 | 30 | 2.83 | <-100 |
| | | 300 | 299 | 0.01 | <-100 |
| | 5 | 5.01 | 0.01 | 99.78 | <-100 |
| | | 5.1 | 0.1 | 99.76 | <-100 |
| | | 5.5 | 0.5 | 99.62 | <-100 |
| | | 20 | 15 | 48.21 | <-100 |
| | | 85 | 80 | 1.89 | <-100 |
| | | 300 | 295 | 0.02 | <-100 |
| | 10 | 10.01 | 0.01 | 99.78 | <-100 |
| | | 10.1 | 0.1 | 99.77 | <-100 |
| | | 10.5 | 0.5 | 99.70 | <-100 |
| | | 50 | 40 | 7.12 | <-100 |
| | | 100 | 90 | 2.51 | <-100 |
| | | 300 | 290 | 0.03 | <-100 |
| | 23 | 23.01 | 0.01 | 99.78 | 0.0 |
| | | 23.1 | 0.1 | 99.78 | 0.0 |
| | | 23.5 | 0.5 | 99.75 | 0.0 |
| | | 43 | 20 | 59.84 | 0.0 |
| | | 123 | 100 | 1.40 | 0.0 |
| | | 300 | 277 | 0.06 | 0.0 |
| | 50 | 50.01 | 0.01 | 99.78 | 0.0 |
| | | 50.1 | 0.1 | 99.78 | 0.0 |
| | | 50.5 | 0.5 | 99.74 | 0.0 |
| | | 100 | 50 | 25.14 | 0.0 |
| | | 300 | 250 | 2.49 | 0.0 |
| | 100 | 100.01 | 0.01 | 99.78 | 0.0 |
| | | 100.1 | 0.1 | 99.78 | 0.0 |
| | | 100.5 | 0.5 | 99.76 | 0.0 |
| | | 300 | 200 | 9.43 | 0.0 |
| | 150 | 150.01 | 0.01 | 99.78 | 0.0 |
| | | 150.1 | 0.1 | 99.78 | 0.0 |
| | | 150.5 | 0.5 | 99.77 | 0.0 |
| | | 300 | 150 | 21.64 | 0.0 |

Fig. 66

| $a3(\mu m)$ | $d3(\mu m)$ | $p3(\mu m)$ | $r3(\mu m)$ | 6 THz | |
|---|---|---|---|---|---|
| | | | | TM Transmission power (%) | Power extinction ratio (dB) |
| 1000 | 1 | 1.01 | 0.01 | 91.32 | <-100 |
| | | 1.1 | 0.1 | 87.71 | <-100 |
| | | 1.5 | 0.5 | 70.54 | <-100 |
| | | 11 | 10 | 2.38 | <-100 |
| | | 31 | 30 | 0.27 | <-100 |
| | | 300 | 299 | 0.00 | <-100 |
| | 5 | 5.01 | 0.01 | 91.63 | <-100 |
| | | 5.1 | 0.1 | 90.93 | <-100 |
| | | 5.5 | 0.5 | 87.58 | <-100 |
| | | 20 | 15 | 12.47 | <-100 |
| | | 85 | 80 | 0.54 | <-100 |
| | | 300 | 295 | 0.02 | <-100 |
| | 10 | 10.01 | 0.01 | 91.66 | <-100 |
| | | 10.1 | 0.1 | 91.32 | <-100 |
| | | 10.5 | 0.5 | 89.66 | <-100 |
| | | 50 | 40 | 0.01 | <-100 |
| | | 100 | 90 | 0.02 | <-100 |
| | | 300 | 290 | 0.03 | <-100 |
| | 23 | 23.01 | 0.01 | 91.69 | 0.0 |
| | | 23.1 | 0.1 | 91.54 | 0.0 |
| | | 23.5 | 0.5 | 90.82 | 0.0 |
| | | 43 | 20 | 30.20 | 0.0 |
| | | 123 | 100 | 3.20 | 0.0 |
| | | 300 | 277 | 0.08 | 0.0 |
| | 50 | 50.01 | 0.01 | 91.70 | 0.0 |
| | | 50.1 | 0.1 | 91.62 | 0.0 |
| | | 50.5 | 0.5 | 91.25 | 0.0 |
| | | 100 | 50 | 23.73 | 0.0 |
| | | 300 | 250 | 2.62 | 0.0 |
| | 100 | 100.01 | 0.01 | 91.70 | 0.0 |
| | | 100.1 | 0.1 | 91.66 | 0.0 |
| | | 100.5 | 0.5 | 91.48 | 0.0 |
| | | 300 | 200 | 10.24 | 0.0 |
| | 150 | 150.01 | 0.01 | 91.70 | 0.0 |
| | | 150.1 | 0.1 | 91.68 | 0.0 |
| | | 150.5 | 0.5 | 91.56 | 0.0 |
| | | 300 | 150 | 23.01 | 0.0 |

Fig. 67

| a3(μm) | d3(μm) | p3(μm) | r3(μm) | 7 THz | |
|---|---|---|---|---|---|
| | | | | TM Transmission power (%) | Power extinction ratio (dB) |
| 1000 | 1 | 1.01 | 0.01 | 83.59 | <-100 |
| | | 1.1 | 0.1 | 77.60 | <-100 |
| | | 1.5 | 0.5 | 54.20 | <-100 |
| | | 11 | 10 | 1.39 | <-100 |
| | | 31 | 30 | 0.17 | <-100 |
| | | 300 | 299 | 0.00 | <-100 |
| | 5 | 5.01 | 0.01 | 84.12 | <-100 |
| | | 5.1 | 0.1 | 82.93 | <-100 |
| | | 5.5 | 0.5 | 77.56 | <-100 |
| | | 20 | 15 | 9.87 | <-100 |
| | | 85 | 80 | 1.22 | <-100 |
| | | 300 | 295 | 0.02 | <-100 |
| | 10 | 10.01 | 0.01 | 84.19 | <-100 |
| | | 10.1 | 0.1 | 83.59 | <-100 |
| | | 10.5 | 0.5 | 80.90 | <-100 |
| | | 50 | 40 | 3.85 | <-100 |
| | | 100 | 90 | 1.21 | <-100 |
| | | 300 | 290 | 0.03 | <-100 |
| | 23 | 23.01 | 0.01 | 84.23 | 0.0 |
| | | 23.1 | 0.1 | 83.97 | 0.0 |
| | | 23.5 | 0.5 | 82.80 | 0.0 |
| | | 43 | 20 | 0.88 | 0.0 |
| | | 123 | 100 | 3.50 | 0.0 |
| | | 300 | 277 | 0.10 | 0.0 |
| | 50 | 50.01 | 0.01 | 84.24 | 0.0 |
| | | 50.1 | 0.1 | 84.12 | 0.0 |
| | | 50.5 | 0.5 | 83.57 | 0.0 |
| | | 100 | 50 | 22.37 | 0.0 |
| | | 300 | 250 | 2.17 | 0.0 |
| | 100 | 100.01 | 0.01 | 84.25 | 0.0 |
| | | 100.1 | 0.1 | 84.19 | 0.0 |
| | | 100.5 | 0.5 | 83.91 | 0.0 |
| | | 300 | 200 | 8.70 | 0.0 |
| | 150 | 150.01 | 0.01 | 84.25 | 0.0 |
| | | 150.1 | 0.1 | 84.21 | 0.0 |
| | | 150.5 | 0.5 | 84.03 | 0.0 |
| | | 300 | 150 | 20.13 | 0.0 |

Fig. 68

|  |  |  |  | 8 THz | |
|---|---|---|---|---|---|
| $a3(\mu m)$ | $d3(\mu m)$ | $p3(\mu m)$ | $t3(\mu m)$ | TM Transmission power (%) | Power extinction ratio (dB) |
| 1000 | 1 | 1.01 | 0.01 | 86.37 | <-100 |
|  |  | 1.1 | 0.1 | 81.21 | <-100 |
|  |  | 1.5 | 0.5 | 60.06 | <-100 |
|  |  | 11 | 10 | 2.11 | <-100 |
|  |  | 31 | 30 | 0.32 | <-100 |
|  |  | 300 | 299 | 0.00 | <-100 |
|  | 5 | 5.01 | 0.01 | 86.82 | <-100 |
|  |  | 5.1 | 0.1 | 85.81 | <-100 |
|  |  | 5.5 | 0.5 | 81.33 | <-100 |
|  |  | 20 | 15 | 21.25 | <-100 |
|  |  | 85 | 80 | 0.93 | <-100 |
|  |  | 300 | 295 | 0.02 | <-100 |
|  | 10 | 10.01 | 0.01 | 86.88 | <-100 |
|  |  | 10.1 | 0.1 | 86.37 | <-100 |
|  |  | 10.5 | 0.5 | 84.17 | <-100 |
|  |  | 50 | 40 | 6.00 | <-100 |
|  |  | 100 | 90 | 2.44 | <-100 |
|  |  | 300 | 290 | 0.03 | <-100 |
|  | 23 | 23.01 | 0.01 | 86.91 | 0.0 |
|  |  | 23.1 | 0.1 | 86.69 | 0.0 |
|  |  | 23.5 | 0.5 | 85.75 | 0.0 |
|  |  | 43 | 20 | 16.59 | 0.0 |
|  |  | 123 | 100 | 2.70 | 0.0 |
|  |  | 300 | 277 | 0.15 | 0.0 |
|  | 50 | 50.01 | 0.01 | 86.93 | 0.0 |
|  |  | 50.1 | 0.1 | 86.82 | 0.0 |
|  |  | 50.5 | 0.5 | 86.37 | 0.0 |
|  |  | 100 | 50 | 24.43 | 0.0 |
|  |  | 300 | 250 | 1.97 | 0.0 |
|  | 100 | 100.01 | 0.01 | 86.93 | 0.0 |
|  |  | 100.1 | 0.1 | 86.88 | 0.0 |
|  |  | 100.5 | 0.5 | 86.65 | 0.0 |
|  |  | 300 | 200 | 9.40 | 0.0 |
|  | 150 | 150.01 | 0.01 | 86.93 | 0.0 |
|  |  | 150.1 | 0.1 | 86.90 | 0.0 |
|  |  | 150.5 | 0.5 | 86.74 | 0.0 |
|  |  | 300 | 150 | 22.07 | 0.0 |

Fig. 69

|              |              |         |         | 9 THz | |
|--------------|--------------|---------|---------|-------|---|
| $a3(\mu m)$ | $d3(\mu m)$ | $p3(\mu m)$ | $r3(\mu m)$ | TM Transmission power (%) | Power extinction ratio (dB) |
| 1000 | 1 | 1.01 | 0.01 | 96.53 | <-100 |
| | | 1.1 | 0.1 | 95.03 | <-100 |
| | | 1.5 | 0.5 | 87.53 | <-100 |
| | | 11 | 10 | 16.37 | <-100 |
| | | 31 | 30 | 33.20 | <-100 |
| | | 300 | 299 | 0.01 | <-100 |
| | 5 | 5.01 | 0.01 | 96.66 | <-100 |
| | | 5.1 | 0.1 | 96.38 | <-100 |
| | | 5.5 | 0.5 | 95.20 | <-100 |
| | | 20 | 15 | 96.97 | <-100 |
| | | 85 | 80 | 2.44 | <-100 |
| | | 300 | 295 | 0.02 | <-100 |
| | 10 | 10.01 | 0.01 | 96.67 | <-100 |
| | | 10.1 | 0.1 | 96.54 | <-100 |
| | | 10.5 | 0.5 | 95.99 | <-100 |
| | | 50 | 40 | 9.07 | <-100 |
| | | 100 | 90 | 0.04 | <-100 |
| | | 300 | 290 | 0.03 | <-100 |
| | 23 | 23.01 | 0.01 | 96.68 | 0.0 |
| | | 23.1 | 0.1 | 96.62 | 0.0 |
| | | 23.5 | 0.5 | 96.39 | 0.0 |
| | | 43 | 20 | 23.30 | 0.0 |
| | | 123 | 100 | 3.53 | 0.0 |
| | | 300 | 277 | 0.29 | 0.0 |
| | 50 | 50.01 | 0.01 | 96.69 | 0.0 |
| | | 50.1 | 0.1 | 96.66 | 0.0 |
| | | 50.5 | 0.5 | 96.52 | 0.0 |
| | | 100 | 50 | 16.69 | 0.0 |
| | | 300 | 250 | 2.08 | 0.0 |
| | 100 | 100.01 | 0.01 | 96.69 | 0.0 |
| | | 100.1 | 0.1 | 96.67 | 0.0 |
| | | 100.5 | 0.5 | 96.59 | 0.0 |
| | | 300 | 200 | 11.01 | 0.0 |
| | 150 | 150.01 | 0.01 | 96.69 | 0.0 |
| | | 150.1 | 0.1 | 96.68 | 0.0 |
| | | 150.5 | 0.5 | 96.63 | 0.0 |
| | | 300 | 150 | 23.45 | 0.0 |

Fig. 70

| $a3(\mu m)$ | $d3(\mu m)$ | $p3(\mu m)$ | $t3(\mu m)$ | 10 THz ||
| --- | --- | --- | --- | --- | --- |
| | | | | TM Transmission power (%) | Power extinction ratio (dB) |
| 1000 | 1 | 1.01 | 0.01 | 99.10 | <-100 |
| | | 1.1 | 0.1 | 98.65 | <-100 |
| | | 1.5 | 0.5 | 95.57 | <-100 |
| | | 11 | 10 | 8.50 | <-100 |
| | | 31 | 30 | 0.61 | <-100 |
| | | 300 | 299 | 0.01 | <-100 |
| | 5 | 5.01 | 0.01 | 99.13 | <-100 |
| | | 5.1 | 0.1 | 99.05 | <-100 |
| | | 5.5 | 0.5 | 98.53 | <-100 |
| | | 20 | 15 | 15.89 | <-100 |
| | | 85 | 80 | 0.57 | <-100 |
| | | 300 | 295 | 0.02 | <-100 |
| | 10 | 10.01 | 0.01 | 99.14 | 0.0 |
| | | 10.1 | 0.1 | 99.10 | 0.0 |
| | | 10.5 | 0.5 | 98.84 | 0.0 |
| | | 50 | 40 | 5.88 | 0.0 |
| | | 100 | 90 | 1.14 | 0.0 |
| | | 300 | 290 | 0.03 | 0.0 |
| | 23 | 23.01 | 0.01 | 99.14 | 0.0 |
| | | 23.1 | 0.1 | 99.12 | 0.0 |
| | | 23.5 | 0.5 | 98.93 | 0.0 |
| | | 43 | 20 | 26.23 | 0.0 |
| | | 123 | 100 | 3.05 | 0.0 |
| | | 300 | 277 | 0.44 | 0.0 |
| | 50 | 50.01 | 0.01 | 99.14 | 0.0 |
| | | 50.1 | 0.1 | 99.13 | 0.0 |
| | | 50.5 | 0.5 | 99.03 | 0.0 |
| | | 100 | 50 | 23.89 | 0.0 |
| | | 300 | 250 | 2.39 | 0.0 |
| | 100 | 100.01 | 0.01 | 99.14 | 0.0 |
| | | 100.1 | 0.1 | 99.14 | 0.0 |
| | | 100.5 | 0.5 | 99.08 | 0.0 |
| | | 300 | 200 | 10.38 | 0.0 |
| | 150 | 150.01 | 0.01 | 99.14 | 0.0 |
| | | 150.1 | 0.1 | 99.14 | 0.0 |
| | | 150.5 | 0.5 | 99.10 | 0.0 |
| | | 300 | 150 | 24.93 | 0.0 |

Fig. 71

|  |  |  |  | 2 THz | |
|---|---|---|---|---|---|
| a3(μm) | d3(μm) | p3(μm) | t3(μm) | TM Transmission power (%) | Power extinction ratio (dB) |
| 2000 | 1 | 1.01 | 0.01 | 94.89 | <-100 |
| | | 1.1 | 0.1 | 92.68 | <-100 |
| | | 1.5 | 0.5 | 81.46 | <-100 |
| | | 11 | 10 | 5.68 | <-100 |
| | | 31 | 30 | 0.80 | <-100 |
| | | 300 | 299 | 0.01 | <-100 |
| | 5 | 5.01 | 0.01 | 95.08 | <-100 |
| | | 5.1 | 0.1 | 94.66 | <-100 |
| | | 5.5 | 0.5 | 92.73 | <-100 |
| | | 20 | 15 | 37.32 | <-100 |
| | | 85 | 80 | 5.91 | <-100 |
| | | 300 | 295 | 0.03 | <-100 |
| | 10 | 10.01 | 0.01 | 95.10 | <-100 |
| | | 10.1 | 0.1 | 94.90 | <-100 |
| | | 10.5 | 0.5 | 93.96 | <-100 |
| | | 50 | 40 | 42.35 | <-100 |
| | | 100 | 90 | 43.26 | <-100 |
| | | 300 | 290 | 0.03 | <-100 |
| | 23 | 23.01 | 0.01 | 95.12 | <-100 |
| | | 23.1 | 0.1 | 95.03 | <-100 |
| | | 23.5 | 0.5 | 94.63 | <-100 |
| | | 43 | 20 | 82.22 | <-100 |
| | | 123 | 100 | 45.89 | <-100 |
| | | 300 | 277 | 0.02 | <-100 |
| | 50 | 50.01 | 0.01 | 95.12 | 0.0 |
| | | 50.1 | 0.1 | 95.08 | 0.0 |
| | | 50.5 | 0.5 | 94.90 | 0.0 |
| | | 100 | 50 | 99.70 | 0.0 |
| | | 300 | 250 | 0.03 | 0.0 |
| | 100 | 100.01 | 0.01 | 95.12 | 0.0 |
| | | 100.1 | 0.1 | 95.10 | 0.0 |
| | | 100.5 | 0.5 | 95.01 | 0.0 |
| | | 300 | 200 | 1.22 | 0.0 |
| | 150 | 150.01 | 0.01 | 95.12 | 0.0 |
| | | 150.1 | 0.1 | 95.11 | 0.0 |
| | | 150.5 | 0.5 | 95.04 | 0.0 |
| | | 300 | 150 | 25.98 | 0.0 |

Fig. 72

|  |  |  |  | 3 THz | |
|---|---|---|---|---|---|
| a3(μm) | d3(μm) | p3(μm) | r3(μm) | TM Transmission power (%) | Power extinction ratio (dB) |
| 2000 | 1 | 1.01 | 0.01 | 91.32 | <-100 |
| | | 1.1 | 0.1 | 87.73 | <-100 |
| | | 1.5 | 0.5 | 70.80 | <-100 |
| | | 11 | 10 | 2.64 | <-100 |
| | | 31 | 30 | 0.32 | <-100 |
| | | 300 | 299 | 0.00 | <-100 |
| | 5 | 5.01 | 0.01 | 91.63 | <-100 |
| | | 5.1 | 0.1 | 90.93 | <-100 |
| | | 5.5 | 0.5 | 87.66 | <-100 |
| | | 20 | 15 | 15.42 | <-100 |
| | | 85 | 80 | 0.62 | <-100 |
| | | 300 | 295 | 0.02 | <-100 |
| | 10 | 10.01 | 0.01 | 91.66 | <-100 |
| | | 10.1 | 0.1 | 91.32 | <-100 |
| | | 10.5 | 0.5 | 89.71 | <-100 |
| | | 50 | 40 | 7.50 | <-100 |
| | | 100 | 90 | 0.02 | <-100 |
| | | 300 | 290 | 0.03 | <-100 |
| | 23 | 23.01 | 0.01 | 91.69 | <-100 |
| | | 23.1 | 0.1 | 91.54 | <-100 |
| | | 23.5 | 0.5 | 90.84 | <-100 |
| | | 43 | 20 | 45.71 | <-100 |
| | | 123 | 100 | 3.96 | <-100 |
| | | 300 | 277 | 0.03 | <-100 |
| | 50 | 50.01 | 0.01 | 91.70 | 0.0 |
| | | 50.1 | 0.1 | 91.63 | 0.0 |
| | | 50.5 | 0.5 | 91.31 | 0.0 |
| | | 100 | 50 | 0.38 | 0.0 |
| | | 300 | 250 | 0.15 | 0.0 |
| | 100 | 100.01 | 0.01 | 91.70 | 0.0 |
| | | 100.1 | 0.1 | 91.66 | 0.0 |
| | | 100.5 | 0.5 | 91.50 | 0.0 |
| | | 300 | 200 | 10.52 | 0.0 |
| | 150 | 150.01 | 0.01 | 91.70 | 0.0 |
| | | 150.1 | 0.1 | 91.68 | 0.0 |
| | | 150.5 | 0.5 | 91.57 | 0.0 |
| | | 300 | 150 | 16.13 | 0.0 |

Fig. 73

| | | | | 4 THz | |
|---|---|---|---|---|---|
| $a3(\mu m)$ | $d3(\mu m)$ | $p3(\mu m)$ | $t3(\mu m)$ | TM Transmission power (%) | Power extinction ratio (dB) |
| 2000 | 1 | 1.01 | 0.01 | 86.37 | <-100 |
| | | 1.1 | 0.1 | 81.19 | <-100 |
| | | 1.5 | 0.5 | 59.86 | <-100 |
| | | 11 | 10 | 1.93 | <-100 |
| | | 31 | 30 | 0.26 | <-100 |
| | | 300 | 299 | 0.00 | <-100 |
| | 5 | 5.01 | 0.01 | 86.82 | <-100 |
| | | 5.1 | 0.1 | 85.80 | <-100 |
| | | 5.5 | 0.5 | 81.25 | <-100 |
| | | 20 | 15 | 15.39 | <-100 |
| | | 85 | 80 | 0.91 | <-100 |
| | | 300 | 295 | 0.02 | <-100 |
| | 10 | 10.01 | 0.01 | 86.88 | <-100 |
| | | 10.1 | 0.1 | 86.37 | <-100 |
| | | 10.5 | 0.5 | 84.12 | <-100 |
| | | 50 | 40 | 18.53 | <-100 |
| | | 100 | 90 | 2.74 | <-100 |
| | | 300 | 290 | 0.03 | <-100 |
| | 23 | 23.01 | 0.01 | 86.91 | <-100 |
| | | 23.1 | 0.1 | 86.69 | <-100 |
| | | 23.5 | 0.5 | 85.72 | <-100 |
| | | 43 | 20 | 58.11 | <-100 |
| | | 123 | 100 | 7.48 | <-100 |
| | | 300 | 277 | 0.03 | <-100 |
| | 50 | 50.01 | 0.01 | 86.93 | 0.0 |
| | | 50.1 | 0.1 | 86.82 | 0.0 |
| | | 50.5 | 0.5 | 86.38 | 0.0 |
| | | 100 | 50 | 19.21 | 0.0 |
| | | 300 | 250 | 0.57 | 0.0 |
| | 100 | 100.01 | 0.01 | 86.93 | 0.0 |
| | | 100.1 | 0.1 | 86.88 | 0.0 |
| | | 100.5 | 0.5 | 86.65 | 0.0 |
| | | 300 | 200 | 7.49 | 0.0 |
| | 150 | 150.01 | 0.01 | 86.93 | 0.0 |
| | | 150.1 | 0.1 | 86.90 | 0.0 |
| | | 150.5 | 0.5 | 86.75 | 0.0 |
| | | 300 | 150 | 22.46 | 0.0 |

Fig. 74

|  |  |  |  | 5 THz | |
|---|---|---|---|---|---|
| a3(μm) | d3(μm) | p3(μm) | t3(μm) | TM Transmission power (%) | Power extinction ratio (dB) |
| 2000 | 1 | 1.01 | 0.01 | 99.10 | <-100 |
| | | 1.1 | 0.1 | 98.67 | <-100 |
| | | 1.5 | 0.5 | 95.92 | <-100 |
| | | 11 | 10 | 13.69 | <-100 |
| | | 31 | 30 | 1.44 | <-100 |
| | | 300 | 299 | 0.01 | <-100 |
| | 5 | 5.01 | 0.01 | 99.13 | <-100 |
| | | 5.1 | 0.1 | 99.05 | <-100 |
| | | 5.5 | 0.5 | 98.61 | <-100 |
| | | 20 | 15 | 35.99 | <-100 |
| | | 85 | 80 | 1.44 | <-100 |
| | | 300 | 295 | 0.02 | <-100 |
| | 10 | 10.01 | 0.01 | 99.14 | <-100 |
| | | 10.1 | 0.1 | 99.10 | <-100 |
| | | 10.5 | 0.5 | 98.88 | <-100 |
| | | 50 | 40 | 6.24 | <-100 |
| | | 100 | 90 | 2.14 | <-100 |
| | | 300 | 290 | 0.03 | <-100 |
| | 23 | 23.01 | 0.01 | 99.14 | 0.0 |
| | | 23.1 | 0.1 | 99.12 | 0.0 |
| | | 23.5 | 0.5 | 99.03 | 0.0 |
| | | 43 | 20 | 53.58 | 0.0 |
| | | 123 | 100 | 1.40 | 0.0 |
| | | 300 | 277 | 0.06 | 0.0 |
| | 50 | 50.01 | 0.01 | 99.14 | 0.0 |
| | | 50.1 | 0.1 | 99.13 | 0.0 |
| | | 50.5 | 0.5 | 99.06 | 0.0 |
| | | 100 | 50 | 24.84 | 0.0 |
| | | 300 | 250 | 2.46 | 0.0 |
| | 100 | 100.01 | 0.01 | 99.14 | 0.0 |
| | | 100.1 | 0.1 | 99.14 | 0.0 |
| | | 100.5 | 0.5 | 99.10 | 0.0 |
| | | 300 | 200 | 9.35 | 0.0 |
| | 150 | 150.01 | 0.01 | 99.14 | 0.0 |
| | | 150.1 | 0.1 | 99.14 | 0.0 |
| | | 150.5 | 0.5 | 99.12 | 0.0 |
| | | 300 | 150 | 21.49 | 0.0 |

Fig. 75

| $a3(\mu m)$ | $d3(\mu m)$ | $p3(\mu m)$ | $t3(\mu m)$ | 6 THz ||
| --- | --- | --- | --- | --- | --- |
| | | | | TM Transmission power (%) | Power extinction ratio (dB) |
| 2000 | 1 | 1.01 | 0.01 | 83.26 | <-100 |
| | | 1.1 | 0.1 | 77.19 | <-100 |
| | | 1.5 | 0.5 | 53.69 | <-100 |
| | | 11 | 10 | 1.40 | <-100 |
| | | 31 | 30 | 0.18 | <-100 |
| | | 300 | 299 | 0.00 | <-100 |
| | 5 | 5.01 | 0.01 | 83.80 | <-100 |
| | | 5.1 | 0.1 | 82.59 | <-100 |
| | | 5.5 | 0.5 | 77.18 | <-100 |
| | | 20 | 15 | 10.25 | <-100 |
| | | 85 | 80 | 0.62 | <-100 |
| | | 300 | 295 | 0.02 | <-100 |
| | 10 | 10.01 | 0.01 | 83.87 | <-100 |
| | | 10.1 | 0.1 | 83.26 | <-100 |
| | | 10.5 | 0.5 | 80.55 | <-100 |
| | | 50 | 40 | 0.00 | <-100 |
| | | 100 | 90 | 0.01 | <-100 |
| | | 300 | 290 | 0.03 | <-100 |
| | 23 | 23.01 | 0.01 | 83.91 | 0.0 |
| | | 23.1 | 0.1 | 83.64 | 0.0 |
| | | 23.5 | 0.5 | 82.47 | 0.0 |
| | | 43 | 20 | 45.12 | 0.0 |
| | | 123 | 100 | 3.19 | 0.0 |
| | | 300 | 277 | 0.06 | 0.0 |
| | 50 | 50.01 | 0.01 | 83.92 | 0.0 |
| | | 50.1 | 0.1 | 83.80 | 0.0 |
| | | 50.5 | 0.5 | 83.23 | 0.0 |
| | | 100 | 50 | 21.91 | 0.0 |
| | | 300 | 250 | 2.43 | 0.0 |
| | 100 | 100.01 | 0.01 | 83.93 | 0.0 |
| | | 100.1 | 0.1 | 83.87 | 0.0 |
| | | 100.5 | 0.5 | 83.59 | 0.0 |
| | | 300 | 200 | 9.49 | 0.0 |
| | 150 | 150.01 | 0.01 | 83.93 | 0.0 |
| | | 150.1 | 0.1 | 83.89 | 0.0 |
| | | 150.5 | 0.5 | 83.70 | 0.0 |
| | | 300 | 150 | 21.20 | 0.0 |

Fig. 76

| | | | | 7 THz | |
|---|---|---|---|---|---|
| a3(μm) | d3(μm) | p3(μm) | r3(μm) | TM Transmission power (%) | Power extinction ratio (dB) |
| 2000 | 1 | 1.01 | 0.01 | 97.94 | <-100 |
| | | 1.1 | 0.1 | 97.03 | <-100 |
| | | 1.5 | 0.5 | 92.33 | <-100 |
| | | 11 | 10 | 25.89 | <-100 |
| | | 31 | 30 | 12.08 | <-100 |
| | | 300 | 299 | 0.01 | <-100 |
| | 5 | 5.01 | 0.01 | 98.02 | <-100 |
| | | 5.1 | 0.1 | 97.85 | <-100 |
| | | 5.5 | 0.5 | 97.14 | <-100 |
| | | 20 | 15 | 99.31 | <-100 |
| | | 85 | 80 | 0.33 | <-100 |
| | | 300 | 295 | 0.02 | <-100 |
| | 10 | 10.01 | 0.01 | 98.02 | <-100 |
| | | 10.1 | 0.1 | 97.94 | <-100 |
| | | 10.5 | 0.5 | 97.62 | <-100 |
| | | 50 | 40 | 5.28 | <-100 |
| | | 100 | 90 | 2.29 | <-100 |
| | | 300 | 290 | 0.03 | <-100 |
| | 23 | 23.01 | 0.01 | 98.03 | 0.0 |
| | | 23.1 | 0.1 | 97.99 | 0.0 |
| | | 23.5 | 0.5 | 97.87 | 0.0 |
| | | 43 | 20 | 1.16 | 0.0 |
| | | 123 | 100 | 4.56 | 0.0 |
| | | 300 | 277 | 0.11 | 0.0 |
| | 50 | 50.01 | 0.01 | 98.03 | 0.0 |
| | | 50.1 | 0.1 | 98.01 | 0.0 |
| | | 50.5 | 0.5 | 97.92 | 0.0 |
| | | 100 | 50 | 28.10 | 0.0 |
| | | 300 | 250 | 2.46 | 0.0 |
| | 100 | 100.01 | 0.01 | 98.03 | 0.0 |
| | | 100.1 | 0.1 | 98.02 | 0.0 |
| | | 100.5 | 0.5 | 97.98 | 0.0 |
| | | 300 | 200 | 9.82 | 0.0 |
| | 150 | 150.01 | 0.01 | 98.03 | 0.0 |
| | | 150.1 | 0.1 | 98.03 | 0.0 |
| | | 150.5 | 0.5 | 97.99 | 0.0 |
| | | 300 | 150 | 23.12 | 0.0 |

Fig. 77

|  |  |  |  | 8 THz | |
|---|---|---|---|---|---|
| a3(μm) | d3(μm) | p3(μm) | t3(μm) | TM Transmission power (%) | Power extinction ratio (dB) |
| 2000 | 1 | 1.01 | 0.01 | 87.93 | <-100 |
| | | 1.1 | 0.1 | 83.17 | <-100 |
| | | 1.5 | 0.5 | 62.45 | <-100 |
| | | 11 | 10 | 1.71 | <-100 |
| | | 31 | 30 | 0.19 | <-100 |
| | | 300 | 299 | 0.00 | <-100 |
| | 5 | 5.01 | 0.01 | 88.34 | <-100 |
| | | 5.1 | 0.1 | 87.40 | <-100 |
| | | 5.5 | 0.5 | 83.02 | <-100 |
| | | 20 | 15 | 9.61 | <-100 |
| | | 85 | 80 | 0.48 | <-100 |
| | | 300 | 295 | 0.02 | <-100 |
| | 10 | 10.01 | 0.01 | 88.39 | <-100 |
| | | 10.1 | 0.1 | 87.92 | <-100 |
| | | 10.5 | 0.5 | 85.74 | <-100 |
| | | 50 | 40 | 4.41 | <-100 |
| | | 100 | 90 | 1.13 | <-100 |
| | | 300 | 290 | 0.03 | <-100 |
| | 23 | 23.01 | 0.01 | 88.42 | 0.0 |
| | | 23.1 | 0.1 | 88.21 | 0.0 |
| | | 23.5 | 0.5 | 87.26 | 0.0 |
| | | 43 | 20 | 16.37 | 0.0 |
| | | 123 | 100 | 2.60 | 0.0 |
| | | 300 | 277 | 0.16 | 0.0 |
| | 50 | 50.01 | 0.01 | 88.43 | 0.0 |
| | | 50.1 | 0.1 | 88.34 | 0.0 |
| | | 50.5 | 0.5 | 87.88 | 0.0 |
| | | 100 | 50 | 22.45 | 0.0 |
| | | 300 | 250 | 1.96 | 0.0 |
| | 100 | 100.01 | 0.01 | 88.43 | 0.0 |
| | | 100.1 | 0.1 | 88.39 | 0.0 |
| | | 100.5 | 0.5 | 88.16 | 0.0 |
| | | 300 | 200 | 9.24 | 0.0 |
| | 150 | 150.01 | 0.01 | 88.44 | 0.0 |
| | | 150.1 | 0.1 | 88.40 | 0.0 |
| | | 150.5 | 0.5 | 88.25 | 0.0 |
| | | 300 | 150 | 22.13 | 0.0 |

Fig. 78

| $a3(\mu m)$ | $d3(\mu m)$ | $p3(\mu m)$ | $t3(\mu m)$ | 9 THz ||
|---|---|---|---|---|---|
| | | | | TM Transmission power (%) | Power extinction ratio (dB) |
| 2000 | 1 | 1.01 | 0.01 | 89.43 | <-100 |
| | | 1.1 | 0.1 | 85.25 | <-100 |
| | | 1.5 | 0.5 | 67.06 | <-100 |
| | | 11 | 10 | 3.22 | <-100 |
| | | 31 | 30 | 0.73 | <-100 |
| | | 300 | 299 | 0.00 | <-100 |
| | 5 | 5.01 | 0.01 | 89.79 | <-100 |
| | | 5.1 | 0.1 | 88.98 | <-100 |
| | | 5.5 | 0.5 | 85.44 | <-100 |
| | | 20 | 15 | 41.94 | <-100 |
| | | 85 | 80 | 1.79 | <-100 |
| | | 300 | 295 | 0.02 | <-100 |
| | 10 | 10.01 | 0.01 | 89.84 | <-100 |
| | | 10.1 | 0.1 | 89.44 | <-100 |
| | | 10.5 | 0.5 | 87.71 | <-100 |
| | | 50 | 40 | 8.07 | <-100 |
| | | 100 | 90 | 0.02 | <-100 |
| | | 300 | 290 | 0.03 | <-100 |
| | 23 | 23.01 | 0.01 | 89.87 | 0.0 |
| | | 23.1 | 0.1 | 89.69 | 0.0 |
| | | 23.5 | 0.5 | 88.96 | 0.0 |
| | | 43 | 20 | 22.39 | 0.0 |
| | | 123 | 100 | 3.32 | 0.0 |
| | | 300 | 277 | 0.29 | 0.0 |
| | 50 | 50.01 | 0.01 | 89.88 | 0.0 |
| | | 50.1 | 0.1 | 89.79 | 0.0 |
| | | 50.5 | 0.5 | 89.44 | 0.0 |
| | | 100 | 50 | 16.41 | 0.0 |
| | | 300 | 250 | 2.02 | 0.0 |
| | 100 | 100.01 | 0.01 | 89.88 | 0.0 |
| | | 100.1 | 0.1 | 89.84 | 0.0 |
| | | 100.5 | 0.5 | 89.65 | 0.0 |
| | | 300 | 200 | 10.23 | 0.0 |
| | 150 | 150.01 | 0.01 | 89.88 | 0.0 |
| | | 150.1 | 0.1 | 89.85 | 0.0 |
| | | 150.5 | 0.5 | 89.73 | 0.0 |
| | | 300 | 150 | 21.99 | 0.0 |

Fig. 79

| $a3(\mu m)$ | $d3(\mu m)$ | $p3(\mu m)$ | $t3(\mu m)$ | 10 THz | |
|---|---|---|---|---|---|
| | | | | TM Transmission power (%) | Power extinction ratio (dB) |
| 2000 | 1 | 1.01 | 0.01 | 96.65 | <-100 |
| | | 1.1 | 0.1 | 95.10 | <-100 |
| | | 1.5 | 0.5 | 86.07 | <-100 |
| | | 11 | 10 | 4.06 | <-100 |
| | | 31 | 30 | 0.38 | <-100 |
| | | 300 | 299 | 0.00 | <-100 |
| | 5 | 5.01 | 0.01 | 96.77 | <-100 |
| | | 5.1 | 0.1 | 96.48 | <-100 |
| | | 5.5 | 0.5 | 94.90 | <-100 |
| | | 20 | 15 | 11.80 | <-100 |
| | | 85 | 80 | 0.47 | <-100 |
| | | 300 | 295 | 0.02 | <-100 |
| | 10 | 10.01 | 0.01 | 96.79 | 0.0 |
| | | 10.1 | 0.1 | 96.64 | 0.0 |
| | | 10.5 | 0.5 | 95.86 | 0.0 |
| | | 50 | 40 | 5.11 | 0.0 |
| | | 100 | 90 | 1.05 | 0.0 |
| | | 300 | 290 | 0.03 | 0.0 |
| | 23 | 23.01 | 0.01 | 96.80 | 0.0 |
| | | 23.1 | 0.1 | 96.73 | 0.0 |
| | | 23.5 | 0.5 | 96.31 | 0.0 |
| | | 43 | 20 | 25.53 | 0.0 |
| | | 123 | 100 | 2.98 | 0.0 |
| | | 300 | 277 | 0.43 | 0.0 |
| | 50 | 50.01 | 0.01 | 96.80 | 0.0 |
| | | 50.1 | 0.1 | 96.77 | 0.0 |
| | | 50.5 | 0.5 | 96.57 | 0.0 |
| | | 100 | 50 | 23.25 | 0.0 |
| | | 300 | 250 | 2.33 | 0.0 |
| | 100 | 100.01 | 0.01 | 96.80 | 0.0 |
| | | 100.1 | 0.1 | 96.79 | 0.0 |
| | | 100.5 | 0.5 | 96.69 | 0.0 |
| | | 300 | 200 | 10.14 | 0.0 |
| | 150 | 150.01 | 0.01 | 96.80 | 0.0 |
| | | 150.1 | 0.1 | 96.79 | 0.0 |
| | | 150.5 | 0.5 | 96.72 | 0.0 |
| | | 300 | 150 | 24.27 | 0.0 |

Fig. 80

WIRE GRID DEVICE

TECHNICAL FIELD

This invention relates to a wire grid device mainly used for a purpose such as polarizing or analyzing of a terahertz electromagnetic wave.

BACKGROUND ART

A terahertz electromagnetic wave is an electromagnetic wave having a frequency from 0.1 to 10 THz (wavelength from 30 to 3000 µm). This wavelength is substantially the same as a range from the wavelength of a far-infrared wave to that of a millimeter wave. The terahertz electromagnetic wave exists in a frequency range between the frequency of "light" and that of a "millimeter wave." Thus, the terahertz electromagnetic wave has both an ability to identify an object with a spatial resolution as high as that of light and an ability comparable to that of a millimeter wave to pass through a substance. An electromagnetic wave in the terahertz wave band has not been explored so far. Meanwhile, application for example to characterization of a material has been examined that is to be achieved by time-domain spectroscopy, imaging, and tomography utilizing the characteristics of the electromagnetic wave in this frequency band. The terahertz electromagnetic wave has both the performance of passing through a substance and straightness. Thus, using the terahertz electromagnetic wave instead of an X-ray allows safe and innovative imaging or ultrahigh-speed radio communication of some hundreds of Gbps.

Use of a wire grid mainly for a purpose such as polarizing or analyzing of a terahertz electromagnetic wave has conventionally been suggested. Researches have been advanced to achieve such a wire grid.

According to one example of a conventional free-standing wire grid, the wire grid is formed by aligning metal thin lines of a diameter from about 5 to about 50 µm one by one in a parallel fashion at a prescribed interval and affixing the metal thin lines with an adhesive to a meal frame. This free-standing wire grid encounters a limit on an applicable frequency. The free-standing wire grid, applicable as a polarizer for a terahertz electromagnetic wave of about 1.5 THz or more, is generally required to have a fine structure, which is difficult to achieve.

Patent literature 1 discloses a metal plate for a wire grid applicable as a polarizer for a terahertz wave band. FIG. 81 is a perspective view showing the structure of a metal plate 101 for a wire grid disclosed in this literature. FIG. 82 is a plan view showing a part of the metal plate 101 for a wire grid in an enlarged manner. FIG. 83A is a plan view showing a part of FIG. 82 in a further enlarged manner. FIG. 83B is a sectional view taken along cutting line A-A of FIG. 83A.

The metal plate 101 for a wire grid is made of nickel and has a circular plate shape of a diameter from about 20 to about 100 mm, for example. As shown in the drawings from FIG. 81 to FIGS. 83A and 83B, the metal plate 101 includes a plurality of vertical bridge parts 111 extending in the vertical direction in a bridge pattern (thin-line pattern) and at least one cross bridge part 112 substantially orthogonal to each vertical bridge part 111. The vertical bridge parts 111 and the cross bridge part 112 each have opposite ends connected to a flange part 113 of a circular or rectangular shape.

The width of the vertical bridge parts 111 (wire width) and the interval between the vertical bridge parts 111 are parameters that determine the performance of the metal plate 101 for a wire grid and are defined according to the frequency of light to be applied. The metal plate 101 for a wire grid may have a structure applicable to a terahertz electromagnetic wave of 1.5 THz or more and the vertical bridge parts 111 may have a width Wa that can be from 1.5 to 50 µm.

In the metal plate 101 for a wire grid, the cross bridge part 112 has a width at least not falling below a given width and not falling below the width of the vertical bridge parts 111. This allows manufacture of the vertical bridge parts 111 of a thin-line structure having the width Wa from 1.5 to 50 µm. The metal plate 101 for a wire grid has a thickness that should be determined in consideration of physical strength against separation from a substrate, for example, or degradation of the characteristics of transmitted light. This thickness is set at 10 µm.

The width Wa of the vertical bridge parts 111 is determined uniquely as a parameter that determines the performance of the metal plate 101 for a wire grid. A parameter about the cross bridge part 112 such as a width Wb of the cross bridge part 112 or an interval between the cross bridge parts 112 (the number of the cross bridge parts 112) is determined mainly in light of assuring the strength of the metal plate 101 for a wire grid. Thus, the width Wb of the cross bridge part 112 is set not to fall below the width of the vertical bridge parts 111. More specifically, the width Wa of the vertical bridge parts 111 is set in a range from 1.5 to 50 µm. The width of the cross bridge part 112 is set at 15 µm or more to be larger than that of the vertical bridge parts 111.

FIG. 84 shows characteristics obtained by using the metal plate 101 for a wire grid where the width Wa of the vertical bridge parts 111 is 20 µm, the interval between the vertical bridge parts 111 is 60 µm, the width Wb of the cross bridge part 112 is 20 µm, the interval between the cross bridge parts 112 is 5 mm, and the thickness of the metal plate 101 is 50 µm. As understood from a characteristic line $\alpha 2$ corresponding to transmissive arrangement and a characteristic line $\beta 2$ corresponding to blocking arrangement shown in FIG. 84, the metal plate 101 operates as a polarizer for terahertz light (synonymous with a terahertz wave) at a frequency from 0.1 to 1.5 THz. In this case, if an amplitude direction of the electric field of the terahertz light is orthogonal to the vertical direction in which the vertical bridge parts 111 extend, the transmissive arrangement is produced. If the amplitude direction of the electric field of the terahertz light agrees with the vertical direction in which the vertical bridge parts 111 extend, the blocking arrangement is produced.

According to the description of non-patent literature 1, a wire grid in a terahertz band is formed by using metal pieces of a width of 100 µm and aligned with a pitch of 200 µm. A blocking rate is measured with the thickness of the metal pieces changed between 0.05 mm, 0.1 mm, 0.2 mm, and 0.5 mm. A highest blocking rate is obtained with the largest thickness of the metal pieces, which is 0.5 mm. Transmittance obtained with this blocking rate is found to be about 0.01%.

PRIOR ART LITERATURE

Patent Literature

Patent Literature 1: Publication of Japanese Patent No. 5141320

Non-Patent Literature

"Influence of Metal Thickness of Wire Grid in THz Band Over Blocking Characteristics," written by Takashi Fujii and Naoki Matsumoto, Extended Abstracts (70th Scientific Meeting) of the Japan Society of Applied Physics, Vol. 3, Published in Japan, Sep. 8, 2009, 1022

SUMMARY OF INVENTION

Problem to be Solved by Invention

A wire grid device to operate as a polarizer for a terahertz wave has been required to have characteristics corresponding to transmission power of about 40% or more and an extinction ratio in −50 dB class in terms of transmission power characteristics and a power extinction ratio. However, the metal plate 101 for a wire grid described in patent literature 1 and the wire grid in a terahertz band described in non-patent literature 1 cannot achieve such high transmission power characteristics and such a high power extinction ratio.

It is therefore an object of this invention to provide a wire grid device capable of easily achieving transmission power characteristics and a power extinction ratio using a single element that cannot be achieved by a conventional wire grid device.

Solution to Problem

To achieve the aforementioned object, a wire grid device according to this invention is a wire grid device for a terahertz wave band comprising a plurality of slits and grids each formed between the slits. The slits are formed in a conductive frame of a rectangular parallelepiped having a given depth and extending parallel to one side of the frame. The grids form parallel flat plates. This wire grid device is principally characterized in that, with a depth a of the frame set at about 50 μm, a width d of each of the slits is set in a range from about 10 to about 50 μm, and a period p of each of the grids is set in a range from about 11 to about 50 μm. With the depth a of the frame set in a range from about 1000 to about 3000 μm, the width d of each of the slits is set in a range from about 10 to about 150 μm and the period p of each of the grids is set in a range from about 11 to about 300 μm.

A different wire grid device according to this invention is a wire grid device for a terahertz wave band. In this wire grid device, a cutout is formed between one end and an opposite end of a rectangular metal thin plate to form a plurality of grid plates each having an elongated grid part between the one end and the opposite end. The grid plates are stacked in such a manner that the grid parts are spaced at a given interval and face each other. This wire grid device is principally characterized in that spacers are inserted between one ends and between opposite ends of adjacent ones of the grid plates to form a slit between the grid parts of the adjacent grid plates, thereby forming a grid plate stack. The grid parts of the grid plate stack form parallel flat plates.

The different wire grid device according to this invention may comprise: a lower base like a flat plate having a screw part formed in each of opposite sides of the lower base; and an upper base like a flat plate having a hole formed in each of opposite sides of the upper base so as to correspond to a position where the screw part is formed. A through hole may be formed in each of the one end and the opposite end of each of the grid plates so as to correspond to the position where the screw part is formed and a position where the hole is formed. Each of the spacers may have a through hole. The wire grid device may be assembled by placing the grid plate stack between the lower base and the upper base, passing attachment means penetrating the hole in the upper base through the through hole in each of the grid plates of the grid plate stack and through the through hole in each of the spacers of the grid plate stack in order to threadedly engage the attachment means with the screw part in the lower base.

In the different wire grid device according to this invention, with a width a of each of the grid parts corresponding to the length of each of the parallel flat plates in a propagation direction set at about 50 μm, an interval d between the grid parts may be set in a range from about 10 to about 50 μm and a period p of arrangement of each of the grid parts may be set in a range from about 11 to about 50 μm. With the width a of each of the grid parts set in a range from about 1000 to about 3000 μm, the interval d may be set in a range from about 10 to about 150 μm and the period p may be set in a range from about 11 to about 300 μm.

In the different wire grid device according to this invention, with the width a of each of the grid parts corresponding to the length of each of the parallel flat plates in a propagation direction set in a range from 50 to 3000 μm, for making the wire grid device operate as a polarizer for a terahertz wave band in a frequency band from 3 to 10 THz, an allowable range of the interval d may be from about 1 to about 10 μm and an allowable range of the period p may be from about 2 to about 20 μm.

A still different grid device according to this invention is a wire grid device for a terahertz wave band comprising parallel flat plates configured by stacking a plurality of film substrates formed of rectangular films each having an elongated rectangular metal thin plate formed on a substantially central portion of one surface of the film. This wire grid device is principally characterized in that, with a width a of the metal thin plate corresponding to a length in a propagation direction set at about 50 μm, an interval d between the film substrates is set in a range from about 10 to about 50 μm and a period p of stacking of each of the film substrates is set in a range from about 10.01 to about 100 μm. With the width a of the metal thin plate set in a range from about 1000 to about 2000 μm, the interval d between the film substrates is set in a range from about 10 to about 150 μm and the period p of stacking of each of the film substrates is set in a range from about 10.01 to about 300 μm.

The still different wire grid device according to this invention may comprise: a base having a bottom like a flat plate and a plurality of upright columns extending vertically from the upper surface of the bottom; a film substrate stack formed of the plurality of stacked film substrates each having cutouts formed in positions corresponding to the positions of the upright columns of the base; and a retainer plate having a flat plate part like a flat plate and cutouts formed in positions of the flat plate part corresponding to the positions of the upright columns of the base. The film substrate stack may be housed in the base while being aligned with the base using the plurality of upright columns, the retainer plate may be placed on the film substrate stack, and a screw penetrating the retainer plate may be threadedly engaged with the base.

In the still different wire grid device according to this invention, with the width a of each of the metal thin plates corresponding to the length of each of the parallel flat plates in a propagation direction set in a range from 50 to 2000 μm, for making the wire grid device operate as a polarizer for a terahertz wave band in a frequency band from 2 to 10 THz, an allowable range of the interval d may be from about 1 to about 5 μm and an allowable range of the period p may be from about 1.01 to about 20 μm.

In the still different wire grid device according to this invention, with the width a of each of the metal thin plates corresponding to the length of each of the parallel flat plates in a propagation direction set in a range from 50 to 2000 µm, for making the wire grid device operate as a polarizer for a terahertz wave band in a frequency band from 2 to 4 THz, an allowable range of the interval d may be from about 1 to about 23 µm and an allowable range of the period p may be from about 1.01 to about 43 µm.

Advantageous Effect of Invention

Setting the length of each of the parallel flat plates in the propagation direction at 1000 µm or more makes the wire grid device according to this invention operate as a polarizer for a terahertz wave band achieving transmission power of about 40% or more and an extinction ratio exceeding −100 dB in many frequency ranges from 0.1 to 1.5 THz. Specifically, the wire grid device according to this invention is capable of easily achieving transmission power characteristics and a power extinction ratio using a single element that cannot be achieved by a conventional wire grid device.

The cutout is formed between the one end and the opposite end of the rectangular metal thin plate to form the plurality of grid plates each having the elongated grid part between the one end and the opposite end. The spacers are inserted between the one ends and between the opposite ends of adjacent ones of the grid plates and the grid plates are stacked in such a manner that the grid parts are spaced at a given interval and face each other, thereby forming the grid plate stack. The grid parts of the grid plate stack form the parallel flat plates. Thus, the wire grid device for a terahertz wave band can be formed easily at high yields to allow cost reduction.

The film substrate stack is formed of the plurality of stacked film substrates each having the cutouts formed in positions corresponding to the positions of the upright columns of the base. The film substrate stack is housed in the base, the retainer plate is placed on the film substrate stack, and the screw penetrating the retainer plate is threadedly engaged with the base. By doing so, the metal thin plates on the film substrates of the film substrate stack form the parallel flat plates. Thus, the wire grid device for a terahertz wave band can be formed easily at high yields to allow cost reduction.

BRIEF DESCRIPTION OF DRAWINGS

FIG. 2 includes a view showing an analytical model about the wire grid device according to the first embodiment of this invention and a table showing exemplary parameter dimensions.

FIG. 10 is a table showing analysis results obtained in the wire grid device according to the second embodiment of this invention by employing various parameter dimensions.

FIG. 11 is a table showing different analysis results obtained in the wire grid device according to the second embodiment of this invention by employing various parameter dimensions.

FIG. 12 is a table showing still different analysis results obtained in the wire grid device according to the second embodiment of this invention by employing various parameter dimensions.

FIG. 13 is a table showing still different analysis results obtained in the wire grid device according to the second embodiment of this invention by employing various parameter dimensions.

FIG. 14 is a table showing still different analysis results obtained in the wire grid device according to the second embodiment of this invention by employing various parameter dimensions.

FIG. 15 is a table showing still different analysis results obtained in the wire grid device according to the second embodiment of this invention by employing various parameter dimensions.

FIG. 16 is a table showing still different analysis results obtained in the wire grid device according to the second embodiment of this invention by employing various parameter dimensions.

FIG. 17 is a table showing still different analysis results obtained in the wire grid device according to the second embodiment of this invention by employing various parameter dimensions.

FIG. 18 is a table showing still different analysis results obtained in the wire grid device according to the second embodiment of this invention by employing various parameter dimensions.

FIG. 19 is a table showing still different analysis results obtained in the wire grid device according to the second embodiment of this invention by employing various parameter dimensions.

FIG. 20 is a table showing still different analysis results obtained in the wire grid device according to the second embodiment of this invention by employing various parameter dimensions.

FIG. 21 is a table showing still different analysis results obtained in the wire grid device according to the second embodiment of this invention by employing various parameter dimensions.

FIG. 22 is a table showing still different analysis results obtained in the wire grid device according to the second embodiment of this invention by employing various parameter dimensions.

FIG. 23 is a table showing still different analysis results obtained in the wire grid device according to the second embodiment of this invention by employing various parameter dimensions.

FIG. 24 is a table showing still different analysis results obtained in the wire grid device according to the second embodiment of this invention by employing various parameter dimensions.

FIG. 25 is a table showing still different analysis results obtained in the wire grid device according to the second embodiment of this invention by employing various parameter dimensions.

FIG. 26 is a table showing still different analysis results obtained in the wire grid device according to the second embodiment of this invention by employing various parameter dimensions.

FIG. 27 is a table showing still different analysis results obtained in the wire grid device according to the second embodiment of this invention by employing various parameter dimensions.

FIG. 28 is a table showing still different analysis results obtained in the wire grid device according to the second embodiment of this invention by employing various parameter dimensions.

FIG. 29 is a table showing still different analysis results obtained in the wire grid device according to the second embodiment of this invention by employing various parameter dimensions.

FIG. 30 is a table showing still different analysis results obtained in the wire grid device according to the second embodiment of this invention by employing various parameter dimensions.

FIG. 31 is a table showing still different analysis results obtained in the wire grid device according to the second embodiment of this invention by employing various parameter dimensions.

FIG. 32 is a table showing still different analysis results obtained in the wire grid device according to the second embodiment of this invention by employing various parameter dimensions.

FIG. 33 is a table showing still different analysis results obtained in the wire grid device according to the second embodiment of this invention by employing various parameter dimensions.

FIG. 34 is a table showing still different analysis results obtained in the wire grid device according to the second embodiment of this invention by employing various parameter dimensions.

FIG. 35 is a table showing still different analysis results obtained in the wire grid device according to the second embodiment of this invention by employing various parameter dimensions.

FIG. 36 is a table showing still different analysis results obtained in the wire grid device according to the second embodiment of this invention by employing various parameter dimensions.

FIG. 37 is a table showing still different analysis results obtained in the wire grid device according to the second embodiment of this invention by employing various parameter dimensions.

FIG. 38 is a table showing still different analysis results obtained in the wire grid device according to the second embodiment of this invention by employing various parameter dimensions.

FIG. 39 is a table showing still different analysis results obtained in the wire grid device according to the second embodiment of this invention by employing various parameter dimensions.

FIG. 40 is a table showing still different analysis results obtained in the wire grid device according to the second embodiment of this invention by employing various parameter dimensions.

FIG. 41 is a table showing still different analysis results obtained in the wire grid device according to the second embodiment of this invention by employing various parameter dimensions.

FIG. 42 is a table showing still different analysis results obtained in the wire grid device according to the second embodiment of this invention by employing various parameter dimensions.

FIG. 43 is a table showing still different analysis results obtained in the wire grid device according to the second embodiment of this invention by employing various parameter dimensions.

FIG. 44 is a table showing still different analysis results obtained in the wire grid device according to the second embodiment of this invention by employing various parameter dimensions.

FIG. 45 is a table showing still different analysis results obtained in the wire grid device according to the second embodiment of this invention by employing various parameter dimensions.

FIG. 51 is a table showing analysis results obtained in the wire grid device according to the third embodiment of this invention by employing various parameter dimensions.

FIG. 52 is a table showing different analysis results obtained in the wire grid device according to the third embodiment of this invention by employing various parameter dimensions.

FIG. 53 is a table showing still different analysis results obtained in the wire grid device according to the third embodiment of this invention by employing various parameter dimensions.

FIG. 54 is a table showing still different analysis results obtained in the wire grid device according to the third embodiment of this invention by employing various parameter dimensions.

FIG. 55 is a table showing still different analysis results obtained in the wire grid device according to the third embodiment of this invention by employing various parameter dimensions.

FIG. 56 is a table showing still different analysis results obtained in the wire grid device according to the third embodiment of this invention by employing various parameter dimensions.

FIG. 57 is a table showing still different analysis results obtained in the wire grid device according to the third embodiment of this invention by employing various parameter dimensions.

FIG. 58 is a table showing still different analysis results obtained in the wire grid device according to the third embodiment of this invention by employing various parameter dimensions.

FIG. 59 is a table showing still different analysis results obtained in the wire grid device according to the third embodiment of this invention by employing various parameter dimensions.

FIG. 60 is a table showing still different analysis results obtained in the wire grid device according to the third embodiment of this invention by employing various parameter dimensions.

FIG. 61 is a table showing still different analysis results obtained in the wire grid device according to the third embodiment of this invention by employing various parameter dimensions.

FIG. 62 is a table showing still different analysis results obtained in the wire grid device according to the third embodiment of this invention by employing various parameter dimensions.

FIG. 63 is a table showing still different analysis results obtained in the wire grid device according to the third embodiment of this invention by employing various parameter dimensions.

FIG. 64 is a table showing still different analysis results obtained in the wire grid device according to the third embodiment of this invention by employing various parameter dimensions.

FIG. 65 is a table showing still different analysis results obtained in the wire grid device according to the third embodiment of this invention by employing various parameter dimensions.

FIG. 66 is a table showing still different analysis results obtained in the wire grid device according to the third embodiment of this invention by employing various parameter dimensions.

FIG. 67 is a table showing still different analysis results obtained in the wire grid device according to the third embodiment of this invention by employing various parameter dimensions.

FIG. 68 is a table showing still different analysis results obtained in the wire grid device according to the third embodiment of this invention by employing various parameter dimensions.

FIG. 69 is a table showing still different analysis results obtained in the wire grid device according to the third embodiment of this invention by employing various parameter dimensions.

FIG. 70 is a table showing still different analysis results obtained in the wire grid device according to the third embodiment of this invention by employing various parameter dimensions.

FIG. 71 is a table showing still different analysis results obtained in the wire grid device according to the third embodiment of this invention by employing various parameter dimensions.

FIG. 72 is a table showing still different analysis results obtained in the wire grid device according to the third embodiment of this invention by employing various parameter dimensions.

FIG. 73 is a table showing still different analysis results obtained in the wire grid device according to the third embodiment of this invention by employing various parameter dimensions.

FIG. 74 is a table showing still different analysis results obtained in the wire grid device according to the third embodiment of this invention by employing various parameter dimensions.

FIG. 75 is a table showing still different analysis results obtained in the wire grid device according to the third embodiment of this invention by employing various parameter dimensions.

FIG. 76 is a table showing still different analysis results obtained in the wire grid device according to the third embodiment of this invention by employing various parameter dimensions.

FIG. 77 is a table showing still different analysis results obtained in the wire grid device according to the third embodiment of this invention by employing various parameter dimensions.

FIG. 78 is a table showing still different analysis results obtained in the wire grid device according to the third embodiment of this invention by employing various parameter dimensions.

FIG. 79 is a table showing still different analysis results obtained in the wire grid device according to the third embodiment of this invention by employing various parameter dimensions.

FIG. 80 is a table showing still different analysis results obtained in the wire grid device according to the third embodiment of this invention by employing various parameter dimensions.

EMBODIMENTS FOR CARRYING OUT INVENTION

Figure 1A:
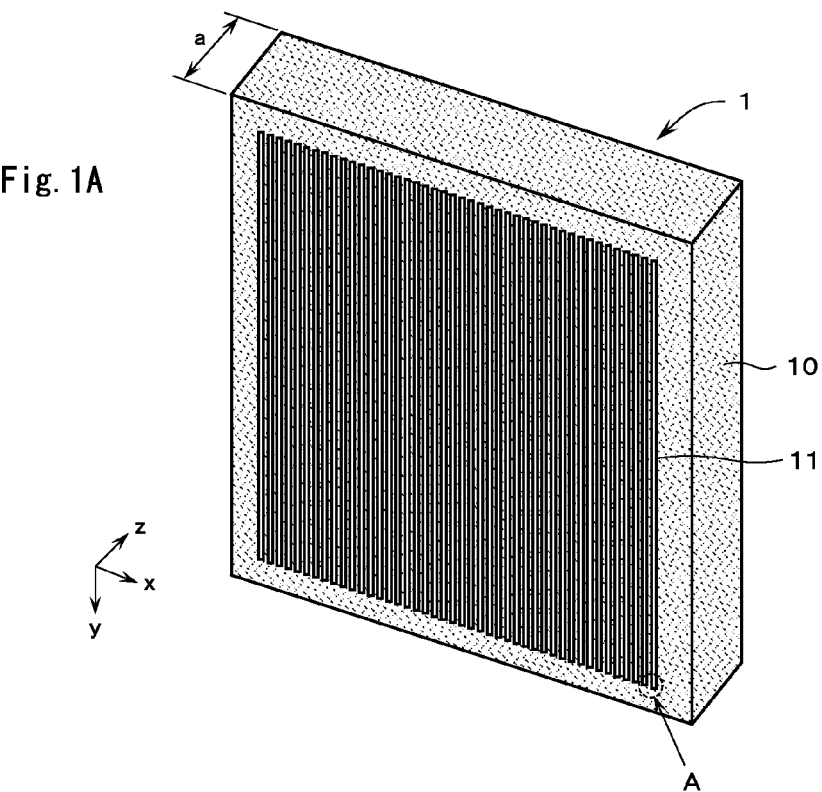
FIG. 1 includes a perspective view, a front view, and an enlarged view of a part A, each showing the structure of a wire grid device according to a first embodiment of this invention.
Figure 1B:
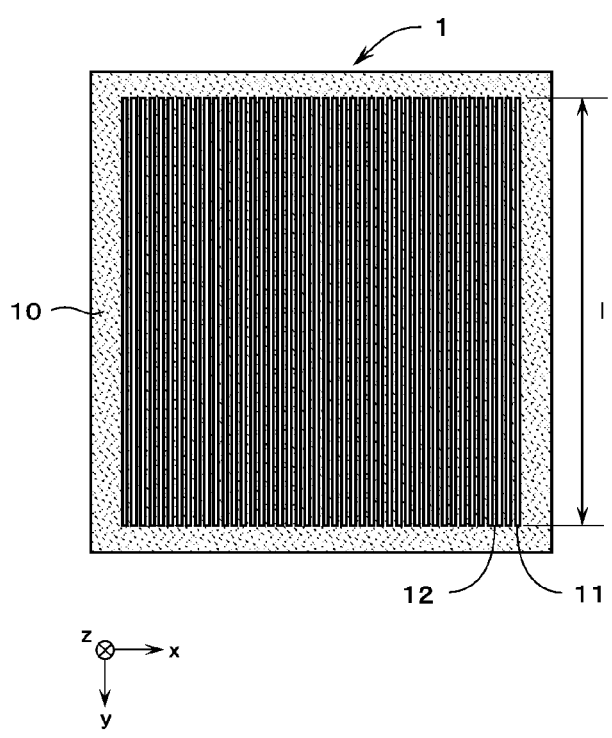

FIG. 1A is a perspective view, FIG. 1B is a front view, and FIG. 1C is an enlarged view of a part A, each showing the structure of a wire grid device 1 according to a first embodiment of this invention.

The wire grid device 1 according to the first embodiment of this invention operates as a polarizer in a frequency band of a terahertz wave band. As shown in FIGS. 1A, 1B, and 1C, the wire grid device 1 according to the first embodiment of this invention is formed of a conductive frame 10 of a rectangular parallelepiped having a given depth, and a large number of slits 11 formed so as to penetrate the frame 10 in the vertical direction of the frame 10. The frame 10 is a conductive frame made of metal, for example. The slits 11 can be formed by etching the metallic frame 10. Assuming that the depth of the frame 10 is a, the depth of the slits 11 is defined as a. A large number of the slits 11 have a length 1 (lower-case character 1) in the vertical direction and are disposed parallel to each other. A region of the frame 10 between the slits 11 forms a grid 12. The width of the slits 11 is defined as d, the width of the grid 12 is defined as w, and the period of the grid 12 is defined as p (=d+w). In the wire grid device 1 of the first embodiment, as a result of the presence of a large number of the slits 11 in the frame 10, a large number of the grids 12 as parallel flat plates are formed and function as a wire grid device. The sign 1 also corresponds to the length of the grids 12 and to the dimension of an opening in the wire grid device 1. In the illustrated example, the horizontal direction, the vertical direction, and the depth direction of the wire grid device 1 are defined as an x-axis direction, a y-axis direction, and a z-axis direction respectively.

FIG. 2A shows an analytical model used for analyzing a transmittance and an extinction ratio of the wire grid device 1 of the first embodiment. FIG. 2B is a table showing an exemplary dimension of each part.

As shown in FIG. 2A, a terahertz wave incident on the wire grid device 1 of the first embodiment to travel in the z-axis direction enters the frame 10 with the slits 11, passes through between the grids 12 at the frame 10 having the depth a, and exits the wire grid device 1. FIG. 2A shows an analytical model prepared by modeling this passage. This analytical model is formed of: a region of periodic boundary walls 14 as a virtual region in front of the frame 10 where the terahertz wave is yet to be incident; a region of electric walls 13 coupled to the periodic boundary walls 14 through a step structure #1, facing each other at an interval d, and having a depth a; and a region of the periodic boundary walls 14 as a virtual region behind the frame 10 and coupled to the region of the electric walls 13 through a step structure #2. The electric walls 13 are formed of the grids 12 having the depth a and the width w. Thus, the step structures #1 and #2 have a step height w/2, which is half of the width w of the grids 12. A distance $p_x$ between the periodic boundary walls 14 is equal to the period p of the grid 12.

In this analytic model about the wire grid device 1 of the first embodiment, the first step structure #1 and the second step structure #2 are connected through a scattering matrix S1 corresponding to the distance a. A step connecting the periodic boundary wall 14 and the electric wall 13 has a height w/2. This analytic model is analyzed by the mode-matching method. According to an analysis conducted by the mode-matching method, zones having known characteristics are defined by division, a field in a region of each connection between the zones is obtained by calculation, and overall response is calculated. The following describes the analysis on the wire grid device 1 of the first embodiment by the mode-matching method.

An incident wave has a TM mode (Transverse Magnetic Mode). An incident wave $H^i_y$, a reflected wave $H^r_y$, and a transmitted wave $H^t_y$ with a magnetic field H (vector) are expressed as follows:

[Formula 1]

$$H^i_y = \exp(-jk_0 z) \quad (1)$$

$$H^r_y = \sum_{m=0}^{\infty} A_m I_m \exp(+jk_m z) \quad (2)$$

$$H^t_y = \sum_{n=1}^{\infty} B_n I_n \exp(-jk_n z) + \sum_{l=0}^{\infty} C_l I_l \exp(-jk_l z) \quad (3)$$

where $I_m$, $I_n$, and $I_l$ show basis functions expressed as follows:

[Formula 2]

$$I_m = \cos(m\pi x/d) \quad (4)$$

$$I_n = \cos(2n\pi x/p_x) \quad (5)$$

$$I_l = \cos(2l\pi x/p_x) \quad (6)$$

The following expressions are further established:

[Formula 3]

$$k_m = \sqrt{k_0^2 - (m\pi/d)^2} \quad (7)$$

$$k_n = \sqrt{k_0^2 - (2n\pi/p_x)^2} \quad (8)$$

$$k_l = \sqrt{k_0^2 - (2l\pi/p_x)^2} \quad (9)$$

where $A_m$, $B_n$, and $C_l$ show excitation functions. An electric field E (vector) is determined uniquely using the magnetic field H (vector) and a boundary condition for an electric field and a magnetic field is determined on an opening surface. The boundary condition is multiplied by the three types of the basis functions $I_m$, $I_n$, and $I_l$ for weighting and resultant values are integrated on the boundary surface, thereby deriving a determinant. The excitation functions $A_m$, $B_n$, and $C_l$ are obtained by solving this determinant.

A scattering matrix of the first step structure #1 can be derived using the excitation functions $A_m$, $B_n$, and $C_l$. The scattering matrix of the first step structure #1 is connected through the distance (depth) a to a scattering matrix of the second step structure #2, thereby obtaining the transmission characteristics and the reflection characteristics of the entire structure of the wire grid device 1 shown in FIG. 1A responsive to incidence of a terahertz wave in the TM mode. An extinction ratio can be obtained in consideration of a propagation coefficient in a TE mode (Transverse Electromagnetic Mode). This is for reason that transmissive arrangement is produced if an amplitude direction of the electric field of the terahertz wave is orthogonal to the vertical direction in which the grids 12 extend (TM mode), whereas blocking arrangement is produced if the amplitude direction of the electric field of the terahertz wave agrees with the vertical direction in which the grids 12 extend (TE mode).

Figure 3A:
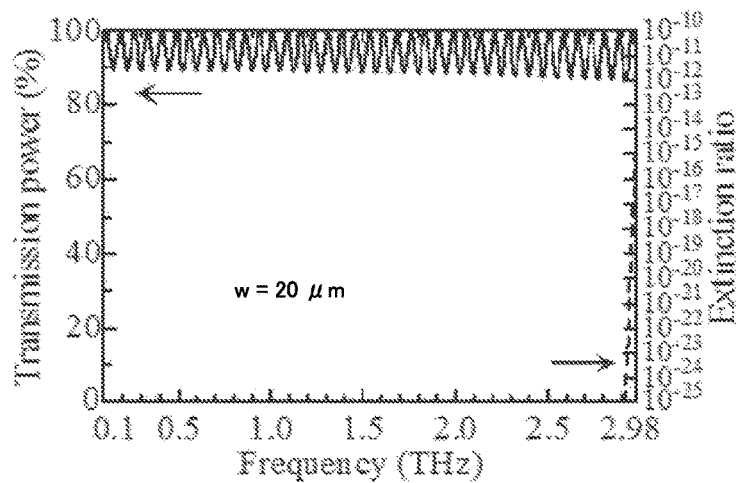
FIG. 3 includes views each showing analysis results obtained by using the analytical model about the wire grid device according to the first embodiment of this invention.
Figure 3B:
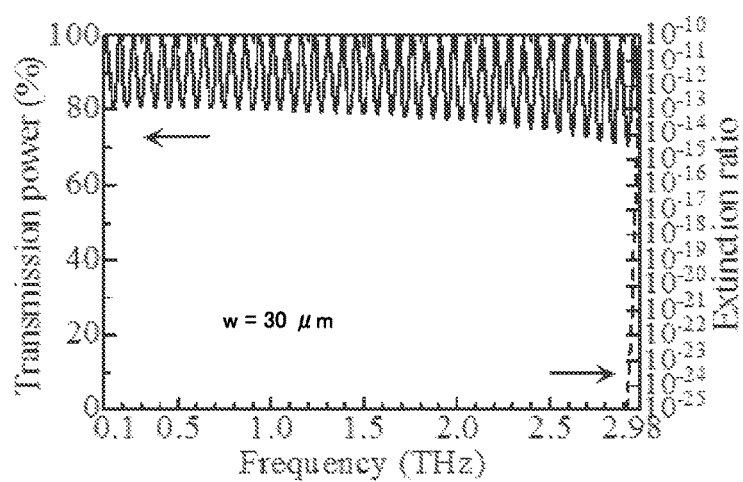
Figure 3C:
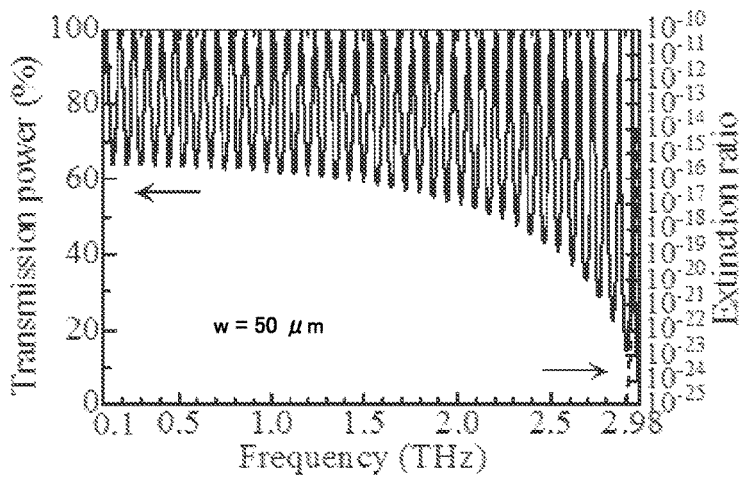

FIG. 2B shows exemplary parameter dimensions about the wire grid device 1 of the first embodiment. As shown in FIG. 2B, the width d of the slits 11, the depth a of the frame 10, and the length 1 of the slits 11 and the grids 12 in the vertical direction are set at the following dimensions: about 50 μm, about 2.0 mm, and about 18 mm respectively. Further, the width w of the grids 12 is set at the following three types of dimension: about 20 μm, about 30 μm, and about 50 μm. Then, a terahertz wave at a frequency from 0.1 to 2.98 THz incident on the wire grid device 1 of the first embodiment is analyzed using the analytic model shown in FIG. 2A. FIGS. 3A, 3B, and 3C show graphs each indicating results of the analysis. In each of these drawings, a horizontal axis shows a frequency from 0.1 to 2.98 THz, and a vertical axis shows transmission power [%] expressed in percentage (hereinafter called "transmission power %") or an extinction ratio expressed in terms of an intensity transmittance. If an amplitude direction of the electric field of the incident terahertz wave is orthogonal to the y-axis direction in which the grids 12 extend, the transmissive arrangement is produced and transmission power % of this case is indicated by a solid line. If the amplitude direction of the electric field of the terahertz wave is parallel to the y-axis direction in which the grids 12 extend, the blocking arrangement is produced and an extinction ratio of this case is indicated by a dashed line. FIG. 3A shows analysis results obtained with the width w of the grids 12 set at about 20 µm. By referring to FIG. 3A, transmission power % in the transmissive arrangement oscillates vertically at a frequency from 0.1 to 2.98 THz and favorable transmission power % about 85% or more is obtained. This oscillation results from multiple reflection of a transmitted wave between the grids 12 and this multiple reflection generates peaks and troughs of transmission power % in a manner that depends on a frequency. Regarding an extinction ratio in the blocking arrangement, a favorable extinction ratio of $10^{-12}$ or less is obtained in a range from 0.1 to 2.98 THz. FIG. 3B shows analysis results obtained with the width w of the grids 12 set at about 30 µm. By referring to FIG. 3B, regarding transmission characteristics in the transmissive arrangement, transmission power % oscillates vertically for the reason given above at a frequency from 0.1 to 2.98 THz and favorable transmission power % about 70% or more is obtained. Regarding an extinction ratio in the blocking arrangement, a favorable extinction ratio of $10^{-12}$ or less is obtained in a range from 0.1 to 2.98 THz. FIG. 3C shows analysis results obtained with the width w of the grids 12 set at about 50 µm. By referring to FIG. 3C, transmission power % in the transmissive arrangement oscillates vertically for the reason given above at a frequency from 0.1 to 2.98 THz and favorable transmission power % about 60% or more is obtained before and when a frequency becomes about 1.50 THz. If a frequency exceeds 1.5 THz, transmission power % is reduced gradually but transmission power % of about 20% or more is still obtained. Regarding an extinction ratio in the blocking arrangement, a favorable extinction ratio of $10^{-12}$ or less is obtained in a range from 0.1 to 2.98 THz. As understood from above, reduction in the width w of the grids 12 increases transmission power % further. Thus, the width w of the grids 12 is preferably as small as possible such as about 50 µm or less. By employing the aforementioned parameter values in the wire grid device 1 of the first embodiment, in terms of transmission power % in the transmissive arrangement and an extinction ratio (intensity transmittance) in the blocking arrangement about a terahertz wave band at a frequency from 0.1 to 2.98 THz shown in FIGS. 3A to 3C, transmission power % becomes 20% at worst. Meanwhile, an extinction ratio of $10^{-12}$ or less is obtained with transmission power % at this value. It is thus understood that the wire grid device 1 operates as a polarizer for a terahertz wave band at a frequency from 0.1 to 2.98 THz achieving favorable characteristics that cannot be achieved conventionally.

Figure 4A:
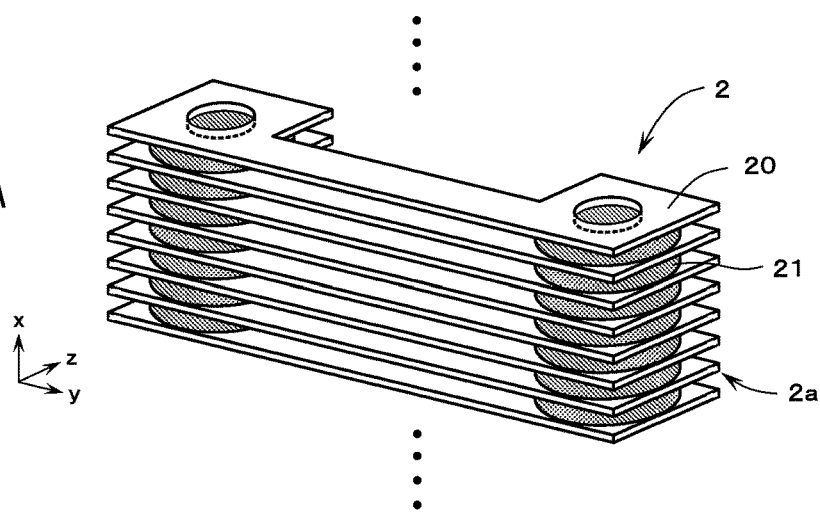
FIG. 4 includes a perspective view, a front view, and a top view, each showing the structure of a wire grid device according to a second embodiment of this invention.
Figure 4B:
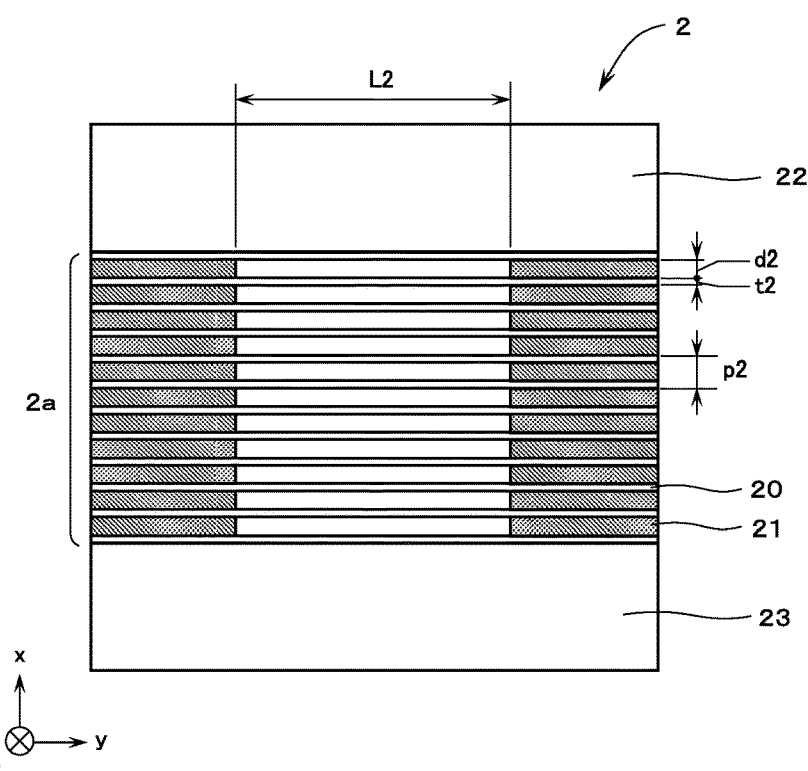
Figure 4C:
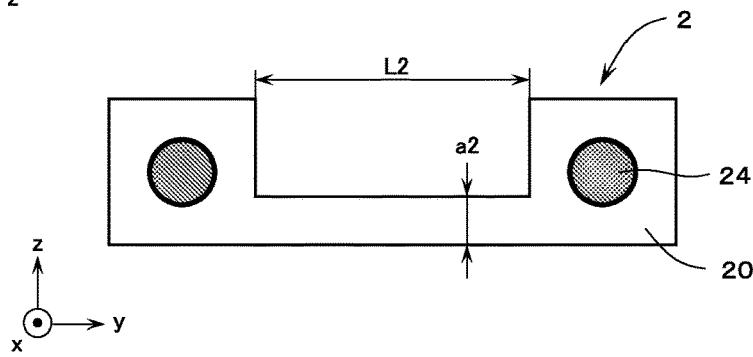
Figure 5:
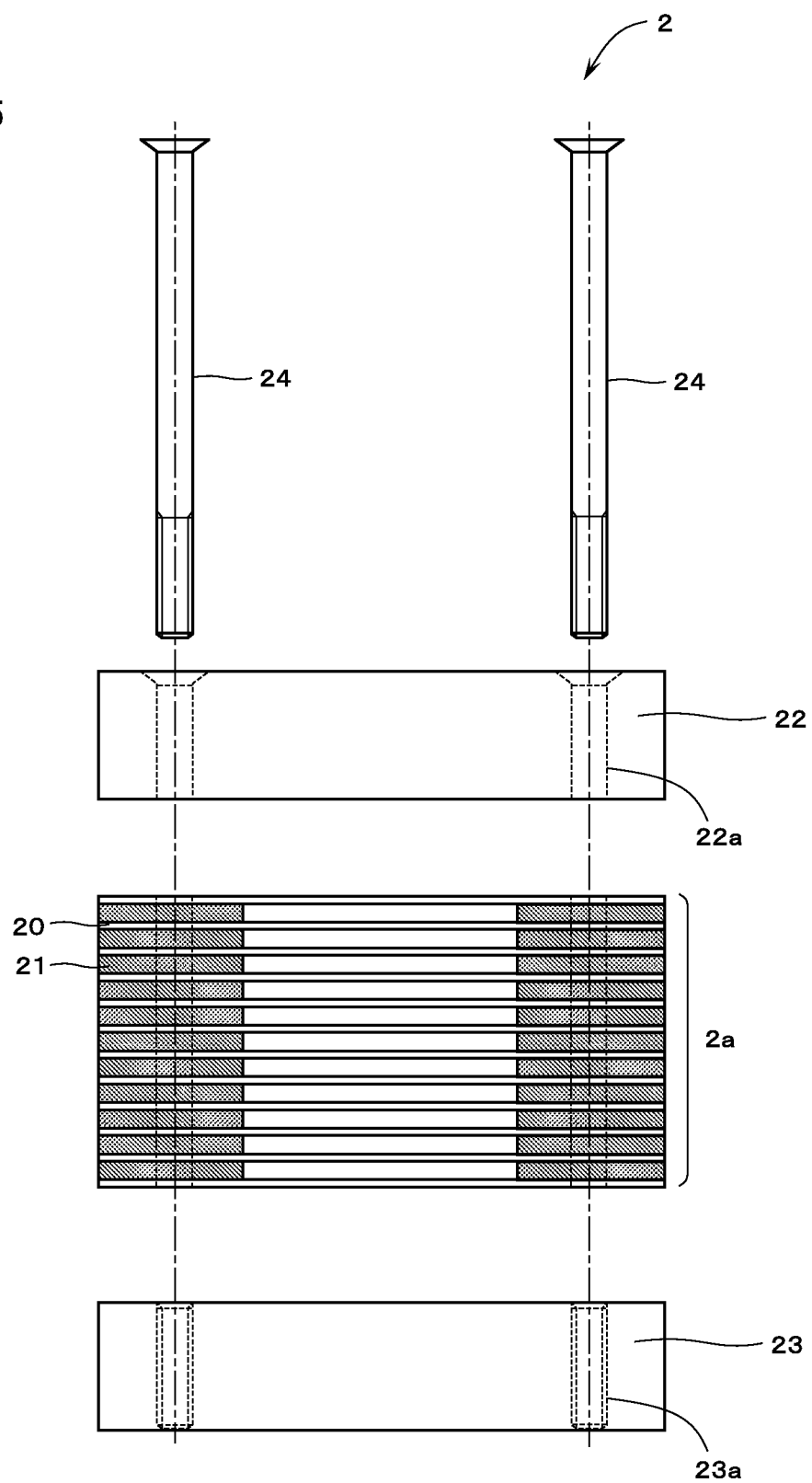
FIG. 5 is an exploded assembly view showing the structure of the wire grid device according to the second embodiment of this invention.

FIG. 4A is a perspective view, FIG. 4B is a front view, and FIG. 4C is a top view, each showing the structure of a wire grid device 2 according to a second embodiment of this invention. FIG. 5 is an exploded assembly view showing the structure of the wire grid device according to the second embodiment.

As shown in these drawings, the wire grid device 2 of the second embodiment includes a grid plate stack 2a with a plurality of grid plates 20 made of thin metal plates stacked so as to be spaced from each other at a given interval. These grid plates 20 are stacked one above the other through spacers 21 having a given thickness provided at opposite ends of each of the grid plates 20. In this way, the grid plates 20 are stacked at the given interval to form the grid plate stack 2a. In the grid plate stack 2a, the plurality of stacked grid plates 20 form parallel flat plates. An upper base 22 of a rectangular parallelepiped is arranged on the grid plate stack 2a and a lower base 23 is arranged under the grid plate stack 2a. Attachment screws 24 penetrating the upper base 22 are passed through the grid plate stack 2a to be threadedly engaged with the lower base 23, thereby forming the wire grid device 2 of the second embodiment. As described above, the wire grid device 2 of the second embodiment has a simple assembled structure formed by putting the following together: the grid plate stack 2a forming parallel flat plates configured by the grid plates 20 and the spacers 21; the upper base 22; the lower base 23; and the two attachment screws 24. In this way, a wire grid device to operate as a polarizer for a terahertz wave band can be obtained at low cost. A favorable extinction ratio can be obtained stably in the wire grid device 2 having the assembled structure of the second embodiment.

Figure 6A:
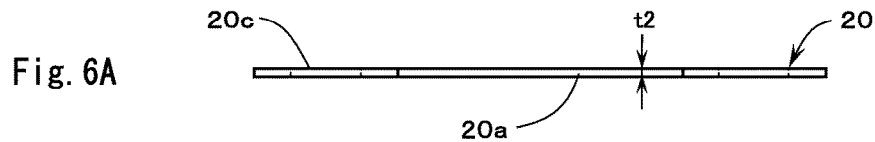
FIG. 6 includes a back view and a top view, each showing the structure of a grid plate in the wire grid device according to the second embodiment of this invention.
Figure 6B:
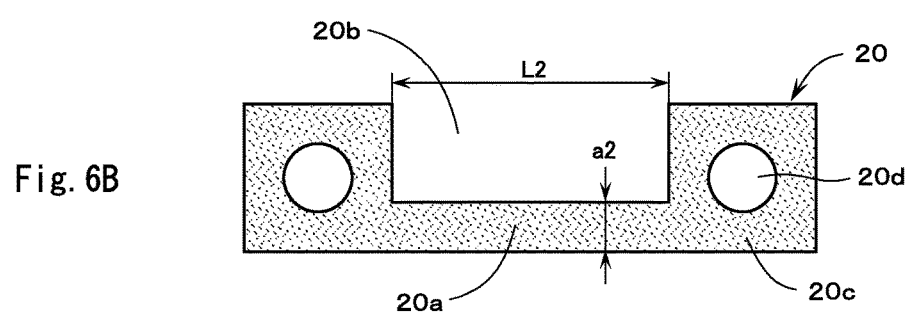

FIG. 6A is a back view and FIG. 6B is a top view, each showing the structure of the grid plate 20 in the wire grid device 2 of the second embodiment.

As shown in these drawings, the grid plate 20 has an elongated rectangular grid part 20a provided by forming a cutout 20b starting from one of the long sides of an elongated and thin rectangular metal plate. The cutout 20b is provided between the opposite ends of the metal plate and extending along the other long side. Substantially square fixing parts 20c are formed at the opposite ends. Circular through holes 20d are formed in substantially central areas of the fixing parts 20c. Thus, during stacking of the plurality of grid plates 20, the grid parts 20a form parallel flat plates to function as a polarizer for a terahertz wave band. The grid part 20a has a length L2 in the horizontal direction and a width a2. The grid plate 20 has a thickness t2.

Figure 7A:
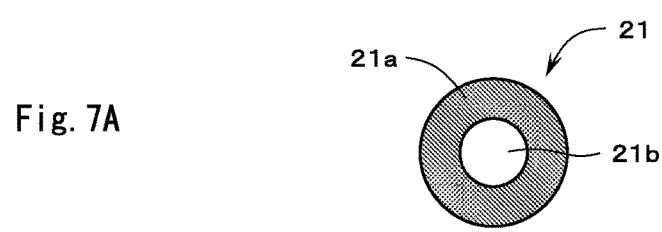
FIG. 7 includes a top view and a front view, each showing the structure of a spacer in the wire grid device according to the second embodiment of this invention.
Figure 7B:
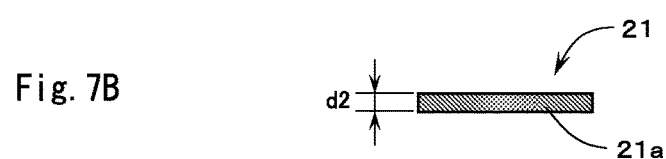

FIG. 7A is a top view and FIG. 7B is a front view, each showing the structure of the spacer 21 in the wire grid device 2 of the second embodiment.

As shown in these drawings, the spacer 21 has a given thickness d2 and has the function of providing an interval d2 between the grid plates 20. The spacer 21 is formed of a ring-like body part 21a. A through hole 21b is formed in a substantially central area of the body part 21a. The spacer 21 is may be made of metal or synthetic resin. The inner diameter of the through hole 21b substantially agrees with the inner diameter of the two through holes 20d formed in the grid plate 20.

The spacer 21 shown in FIGS. 7A and 7B is placed on each of the fixing parts 20c at the opposite ends of the grid plate 20 shown in FIGS. 6A and 6B while the through hole 21b is aligned with the through hole 20d. Then, a subsequent grid plate 20 is placed on this spacer 21 while the through hole 20d is aligned with the through hole 21b. Then, a subsequent spacer 21 is placed on each of the fixing parts 20c at the opposite ends of the subsequent grid plate 20 while the through hole 21b is aligned with the through hole 20d. Then, a still subsequent grid plate 20 is placed on the subsequent spacer 21 while the through hole 20d is aligned with the through hole 21b. By doing this work repeatedly, the grid plate stack 2a having parallel flat plates configured by the grid parts 20a can be assembled.

Next, as shown in FIG. 5, the assembled grid plate stack 2a is placed on the lower base 23. Then, the upper base 22 is placed on the grid plate stack 2a. Two holes 22a penetrating the upper base 22 are formed in the opposite sides of the upper base 22. Positions where the holes 22a are formed agree with positions where the two through holes 20d are formed in the grid plate 20. Each of the holes 22a is formed into a tapered shape at an upper portion where the diameter of the hole 22a is increased gradually. The two attachment screws 24 are passed through the two tapered holes 22a. The attachment screws 24 are further passed through the grid plate stack 2a. Each of the attachment screws 24 has cut threads at its tip portion. Two screw parts 23a penetrating the lower base 23 are formed in the opposite sides of the lower base 23. Positions where the screw parts 23a are formed agree with the positions where the two through holes 20d are formed in the grid plate 20. The tips of the two attachment screws 24 penetrating the grid plate stack 2a are threadedly engaged with the two screw parts 23a in the lower base 23. By doing so, the wire grid device 2 having robustness and excellent reproducibility can be assembled at high yields.

Figures 8, 9:
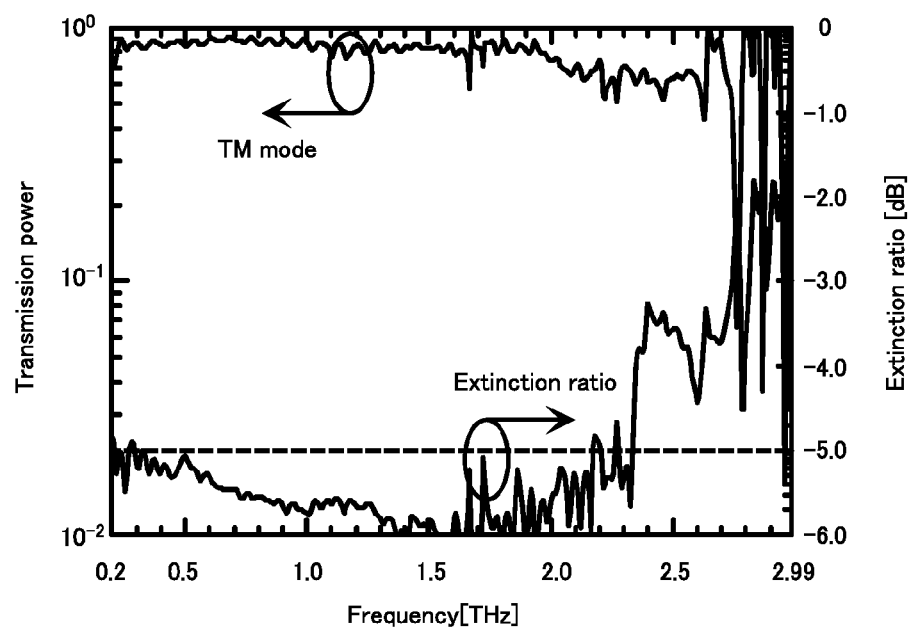
FIG. 8 is a table showing exemplary parameter dimensions about the wire grid device according to the second embodiment of this invention.
FIG. 9 is a view showing a graph about experimental results obtained in the wire grid device according to the second embodiment of this invention by employing the parameter dimensions shown in FIG. 8.

Parameters about the wire grid device 2 of the second embodiment include the thickness d2 of the spacer 21 corresponding to an interval between the gird plates 20, the width a2 of the grid part 20a in a propagation direction (z-axis direction), the thickness t2 of the grid plate 20, the length L2 of the grid plate 20 in the horizontal direction, and a period p2 (d2+t2) of arrangement of the grid plate 20. FIG. 8 is a table showing exemplary dimensions of these parameters. As shown in the examples of FIG. 8, the thickness t2 of the grid plate 20 was set at about 20 μm the width a2 of the grid part 20a in a propagation direction (z-axis direction) at about 2 mm, the length L2 of the grid plate 20 in the horizontal direction at about 11 mm, and the interval d2 between the grid plates 20 (the thickness of the spacer 21) at about 50 μm. Then, the wire grid device 2 was designed so as to obtain an extinction ratio of −60 dB or less and average transmission power of 94% in the TM mode at a frequency from 0.1 to 2.99 THz. Under these conditions, the period p2 (=d2+t2) of arrangement of the grid plate 20 is determined to be about 70 μm. As described above, the wire grid device 2 of the second embodiment has a structure sufficient to cover a frequency to be used. The wire grid device 2 has a periodic structure in the x-axis direction and an infinitely uniform structure in the y-axis direction.

Virtual periodic boundary walls were arranged outside the wire grid device 2 of the second embodiment designed in the aforementioned manner and a two-dimensional analytic model was designed by extracting one of these periodic boundary walls by employing the mode-matching method. Then, transmission power in the TM mode was analyzed. An extinction ratio was determined in consideration of a propagation coefficient in the TE mode in a parallel flat plate, as described above.

FIG. 9 is a graph about experimental results obtained in the wire grid device 2 of the second embodiment by employing the parameter dimensions shown in FIG. 8.

As can be seen from FIG. 9, a favorable extinction ratio of −50 dB or less is obtained in a range from 0.2 to 2.3 THz. As can also be seen from FIG. 9, favorable average transmission power of about 82% in the TM mode is obtained. This produces a difference of 12% from a design value of average transmission power in the TM mode. This difference is considered to result from the occurrence of flexure of about 10 μm at the grid part 20a in a central portion of the grid plate stack 2a. Specifically, preventing the flexure at the grid part 20a in the central portion of the grid plate stack 2a is considered to make an experimental value of average transmission power in the TM mode get closer to closer to the design value. Reflection is also found to be generally restricted by means of impedance matching.

Next, with the aforementioned parameters about the wire grid device 2 of the second embodiment, the width a2 of the grid part 20a was set at the following four values: 50 μm, 1000 μm, 2000 μm, and 3000 μm. The interval d2 between the grid plates 20 (the thickness of the spacer 21) was set in a range from 10 to 150 μm and the period p2 (=d2+t2) was set in a range from 11 to 300 μm. Virtual periodic boundary walls were arranged outside the wire grid device 2 of the second embodiment and a two-dimensional analytic model was designed by extracting one of these periodic boundary walls by employing the mode-matching method. Then, TM transmission power [%] in the TM mode and a power extinction ratio [dB] were analyzed at frequencies of 0.1 THz, 0.5 THz, 1.0 THz, 1.5 THz, 2.0 THz, and 2.5 THz. Results of this analysis are shown in the tables in FIGS. 10 to 13. A power extinction ratio was determined in consideration of a propagation coefficient in the TE mode in a parallel flat plate configured by the grid part 20a, as described above. This is for reason that, if an amplitude direction of the electric field of a terahertz wave is orthogonal to the horizontal direction in which the grid part 20a extends (TM mode), the transmissive arrangement is produced, whereas if the amplitude direction of the electric field of the terahertz wave agrees with the horizontal direction in which the grid part 20a extends (TE mode), the blocking arrangement is produced.

FIG. 10 is a table showing analysis results obtained with the width a2 of the grid part 20a set at 50 μm. FIG. 11 is a table showing analysis results obtained with the width a2 of the grid part 20a set at 1000 μm. FIG. 12 is a table showing analysis results obtained with the width a2 of the grid part 20a set at 2000 μm. FIG. 13 is a table showing analysis results obtained with the width a2 of the grid part 20a set at 3000 μm. The analysis results in each of these cases are obtained by setting the interval d2 between the grid plates 20 (the thickness of the spacer 21) at 10 μm, 50 μm, 100 μm, and 150 μm, and by making the period p2 (=d2+t2) settable at a value from 11 to 300 μm that depends on the interval d2. In these cases, the metal thickness t2 of the grid plate 20 is also defined in the tables and a value of the thickness t2 is calculated as follows: t2=p2−d2.

As can be seen from FIG. 10 showing analysis results obtained with the width a2 of the grid part 20a set at 50 μm, TM transmission power oscillates vertically at each of the aforementioned frequencies from 0.1 to 2.5 THz. As described above, this oscillation results from multiple reflection of a transmitted wave between the grid parts 20a and this multiple reflection generates peaks and troughs of TM transmission power in a manner that depends on a frequency. As the period p2 increases to increase the thickness t2 of the grid plate 20, TM transmission power is reduced. This is for reason that, increase in the thickness t2 of the grid plate 20 increases a ratio of the area of an end surface of the grid part 20a at an opening surface of a parallel flat plate configured by the grid part 20a as an incident surface for a terahertz wave, thereby increasing the rate of reflection of the incident wave at the end surface. Additionally, increase in the interval d2 is found to reduce a power extinction ratio. A power extinction ratio is also found to be reduced seriously by increase in a frequency to finally become 0 dB. This is for reason that, if the frequency of a terahertz wave to incident on a parallel flat plate configured by the grid part 20a exceeds a cut-off frequency of the parallel flat plate, transmission of the terahertz wave becomes unavoidable in both the TM mode and the TE mode. In this case, the wire grid device 2 does not operate as a polarizer.

As can be seen from FIG. 10, with the width a2 of the grid part 20a set at 50 μm, the interval d2 at about 10 μm, and the period p2 at about 11 μm (with the thickness t2 determined to be about 1 μm), the wire grid device 2 operates as an extremely favorable polarizer for a terahertz wave band achieving TM transmission power from about 99.11 to 100% and a power extinction ratio exceeding −100 dB in a frequency band from 0.1 to 2.5 THz. With the interval d2 set at about 10 μm and the period p2 at about 15 μm (with the thickness t2 determined to be about 5 μm), the wire grid device 2 is found to operate as an extremely favorable polarizer for a terahertz wave band achieving TM transmission power from about 85.35 to 100% and a power extinction ratio exceeding −100 dB in a frequency band from 0.1 to 2.5 THz. With the interval d2 set at about 10 μm and the period p2 at about 20 μm (with the thickness t2 determined to be about 10 μm), the wire grid device 2 is found to operate as an extremely favorable polarizer for a terahertz wave band achieving TM transmission power from about 64.26 to about 99.96% and a power extinction ratio exceeding −100 dB in a frequency band from 0.1 to 2.5 THz. With the interval d2 set at about 10 μm and the period p2 at about 50 μm (with the thickness t2 determined to be about 40 μm), the wire grid device 2 is found to operate as a favorable polarizer for a terahertz wave band achieving TM transmission power from about 29.35 to about 91.69% and a power extinction ratio exceeding −100 dB in a frequency band from 1.0 to 2.0 THz. With the interval d2 set at about 10 μm and the period p2 at about 100 μm (with the thickness t2 determined to be about 90 μm), the wire grid device 2 is found to operate as a polarizer for a terahertz wave band achieving TM transmission power from about 20.52 to about 49.51% and a power extinction ratio exceeding −100 dB in a frequency band from 1.0 to 1.5 THz.

With the interval d2 set at about 50 μm and the period p2 at about 51 μm (with the thickness t2 determined to be about 1 μm), the wire grid device 2 operates as a polarizer for a terahertz wave band achieving TM transmission power from about 99.96 to 100% and a power extinction ratio from about −20.3 to about −27.3 dB in a frequency band from 0.1 to 2.0 THz. With the interval d2 set at about 50 μm and the period p2 at about 55 μm (with the thickness t2 determined to be about 5 μm), the wire grid device 2 operates as a polarizer for a terahertz wave band achieving TM transmission power from about 99.11 to 100% and a power extinction ratio from about −20.3 to about −27.2 dB in a frequency band from 0.1 to 2.0 THz. With the interval d2 set at about 50 μm and the period p2 at about 60 μm (with the thickness t2 determined to be about 10 μm), the wire grid device 2 is found to operate as a polarizer for a terahertz wave band achieving TM transmission power from about 96.78 to 100% and a power extinction ratio from about −20.3 to about −27.1 dB in a frequency band from 0.1 to 2.0 THz. With the interval d2 set at about 50 μm and the period p2 at about 100 μm (with the thickness t2 determined to be about 50 μm), the wire grid device 2 is found to operate as a polarizer for a terahertz wave band achieving TM transmission power from about 64.28 to about 98.52% and a power extinction ratio from about −23.6 to about −25.4 dB in a frequency band from 0.1 to 1.5 THz.

As understood from above, with the width a2 of the grid part 20a set at 50 μm, for making the wire grid device 2 operate as a polarizer for a terahertz wave band, an allowable range of the interval d2 is from about 10 to about 50 μm and an allowable range of the period p2 is from about 11 to about 100 μm.

By referring to FIG. 11 showing analysis results obtained with the width a2 of the grid part 20a set at 1000 μm, TM transmission power oscillates vertically at each of the aforementioned frequencies from 0.1 to 2.5 THz. This oscillation results from the reason given above. As described above, as the period p2 increases to increase the thickness t2 of the grid plate 20, TM transmission power tends to be reduced. Further, as the interval d2 increases, a power extinction ratio tends to be reduced at a higher frequency.

As can be seen from FIG. 11, with the width a2 of the grid part 20a set at 1000 μm, the interval d2 at about 10 μm, and the period p2 at about 11 μm (with the thickness t2 determined to be about 1 μm), the wire grid device 2 operates as an extremely favorable polarizer for a terahertz wave band achieving TM transmission power from about 99.10 to about 99.79% and a power extinction ratio exceeding −100 dB in a frequency band from 0.1 to 2.5 THz. With the interval d2 set at about 10 μm and the period p2 at about 15 μm (with the thickness t2 determined to be about 5 μm), the wire grid device 2 is found to operate as an extremely favorable polarizer for a terahertz wave band achieving TM transmission power from about 85.18 to about 96.37% and a power extinction ratio exceeding −100 dB in a frequency band from 0.1 to 2.5 THz. With the interval d2 set at about 10 μm and the period p2 at about 20 μm (with the thickness t2 determined to be about 10 μm), the wire grid device 2 is found to operate as an extremely favorable polarizer for a terahertz wave band achieving TM transmission power from about 63.89 to about 89.89% and a power extinction ratio exceeding −100 dB in a frequency band from 0.1 to 2.5 THz. With the interval d2 set at about 10 μm and the period p2 at about 50 μm (with the thickness t2 determined to be about 40 μm), the wire grid device 2 is found to operate as a polarizer for a terahertz wave band achieving TM transmission power from about 24.96 to about 57.48% and a power extinction ratio exceeding −100 dB in a frequency band from 0.1 to 1.0 THz and a frequency band from 2.0 to 2.5 THz. With the interval d2 set at about 10 μm and the period p2 at about 100 μm (with the thickness t2 determined to be about 90 μm), the wire grid device 2 is found to operate as a favorable polarizer for a terahertz wave band achieving TM transmission power of about 40.78% and a power extinction ratio exceeding −100 dB in a frequency band of 2.0 THz.

With the interval d2 set at about 50 μm and the period p2 at about 51 μm (with the thickness t2 determined to be about 1 μm), the wire grid device 2 is found to operate as an extremely favorable polarizer for a terahertz wave band achieving TM transmission power from about 99.96 to about 99.99% and a power extinction ratio exceeding −100 dB in a frequency band from 0.1 to 2.5 THz. With the interval d2 set at about 50 μm and the period p2 at about 55 μm (with thickness t2 determined to be about 5 μm), the wire grid device 2 is found to operate as an extremely favorable polarizer for a terahertz wave band achieving TM transmission power from about 99.09 to about 99.79% and a power extinction ratio exceeding −100 dB in a frequency band from 0.1 to 2.5 THz. With the interval d2 set at about 50 μm and the period p2 from about 60 to about 100 μm (with the thickness t2 determined to be from about 10 to about 50 μm), the wire grid device 2 is found to operate as an extremely favorable polarizer for a terahertz wave band achieving TM transmission power from about 54.00 to about 99.25% and a power extinction ratio exceeding −100 dB in a frequency band from 0.1 to 2.5 THz. In this case, with the period p2 set at about 300 μm (with the thickness t2 determined to be about 250 μm), the wire grid device 2 is found to operate as a favorable polarizer for a terahertz wave band achieving TM transmission power from about 28.85 to about 54.23% and a power extinction ratio exceeding −100 dB in a frequency band from 0.1 to 0.5 THz.

With the interval d2 set at about 100 μm and the period p2 at about 101 μm (with the thickness t2 determined to be about 1 μm), the wire grid device 2 is found to operate as an extremely favorable polarizer for a terahertz wave band achieving TM transmission power of 100% and a power extinction ratio exceeding −100 dB in a frequency band from 0.1 to 1.0 THz. With the interval d2 set at about 100 μm and the period p2 at about 105 μm (with the thickness t2 determined to be about 5 μm), the wire grid device 2 is found to operate as an extremely favorable polarizer for a terahertz wave band achieving TM transmission power of about 99.94% and a power extinction ratio exceeding −100 dB in a frequency band from 0.1 to 1.0 THz. With the period p2 set at about 110 μm (with the thickness t2 determined to be about 10 μm), the wire grid device 2 is found to operate as an extremely favorable polarizer for a terahertz wave band achieving TM transmission power from about 99.76 to about 99.78% and a power extinction ratio exceeding −100 dB in a frequency band from 0.1 to 1.0 THz. In this case, with the period p2 set at about 300 μm (with the thickness t2 determined to be about 200 μm), the wire grid device 2 is found to operate as a favorable polarizer for a terahertz wave band achieving TM transmission power from about 66.29 to about 82.32% and a power extinction ratio exceeding −100 dB in a frequency band from 0.1 to 0.5 THz.

With the interval d2 set at about 150 μm and the period p2 from about 151 to about 300 μm (with the thickness t2 determined to be from about 1 to about 150 μm), the wire grid device 2 is found to operate as an extremely favorable polarizer for a terahertz wave band achieving TM transmission power from about 86.55 to 100% and a power extinction ratio exceeding −100 dB in a frequency band from 0.1 to 0.5 THz.

As understood from the aforementioned analysis results given in FIG. 11, by increasing the width a2 of the grid part 20a, specifically, a depth in the propagation direction from 50 to 1000 μm, an allowable range of the interval d2 and an allowable range of the period p2 for making the wire grid device 2 operate as a polarizer for a terahertz wave band are expanded. For example, the allowable range of the interval d2 can be from about 10 to about 150 μm. The allowable range of the period p2 can be from about 11 to about 300 μm.

By referring to FIG. 12 showing analysis results obtained with the width a2 of the grid part 20a set at 2000 μm, TM transmission power oscillates vertically at each of the aforementioned frequencies from 0.1 to 2.5 THz. This oscillation results from the reason given above. As described above, as the period p2 increases to increase the thickness t2 of the grid plate 20, TM transmission power tends to be reduced. Further, as the interval d2 increases, a power extinction ratio tends to be reduced at a higher frequency.

As can be seen from FIG. 12, with the width a2 of the grid part 20a set at 2000 μm, the interval d2 at about 10 μm, and the period p2 at about 11 μm (with the thickness t2 determined to be about 1 μm), the wire grid device 2 operates as an extremely favorable polarizer for a terahertz wave band achieving TM transmission power from about 99.10 to about 99.83% and a power extinction ratio exceeding −100 dB in a frequency band from 0.1 to 2.5 THz. With the interval d2 set at about 10 μm and the period p2 at about 15 μm (with the thickness t2 determined to be about 5 μm), the wire grid device 2 is found to operate as an extremely favorable polarizer for a terahertz wave band achieving TM transmission power from about 85.20 to about 96.94% and a power extinction ratio exceeding −100 dB in a frequency band from 0.1 to 2.5 THz. With the interval d2 set at about 10 μm and the period p2 at about 20 μm (with the thickness t2 determined to be about 10 μm), the wire grid device 2 is found to operate as an extremely favorable polarizer for a terahertz wave band achieving TM transmission power from about 63.95 to about 91.66% and a power extinction ratio exceeding −100 dB in a frequency band from 0.1 to 2.5 THz. In this case, with the period p2 set at about 50 μm (with the thickness t2 determined to be about 40 μm), the wire grid device 2 is found to operate as a polarizer for a terahertz wave band achieving TM transmission power from about 26.74 to 68.04% and a power extinction ratio exceeding −100 dB in a frequency band from 0.1 to 1.0 THz and a frequency band from 2.0 to 2.5 THz. With the interval d2 set at about 10 μm and the period p2 at about 100 μm (with the thickness t2 determined to be about 90 μm), the wire grid device 2 is found to operate as a polarizer for a terahertz wave band achieving TM transmission power of about 22.79% and a power extinction ratio exceeding −100 dB in a frequency band of 1.0 THz, while achieving TM transmission power of about 84.51% and a power extinction ratio exceeding −100 dB in a frequency band of 2.5 THz.

With the interval d2 set at about 50 μm and the period p2 at about 51 μm (with the thickness t2 determined to be about 1 μm), the wire grid device 2 is found to operate as an extremely favorable polarizer for a terahertz wave band achieving TM transmission power from about 99.96 to about 99.99% and a power extinction ratio exceeding −100 dB in a frequency band from 0.1 to 2.5 THz. With the interval d2 set at about 50 μm and the period p2 at about 55 μm (with the thickness t2 determined to be about 5 μm), the wire grid device 2 is found to operate as an extremely favorable polarizer for a terahertz wave band achieving TM transmission power from about 99.09 to about 99.82% and a power extinction ratio exceeding −100 dB in a frequency band from 0.1 to 2.5 THz. With the interval d2 set at about 50 μm and the period p2 from about 60 to about 100 μm (with the thickness t2 determined to be from about 10 to about 50 μm), the wire grid device 2 is found to operate as an extremely favorable polarizer for a terahertz wave band achieving TM transmission power from about 60.09 to about 99.36% and a power extinction ratio exceeding −100 dB in a frequency band from 0.1 to 2.5 THz. In this case, with the period p2 set at about 300 μm (with the thickness t2 determined to be about 250 μm), the wire grid device 2 is found to operate as a favorable polarizer for a terahertz wave band achieving TM transmission power of about 35.47% and a power extinction ratio exceeding −100 dB in a frequency band of 0.1 THz.

With the interval d2 set at about 100 μm and the period p2 at about 101 μm (with the thickness t2 determined to be about 1 μm), the wire grid device 2 is found to operate as an extremely favorable polarizer for a terahertz wave band achieving TM transmission power of 100% and a power extinction ratio exceeding −100 dB in a frequency band from 0.1 to 1.0 THz. With the interval d2 set at about 100 μm and the period p2 at about 105 μm (with the thickness t2 determined to be about 5 μm), the wire grid device 2 is found to operate as an extremely favorable polarizer for a terahertz wave band achieving TM transmission power from about 99.94 to about 99.95% and a power extinction ratio exceeding −100 dB in a frequency band from 0.1 to 1.0 THz. With the interval d2 set at about 100 μm and the period p2 at about 110 μm (with the thickness t2 determined to be about 10 μm), the wire grid device 2 is found to operate as an extremely favorable polarizer for a terahertz wave band achieving TM transmission power from about 99.76 to about 99.79% and a power extinction ratio exceeding −100 dB in a frequency band from 0.1 to 1.0 THz. In this case, with the period p2 set at about 300 μm (with the thickness t2 determined to be about 200 μm), the wire grid device 2 is found to operate as a favorable polarizer for a terahertz wave band achieving TM transmission power from about 49.44 to about 72.04% and a power extinction ratio exceeding −100 dB in a frequency band from 0.1 to 0.5 THz.

With the interval d2 set at about 150 μm and the period p2 from about 151 to about 300 μm (with the thickness t2 determined to be from about 1 to about 150 μm), the wire grid device 2 is found to operate as an extremely favorable polarizer for a terahertz wave band achieving TM transmission power from about 78.04 to 100% and a power extinction ratio exceeding −100 dB in a frequency band from 0.1 to 0.5 THz.

As understood from the aforementioned analysis results given in FIG. 12, by further increasing the width a2 of the grid part 20a, specifically, a depth in the propagation direction from 1000 to 2000 μm, an allowable range of the interval d2 and an allowable range of the period p2 for making the wire grid device 2 operate as a polarizer for a terahertz wave band are slightly expanded. In this case, the allowable range of the interval d2 can be from about 10 to about 150 μm. The allowable range of the period p2 can be from about 11 to about 300 μm.

By referring to FIG. 13 showing analysis results obtained with the width a2 of the grid part 20a set at 3000 μm, TM transmission power oscillates vertically at each of the aforementioned frequencies from 0.1 to 2.5 THz. This oscillation results from the reason given above. As described above, as the period p2 increases to increase the thickness t2 of the grid plate 20, TM transmission power tends to be reduced. Further, as the interval d2 increases, a power extinction ratio tends to be reduced at a higher frequency.

As can be seen from FIG. 13, with the width a2 of the grid part 20a set at 3000 μm, the interval d2 at about 10 μm, and the period p2 at about 11 μm (with the thickness t2 determined to be about 1 μm), the wire grid device 2 operates as an extremely favorable polarizer for a terahertz wave band achieving TM transmission power from about 99.10 to about 99.11% and a power extinction ratio exceeding −100 dB in a frequency band from 0.1 to 2.5 THz. With the interval d2 set at about 10 μm and the period p2 at about 15 μm (with the thickness t2 determined to be about 5 μm), the wire grid device 2 is found to operate as an extremely favorable polarizer for a terahertz wave band achieving TM transmission power from about 85.21 to about 85.29% and a power extinction ratio exceeding −100 dB in a frequency band from 0.1 to 2.5 THz. With the interval d2 set at about 10 μm and the period p2 at about 20 μm (with the thickness t2 determined to be about 10 μm), the wire grid device 2 is found to operate as an extremely favorable polarizer for a terahertz wave band achieving TM transmission power from about 64.00 to about 64.07% and a power extinction ratio exceeding −100 dB in a frequency band from 0.1 to 2.5 THz.

With the interval d2 set at about 50 μm and the period p2 at about 51 μm (with the thickness t2 determined to be about 1 μm), the wire grid device 2 is found to operate as an extremely favorable polarizer for a terahertz wave band achieving TM transmission power of about 99.96% and a power extinction ratio exceeding −100 dB in a frequency band from 0.1 to 2.5 THz. With the interval d2 set at about 50 μm and the period p2 at about 55 μm (with the thickness t2 determined to be about 5 μm), the wire grid device 2 is found to operate as an extremely favorable polarizer for a terahertz wave band achieving TM transmission power from about 99.09 to about 99.10% and a power extinction ratio exceeding −100 dB in a frequency band from 0.1 to 2.5 THz. With the interval d2 set at about 50 μm and the period p2 from about 60 to about 100 μm (with the thickness t2 determined to be from about 10 to about 50 μm), the wire grid device 2 is found to operate as an extremely favorable polarizer for a terahertz wave band achieving TM transmission power from about 47.24 to about 96.75% and a power extinction ratio exceeding −100 dB in a frequency band from 0.1 to 2.5 THz.

With the interval d2 set at about 100 μm and the period p2 at about 101 μm (with the thickness t2 determined to be about 1 μm), the wire grid device 2 is found to operate as an extremely favorable polarizer for a terahertz wave band achieving TM transmission power of about 99.99% and a power extinction ratio exceeding −100 dB in a frequency band from 0.1 to 1.0 THz. With the interval d2 set at about 100 μm and the period p2 at about 105 μm (with the thickness t2 determined to be about 5 μm), the wire grid device 2 is found to operate as an extremely favorable polarizer for a terahertz wave band achieving TM transmission power of about 99.76% and a power extinction ratio exceeding −100 dB in a frequency band from 0.1 to 1.0 THz. With the interval d2 set at about 100 μm and the period p2 at about 110 μm (with the thickness t2 determined to be about 10 μm), the wire grid device 2 is found to operate as an extremely favorable polarizer for a terahertz wave band achieving TM transmission power from about 99.08 to about 99.10% and a power extinction ratio exceeding −100 dB in a frequency band from 0.1 to 1.0 THz. In this case, with the period p2 set at about 300 μm (with the thickness t2 determined to be about 200 μm), the wire grid device 2 is found to operate as a favorable polarizer for a terahertz wave band achieving TM transmission power from about 32.18 to about 35.86% and a power extinction ratio exceeding −100 dB in a frequency band from 0.1 to 0.5 THz.

With the interval d2 set at about 150 μm and the period p2 from about 151 to about 300 μm (with the thickness t2 determined to be from about 1 to about 150 μm), the wire grid device 2 is found to operate as an extremely favorable polarizer for a terahertz wave band achieving TM transmission power from about 59.91 to 100% and a power extinction ratio exceeding −100 dB in a frequency band from 0.1 to 0.5 THz.

As understood from the aforementioned analysis results given in FIG. 13, by further increasing the width a2 of the grid part 20a, specifically, a depth in the propagation direction from 2000 to 3000 μm, an allowable range of the interval d2 and an allowable range of the period p2 for making the wire grid device 2 operate as a polarizer for a terahertz wave band are slightly narrowed. In this case, the allowable range of the interval d2 can be from about 10 to about 150 μm. The allowable range of the period p2 can be from about 11 to about 300 μm.

Next, with the aforementioned parameters about the wire grid device 2 of the second embodiment, TM transmission power [%] in the TM mode and a power extinction ratio [dB] were analyzed in a high-frequency range in a terahertz wave band at a frequency from 3 to 10 THz. Results of this analysis are shown in the tables in FIGS. 14 to 45. In this case, the width a2 of the grid part 20a was set at the following four values: 50 μm, 1000 μm, 2000 μm, and 3000 μm. The interval d2 between the grid plates 20 (the thickness of the spacer 21) was set in a range from 1 to 150 μm and the period p2 (=d2+t2) was set in a range from 2 to 300 μm. Virtual periodic boundary walls were arranged outside the wire grid device 2 of the second embodiment and a two-dimensional analytic model was designed by extracting one of these periodic boundary walls by employing the mode-matching method. An extinction ratio was determined in consideration of a propagation coefficient in the TE mode in a parallel flat plate configured by the grid part 20a, as described above.

FIGS. 14 to 21 are tables each showing analysis results obtained with the width a2 of the grid part 20a set at 50 μm. FIGS. 22 to 29 are tables each showing analysis results obtained with the width a2 of the grid part 20a set at 1000 μm. FIGS. 30 to 37 are tables each showing analysis results obtained with the width a2 of the grid part 20a set at 2000 μm. FIGS. 38 to 45 are tables each showing analysis results obtained with the width a2 of the grid part 20a set at 3000 μm. The analysis results in each of these cases are obtained by setting the interval d2 between the grid plates 20 (the thickness of the spacer 21) at 1 μm, 5 μm, 10 μm, 23 μm, 50 μm, 100 μm, and 150 μm, and by making the period p2 (=d2+t2) settable at a value from 2 to 300 μm that depends on the interval d2. In these cases, the metal thickness t2 of the grid plate 20 is also defined in the tables and a value of the thickness t2 is calculated as follows: t2=p2−d2.

FIGS. 14 to 21 show analysis results obtained with the width a2 of the grid part 20a set at 50 μm. By referring to FIGS. 14 to 21, TM transmission power oscillates vertically at each of the aforementioned frequencies from 3 to 10 THz. This oscillation results from the reason given above. As described above, as the period p2 increases to increase the thickness t2 of the grid plate 20, TM transmission power tends to be reduced. Further, as the interval d2 increases, a power extinction ratio tends to be reduced at a higher frequency.

As can be seen from the drawings from FIGS. 14 to 21, with the width a2 of the grid part 20a set at 50 μm, the interval d2 at about 1 μm, and the period p2 at about 2 μm (with the thickness t2 determined to be about 1 μm), the wire grid device 2 operates as a favorable polarizer for a terahertz wave band achieving TM transmission power from about 68.58 to about 99.97% and a power extinction ratio exceeding −100 dB in a frequency band from 3 to 10 THz. With the interval d2 set at about 1 μm and the period p2 at about 6 μm (with the thickness t2 determined to be about 5 μm), the wire grid device 2 is found to operate as a polarizer for a terahertz wave band achieving TM transmission power from about 11.42 to about 97.23% and a power extinction ratio exceeding −100 dB in a frequency band from 3 to 10 THz. With the interval d2 set at about 1 μm and the period p2 at about 11 μm (with the thickness t2 determined to be about 10 μm), the wire grid device 2 is found to operate as a favorable polarizer for a terahertz wave band achieving TM transmission power from about 37.96 to about 85.41% and a power extinction ratio exceeding −100 dB in frequency bands of 3 THz, 6 THz, and 9 THz. With the interval d2 set at about 1 μm and the period p2 at about 21 μm (with the thickness t2 determined to be about 20 μm), the wire grid device 2 is found to operate as a polarizer for a terahertz wave band achieving TM transmission power from about 9.98 to about 56.51% and a power extinction ratio exceeding −100 dB in frequency bands of 3 THz, 6 THz, and 9 THz. With the interval d2 set at about 1 μm and the period p2 at about 71 μm (with the thickness t2 determined to be about 70 μm), and with the interval d2 set at about 1 μm and the period p2 at about 300 μm (with the thickness t2 determined to be about 299 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 50 μm, the interval d2 at about 5 μm, and the period p2 at about 6 μm (with the thickness t2 determined to be about 1 μm), the wire grid device 2 is found to operate as an extremely favorable polarizer for a terahertz wave band achieving TM transmission power from about 97.22 to 100% and a power extinction ratio exceeding −100 dB in a frequency band from 3 to 10 THz. With the interval d2 set at about 5 μm and the period p2 at about 10 μm (with the thickness t2 determined to be about 5 μm), the wire grid device 2 is found to operate as a favorable polarizer for a terahertz wave band achieving TM transmission power from about 62.83 to about 99.39% and a power extinction ratio exceeding −100 dB in a frequency band from 3 to 10 THz. With the interval d2 set at about 5 μm and the period p2 at about 15 μm (with the thickness t2 determined to be about 10 μm), the wire grid device 2 is found to operate as a favorable polarizer for a terahertz wave band achieving TM transmission power from about 31.74 to about 95.32% and a power extinction ratio exceeding −100 dB in a frequency band from 3 to 10 THz. With the interval d2 set at about 5 μm and the period p2 at about 25 μm (with the thickness t2 determined to be about 20 μm), the wire grid device 2 is found to operate as a polarizer for a terahertz wave band achieving TM transmission power from about 11.45 to about 73.05% and a power extinction ratio exceeding −100 dB in a frequency band from 3 to 10 THz. With the interval d2 set at about 5 μm and the period p2 at about 85 μm (with the thickness t2 determined to be about 80 μm), and with the interval d2 set at about 5 μm and the period p2 at about 300 μm (with the thickness t2 determined to be about 295 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 50 μm, the interval d2 at about 10 μm, and the period p2 at about 11 μm (with the thickness t2 determined to be about 1 μm), the wire grid device 2 is found to operate as an extremely favorable polarizer for a terahertz wave band achieving TM transmission power from about 99.22 to 100% and a power extinction ratio exceeding −100 dB in a frequency band from 3 to 10 THz. With the interval d2 set at about 10 μm and the period p2 at about 15 μm (with the thickness t2 determined to be about 5 μm), the wire grid device 2 is found to operate as a favorable polarizer for a terahertz wave band achieving TM transmission power from about 83.40 to about 99.72% and a power extinction ratio exceeding −100 dB in a frequency band from 3 to 10 THz. With the interval d2 set at about 10 μm and the period p2 at about 20 μm (with the thickness t2 determined to be about 10 μm), the wire grid device 2 is found to operate as a favorable polarizer for a terahertz wave band achieving TM transmission power from about 56.17 to about 97.58% and a power extinction ratio exceeding −100 dB in a frequency band from 3 to 10 THz. With the interval d2 set at about 10 μm and the period p2 at about 30 μm (with the thickness t2 determined to be about 20 μm), the wire grid device 2 is found to operate as a polarizer for a terahertz wave band achieving TM transmission power from about 12.13 to about 94.96% and a power extinction ratio exceeding −100 dB in a frequency band from 3 to 9 THz. With the interval d2 set at about 10 μm and the period p2 at about 100 μm (with the thickness t2 determined to be about 90 μm), and with the interval d2 set at about 10 μm and the period p2 at about 300 μm (with the thickness t2 determined to be about 290 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 50 μm, the interval d2 at about 23 μm, and the period p2 at about 24 μm (with the thickness t2 determined to be about 1 μm), TM transmission power from about 99.84 to 100% is achieved in a frequency band from 3 to 10 THz. Meanwhile, a power extinction ratio is from −23.4 to −52.8 dB in a frequency band from 3 to 6 THz and is −0 dB in a frequency band from 7 to 10 THz. In this case, the wire grid device 2 is found to operate as a favorable polarizer for a terahertz wave band in a frequency band from 3 to 6 THz. Likewise, with the interval d2 set at about 23 μm and the period p2 at about 28 μm (with the thickness t2 determined to be about 5 μm), the wire grid device 2 is found to operate as a favorable polarizer for a terahertz wave band achieving TM transmission power from about 99.51 to about 99.89% and a power extinction ratio from −23.4 to −52.8 dB in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. Likewise, with the interval d2 set at about 23 μm and the period p2 at about 33 μm (with the thickness t2 determined to be about 10 μm), the wire grid device 2 is found to operate as a favorable polarizer for a terahertz wave band achieving TM transmission power from about 94.73 to about 99.00% and a power extinction ratio from −23.1 to −52.8 dB in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. Likewise, with the interval d2 set at about 23 μm and the period p2 at about 43 μm (with the thickness t2 determined to be about 20 μm), the wire grid device 2 is found to operate as a favorable polarizer for a terahertz wave band achieving TM transmission power from about 49.73 to about 97.72% and a power extinction ratio from −20.3 to −52.4 dB in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. With the interval d2 set at about 23 μm and the period p2 at about 93 μm (with the thickness t2 determined to be about 70 μm), and with the interval d2 set at about 23 μm and the period p2 at about 300 μm (with the thickness t2 determined to be about 277 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 50 μm, the interval d2 at about 50 μm, and the period p2 at about 51 μm (with the thickness t2 determined to be about 1 μm), TM transmission power from about 99.33 to 100% is achieved in a frequency band from 3 to 10 THz. Meanwhile, a power extinction ratio is −0.0 dB in a frequency band from 3 to 10 THz. In this case, the wire grid device 2 is found to be inoperable as a polarizer in a frequency band from 3 to 10 THz. With the interval d2 set at about 50 μm and the period p2 at about 55 μm (with the thickness t2 determined to be about 5 μm), with the interval d2 set at about 50 μm and the period p2 at about 60 μm (with the thickness t2 determined to be about 10 μm), and with the interval d2 set at about 50 μm and the period p2 at about 70 μm (with the thickness t2 determined to be about 20 μm), TM transmission power is at least about 41.07% or more in a frequency band from 3 to 10 THz. Meanwhile, a power extinction ratio is −0.0 dB in a frequency band from 3 to 10 THz. In these cases, the wire grid device 2 is found to be inoperable as a polarizer in a frequency band from 3 to 10 THz. With the interval d2 set at about 50 μm and the period p2 at about 300 μm (with the thickness t2 determined to be about 250 μm), favorable TM transmission power is not achieved in a frequency band from 3 to 10 THz. In this case, the wire grid device 2 is found to be substantially inoperable as a polarizer for a terahertz wave band.

With the width a2 of the grid part 20a set at 50 μm, the interval d2 at about 100 μm, and the period p2 at about 101 μm (with the thickness t2 determined to be about 1 μm), TM transmission power from about 99.66 to about 99.97% is achieved in a frequency band from 3 to 10 THz. Meanwhile, a power extinction ratio is −0.0 dB in a frequency band from 3 to 10 THz. In this case, the wire grid device 2 is found to be inoperable as a polarizer in a frequency band from 3 to 10 THz. With the interval d2 set at about 100 μm and the period p2 at about 105 μm (with the thickness t2 determined to be about 5 μm), and with the interval d2 set at about 100 μm and the period p2 at about 110 μm (with the thickness t2 determined to be about 10 μm), TM transmission power is at least about 85.71% or more in a frequency band from 3 to 10 THz. Meanwhile, a power extinction ratio is −0.0 dB in a frequency band from 3 to 10 THz. In these cases, the wire grid device 2 is found to be inoperable as a polarizer in a frequency band from 3 to 10 THz. With the interval d2 set at about 100 μm and the period p2 at about 300 μm (with the thickness t2 determined to be about 200 μm), favorable TM transmission power is not achieved and a power extinction ratio is −0.0 dB in a frequency band from 3 to 10 THz. In this case, the wire grid device 2 is found to be substantially inoperable as a polarizer for a terahertz wave band With the width a2 of the grid part 20a set at 50 μm, the interval d2 at about 150 μm, and the period p2 at about 151 μm (with the thickness t2 determined to be about 1 μm), TM transmission power from about 99.80 to about 99.99% is achieved in a frequency band from 3 to 10 THz. Meanwhile, a power extinction ratio is −0.0 dB in a frequency band from 3 to 10 THz. In this case, the wire grid device 2 is found to be inoperable as a polarizer in a frequency band from 3 to 10 THz. With the interval d2 set at about 150 μm and the period p2 at about 155 μm (with the thickness t2 determined to be about 5 μm), with the interval d2 set at about 150 μm and the period p2 at about 160 μm (with the thickness t2 determined to be about 10 μm), and with the interval d2 set at about 150 μm and the period p2 at about 300 μm (with the thickness t2 determined to be about 150 μm), TM transmission power is at least about 16.57% or more in a frequency band from 3 to 10 THz. Meanwhile, a power extinction ratio is −0.0 dB in a frequency band from 3 to 10 THz. In these cases, the wire grid device 2 is found to be inoperable as a polarizer in a frequency band from 3 to 10 THz.

As understood from above, with the width a2 of the grid part 20a set at 50 μm, for making the wire grid device 2 operate as a polarizer for a terahertz wave band in a frequency band from 3 to 10 THz, an allowable range of the interval d2 is from about 1 to about 10 μm and an allowable range of the period p2 is from about 2 to about 20 μm. As understood from above, with the width a2 of the grid part 20a set at 50 μm, for making the wire grid device 2 operate as a polarizer for a terahertz wave band in a frequency band from 3 to 6 THz, an allowable range of the interval d2 is from about 1 to about 23 μm and an allowable range of the period p2 is from about 2 to about 43 μm. With the width a2 of the grid part 20a set at 50 μm, about 1 μm is too small for the interval d2 and the interval d2 set at about 10 μm works most effectively. In a frequency band from 3 to 6 THz, the interval d2 set in a range from about 10 to about 23 μm works most effectively.

FIGS. 22 to 29 show analysis results obtained with the width a2 of the grid part 20a set at 1000 μm. By referring to FIGS. 22 to 29, TM transmission power oscillates vertically at each of the aforementioned frequencies from 3 to 10 THz. This oscillation results from the reason given above. As described above, as the period p2 increases to increase the thickness t2 of the grid plate 20, TM transmission power tends to be reduced. Further, as the interval d2 increases, a power extinction ratio tends to be reduced at a higher frequency.

As can be seen from the drawings from FIGS. 22 to 29, with the width a2 of the grid part 20a set at 1000 μm, the interval d2 at about 1 μm, and the period p2 at about 2 μm (with the thickness t2 determined to be about 1 μm), the wire grid device 2 operates as a favorable polarizer for a terahertz wave band achieving TM transmission power from about 66.91 to about 99.78% and a power extinction ratio exceeding −100 dB in a frequency band from 3 to 10 THz. With the interval d2 set at about 1 μm and the period p2 at about 6 μm (with the thickness t2 determined to be about 5 μm), the wire grid device 2 is found to operate as a polarizer for a terahertz wave band achieving TM transmission power from about 11.08 to about 92.51% and a power extinction ratio exceeding −100 dB in a frequency band from 3 to 10 THz. With the interval d2 set at about 1 μm and the period p2 at about 11 μm (with the thickness t2 determined to be about 10 μm), the wire grid device 2 is found to operate as a favorable polarizer for a terahertz wave band achieving TM transmission power from about 21.52 to about 71.60% and a power extinction ratio exceeding −100 dB in frequency bands of 3 THz, 6 THz, and 9 THz. With the interval d2 set at about 1 μm and the period p2 at about 21 μm (with the thickness t2 determined to be about 20 μm), the wire grid device 2 is found to operate as a polarizer for a terahertz wave band achieving TM transmission power from about 12.46 to about 37.43% and a power extinction ratio exceeding −100 dB in frequency bands of 3 THz and 6 THz. With the interval d2 set at about 1 μm and the period p2 at about 71 μm (with the thickness t2 determined to be about 70 μm), and with the interval d2 set at about 1 μm and the period p2 at about 300 μm (with the thickness t2 determined to be about 299 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 1000 μm, the interval d2 at about 5 μm, and the period p2 at about 6 μm (with the thickness t2 determined to be about 1 μm), the wire grid device 2 is found to operate as an extremely favorable polarizer for a terahertz wave band achieving TM transmission power from about 97.05 to about 99.98% and a power extinction ratio exceeding −100 dB in a frequency band from 3 to 10 THz. With the interval d2 set at about 5 μm and the period p2 at about 10 μm (with the thickness t2 determined to be about 5 μm), the wire grid device 2 is found to operate as a favorable polarizer for a terahertz wave band achieving TM transmission power from about 63.29 to about 98.84% and a power extinction ratio exceeding −100 dB in a frequency band from 3 to 10 THz. With the interval d2 set at about 5 μm and the period p2 at about 15 μm (with the thickness t2 determined to be about 10 μm), the wire grid device 2 is found to operate as a favorable polarizer for a terahertz wave band achieving TM transmission power from about 33.40 to about 93.01% and a power extinction ratio exceeding −100 dB in a frequency band from 3 to 10 THz. With the interval d2 set at about 5 μm and the period p2 at about 25 μm (with the thickness t2 determined to be about 20 μm), the wire grid device 2 is found to operate as a polarizer for a terahertz wave band achieving TM transmission power from about 12.52 to about 67.05% and a power extinction ratio exceeding −100 dB in a frequency band from 3 to 10 THz. With the interval d2 set at about 5 μm and the period p2 at about 85 μm (with the thickness t2 determined to be about 80 μm), and with the interval d2 set at about 5 μm and the period p2 at about 300 μm (with the thickness t2 determined to be about 295 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 1000 μm, the interval d2 at about 10 μm, and the period p2 at about 11 μm (with the thickness t2 determined to be about 1 μm), the wire grid device 2 is found to operate as an extremely favorable polarizer for a terahertz wave band achieving TM transmission power from about 99.18 to about 99.99% and a power extinction ratio exceeding −100 dB in a frequency band from 3 to 10 THz. With the interval d2 set at about 10 μm and the period p2 at about 15 μm (with the thickness t2 determined to be about 5 μm), the wire grid device 2 is found to operate as a favorable polarizer for a terahertz wave band achieving TM transmission power from about 84.15 to about 99.52% and a power extinction ratio exceeding −100 dB in a frequency band from 3 to 10 THz. With the interval d2 set at about 10 μm and the period p2 at about 20 μm (with the thickness t2 determined to be about 10 μm), the wire grid device 2 is found to operate as a favorable polarizer for a terahertz wave band achieving TM transmission power from about 59.48 to about 99.03% and a power extinction ratio exceeding −100 dB in a frequency band from 3 to 10 THz. With the interval d2 set at about 10 μm and the period p2 at about 30 μm (with the thickness t2 determined to be about 20 μm), the wire grid device 2 is found to operate as a polarizer for a terahertz wave band achieving TM transmission power from about 12.18 to about 99.80% and a power extinction ratio exceeding −100 dB in a frequency band from 3 to 9 THz. With the interval d2 set at about 10 μm and the period p2 at about 100 μm (with the thickness t2 determined to be about 90 μm), and with the interval d2 set at about 10 μm and the period p2 at about 300 μm (with the thickness t2 determined to be about 290 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 1000 μm, the interval d2 at about 23 μm, and the period p2 at about 24 μm (with the thickness t2 determined to be about 1 μm), TM transmission power from about 99.84 to 100% is achieved in a frequency band from 3 to 10 THz. Meanwhile, a power extinction ratio is −100 dB or more in a frequency band from 3 to 6 THz and is −0 dB in a frequency band from 7 to 10 THz. In this case, the wire grid device 2 is found to operate as a favorable polarizer for a terahertz wave band in a frequency band from 3 to 6 THz. Likewise, with the interval d2 set at about 23 μm and the period p2 at about 28 μm (with the thickness t2 determined to be about 5 μm), the wire grid device 2 is found to operate as a favorable polarizer for a terahertz wave band achieving TM transmission power from about 96.11 to about 99.84% and a power extinction ratio of −100 dB or more in a frequency band from 3 to 6 THz.

Meanwhile, a power extinction ratio is −0 dB in a frequency band from 7 to 10 THz. In this case, the wire grid device 2 is found to be inoperable as a polarizer in a frequency band from 7 to 10 THz. Likewise, with the interval d2 set at about 23 μm and the period p2 at about 33 μm (with the thickness t2 determined to be about 10 μm), the wire grid device 2 is found to operate as a favorable polarizer for a terahertz wave band achieving TM transmission power from about 86.16 to about 98.69% and a power extinction ratio of −100 dB or more in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. Likewise, with the interval d2 set at about 23 μm and the period p2 at about 43 μm (with the thickness t2 determined to be about 20 μm), the wire grid device 2 is found to operate as a favorable polarizer for a terahertz wave band achieving TM transmission power from about 48.35 to about 93.48% and a power extinction ratio of −100 dB or more in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. With the interval d2 set at about 23 μm and the period p2 at about 93 μm (with the thickness t2 determined to be about 70 μm), and with the interval d2 set at about 23 μm and the period p2 at about 300 μm (with the thickness t2 determined to be about 277 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 1000 μm, and with the interval d2 set at about 50 μm, about 100 μm, and about 150 μm, a power extinction ratio is −0.0 dB in a frequency band from 3 to 10 THz with any dimension of the period p2. In this case, the wire grid device 2 is found to be inoperable as a polarizer in a frequency band from 3 to 10 THz with the interval d2 set at about 50 μm, about 100 μm, and about 150 μm.

As understood from above, with the width a2 of the grid part 20a set at 1000 μm, for making the wire grid device 2 operate as a polarizer for a terahertz wave band in a frequency band from 3 to 10 THz, an allowable range of the interval d2 is from about 1 to about 10 μm and an allowable range of the period p2 is from about 2 to about 20 μm. As understood from above, with the width a2 of the grid part 20a set at 1000 μm, for making the wire grid device 2 operate as a polarizer for a terahertz wave band in a frequency band from 3 to 6 THz, an allowable range of the interval d2 is from about 1 to about 23 μm and an allowable range of the period p2 is from about 2 to about 43 μm. With the width a2 of the grid part 20a set at 1000 μm, about 1 μm is too small for the interval d2 and the interval d2 set at about 10 μm works most effectively in a frequency band from 3 to 10 THz. In a frequency band from 3 to 6 THz, the interval d2 set in a range from about 10 to about 23 μm works most effectively.

FIGS. 30 to 37 show analysis results obtained with the width a2 of the grid part 20a set at 2000 μm. By referring to FIGS. 30 to 37, TM transmission power oscillates vertically at each of the aforementioned frequencies from 3 to 10 THz. This oscillation results from the reason given above. As described above, as the period p2 increases to increase the thickness t2 of the grid plate 20, TM transmission power tends to be reduced. Further, as the interval d2 increases, a power extinction ratio tends to be reduced at a higher frequency.

As can be seen from the drawings from FIGS. 30 to 37, with the width a2 of the grid part 20a set at 2000 μm, the interval d2 at about 1 μm, and the period p2 at about 2 μm (with the thickness t2 determined to be about 1 μm), the wire grid device 2 operates as a favorable polarizer for a terahertz wave band achieving TM transmission power from about 64.65 to about 99.39% and a power extinction ratio exceeding −100 dB in a frequency band from 3 to 10 THz. With the interval d2 set at about 1 μm and the period p2 at about 6 μm (with the thickness t2 determined to be about 5 μm), the wire grid device 2 is found to operate as a polarizer for a terahertz wave band achieving TM transmission power from about 10.38 to about 85.84% and a power extinction ratio exceeding −100 dB in a frequency band from 3 to 10 THz. With the interval d2 set at about 1 μm and the period p2 at about 11 μm (with the thickness t2 determined to be about 10 μm), the wire grid device 2 is found to operate as a polarizer for a terahertz wave band achieving TM transmission power from about 13.37 to about 57.68% and a power extinction ratio exceeding −100 dB in frequency bands of 3 THz, 6 THz, and 9 THz. With the interval d2 set at about 1 μm and the period p2 at about 21 μm (with the thickness t2 determined to be about 20 μm), the wire grid device 2 is found to operate as a polarizer for a terahertz wave band achieving TM transmission power of about 25.09% and a power extinction ratio exceeding −100 dB in a frequency band of 3 THz. With the interval d2 set at about 1 μm and the period p2 at about 71 μm (with the thickness t2 determined to be about 70 μm), and with the interval d2 set at about 1 μm and the period p2 at about 300 μm (with the thickness t2 determined to be about 299 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 2000 μm, the interval d2 at about 5 μm, and the period p2 at about 6 μm (with the thickness t2 determined to be about 1 μm), the wire grid device 2 is found to operate as an extremely favorable polarizer for a terahertz wave band achieving TM transmission power from about 96.77 to about 99.95% and a power extinction ratio exceeding −100 dB in a frequency band from 3 to 10 THz. With the interval d2 set at about 5 μm and the period p2 at about 10 μm (with the thickness t2 determined to be about 5 μm), the wire grid device 2 is found to operate as a favorable polarizer for a terahertz wave band achieving TM transmission power from about 62.46 to about 98.10% and a power extinction ratio exceeding −100 dB in a frequency band from 3 to 10 THz. With the interval d2 set at about 5 μm and the period p2 at about 15 μm (with the thickness t2 determined to be about 10 μm), the wire grid device 2 is found to operate as a favorable polarizer for a terahertz wave band achieving TM transmission power from about 34.12 to about 90.23% and a power extinction ratio exceeding −100 dB in a frequency band from 3 to 10 THz. With the interval d2 set at about 5 μm and the period p2 at about 25 μm (with the thickness t2 determined to be about 20 μm), the wire grid device 2 is found to operate as a polarizer for a terahertz wave band achieving TM transmission power from about 11.25 to about 98.14% and a power extinction ratio exceeding −100 dB in a frequency band from 3 to 10 THz. With the interval d2 set at about 5 μm and the period p2 at about 85 μm (with the thickness t2 determined to be about 80 μm), and with the interval d2 set at about 5 μm and the period p2 at about 300 μm (with the thickness t2 determined to be about 295 µm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 2000 µm, the interval d2 at about 10 µm, and the period p2 at about 11 µm (with the thickness t2 determined to be about 1 µm), the wire grid device 2 is found to operate as an extremely favorable polarizer for a terahertz wave band achieving TM transmission power from about 99.10 to about 99.99% and a power extinction ratio exceeding −100 dB in a frequency band from 3 to 10 THz. With the interval d2 set at about 10 µm and the period p2 at about 15 µm (with the thickness t2 determined to be about 5 µm), the wire grid device 2 is found to operate as a favorable polarizer for a terahertz wave band achieving TM transmission power from about 83.86 to about 99.25% and a power extinction ratio exceeding −100 dB in a frequency band from 3 to 10 THz. With the interval d2 set at about 10 µm and the period p2 at about 20 µm (with the thickness t2 determined to be about 10 µm), the wire grid device 2 is found to operate as a favorable polarizer for a terahertz wave band achieving TM transmission power from about 60.93 to about 95.48% and a power extinction ratio exceeding −100 dB in a frequency band from 3 to 10 THz. With the interval d2 set at about 10 µm and the period p2 at about 30 µm (with the thickness t2 determined to be about 20 µm), the wire grid device 2 is found to operate as a polarizer for a terahertz wave band achieving TM transmission power from about 12.57 to about 82.64% and a power extinction ratio exceeding −100 dB in a frequency band from 3 to 9 THz. With the interval d2 set at about 10 µm and the period p2 at about 90 µm (with the thickness t2 determined to be about 80 µm), and with the interval d2 set at about 10 µm and the period p2 at about 300 µm (with the thickness t2 determined to be about 290 µm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 2000 µm, the interval d2 at about 23 µm, and the period p2 at about 24 µm (with the thickness t2 determined to be about 1 µm), TM transmission power from about 99.82 to 100% is achieved in a frequency band from 3 to 10 THz. Meanwhile, a power extinction ratio is −100 dB or more in a frequency band from 3 to 6 THz and is −0 dB in a frequency band from 7 to 10 THz. In this case, the wire grid device 2 is found to operate as a favorable polarizer for a terahertz wave band in a frequency band from 3 to 6 THz. Likewise, with the interval d2 set at about 23 µm and the period p2 at about 28 µm (with the thickness t2 determined to be about 5 µm), the wire grid device 2 is found to operate as a favorable polarizer for a terahertz wave band achieving TM transmission power from about 96.22 to about 99.77% and a power extinction ratio of −100 dB or more in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. Likewise, with the interval d2 set at about 23 µm and the period p2 at about 33 µm (with the thickness t2 determined to be about 10 µm), the wire grid device 2 is found to operate as a favorable polarizer for a terahertz wave band achieving TM transmission power from about 86.96 to about 98.33% and a power extinction ratio of −100 dB or more in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. Likewise, with the interval d2 set at about 23 µm and the period p2 at about 43 µm (with the thickness t2 determined to be about 20 µm), the wire grid device 2 is found to operate as a favorable polarizer for a terahertz wave band achieving TM transmission power from about 47.28 to about 99.86% and a power extinction ratio of −100 dB or more in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. With the interval d2 set at about 23 µm and the period p2 at about 93 µm (with the thickness t2 determined to be about 70 µm), and with the interval d2 set at about 23 µm and the period p2 at about 300 µm (with the thickness t2 determined to be about 277 µm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 2000 µm, and with the interval d2 set at about 50 µm, about 100 µm, and about 150 µm, a power extinction ratio is −0.0 dB in a frequency band from 3 to 10 THz with any dimension of the period p2. In these cases, the wire grid device 2 is found to be inoperable as a polarizer in a frequency band from 3 to 10 THz with the interval d2 set at about 50 µm, about 100 µm, and about 150 µm.

As understood from above, with the width a2 of the grid part 20a set at 2000 µm, for making the wire grid device 2 operate as a polarizer for a terahertz wave band in a frequency band from 3 to 10 THz, an allowable range of the interval d2 is from about 1 to about 10 µm and an allowable range of the period p2 is from about 2 to about 20 µm. As understood from above, with the width a2 of the grid part 20a set at 2000 µm, for making the wire grid device 2 operate as a polarizer for a terahertz wave band in a frequency band from 3 to 6 THz, an allowable range of the interval d2 is from about 1 to about 23 µm and an allowable range of the period p2 is from about 2 to about 43 µm. With the width a2 of the grid part 20a set at 2000 µm, about 1 µm is too small for the interval d2 and the interval d2 set at about 10 µm works most effectively in a frequency band from 3 to 10 THz. In a frequency band from 3 to 6 THz, the interval d2 set in a range from about 10 to about 23 µm works most effectively.

FIGS. 38 to 45 show analysis results obtained with the width a2 of the grid part 20a set at 3000 µm. By referring to FIGS. 38 to 45, TM transmission power oscillates vertically at each of the aforementioned frequencies from 3 to 10 THz. This oscillation results from the reason given above. As described above, as the period p2 increases to increase the thickness t2 of the grid plate 20, TM transmission power tends to be reduced. Further, as the interval d2 increases, a power extinction ratio tends to be reduced at a higher frequency.

As can be seen from the drawings from FIGS. 38 to 45, with the width a2 of the grid part 20a set at 3000 µm, the interval d2 at about 1 µm, and the period p2 at about 2 µm (with the thickness t2 determined to be about 1 µm), the wire grid device 2 operates as an extremely favorable polarizer for a terahertz wave band achieving TM transmission power from about 88.99 to about 98.82% and a power extinction ratio exceeding −100 dB in a frequency band from 3 to 10 THz. With the interval d2 set at about 1 µm and the period p2 at about 6 µm (with the thickness t2 determined to be about 5 μm), the wire grid device 2 is found to operate as a polarizer for a terahertz wave band achieving TM transmission power from about 26.19 to about 78.27% and a power extinction ratio exceeding −100 dB in a frequency band from 3 to 10 THz. With the interval d2 set at about 1 μm and the period p2 at about 11 μm (with the thickness t2 determined to be about 10 μm), the wire grid device 2 is found to operate as a polarizer for a terahertz wave band achieving TM transmission power from about 11.22 to about 46.07% and a power extinction ratio exceeding −100 dB in a frequency band from 3 to 8 THz. With the interval d2 set at about 1 μm and the period p2 at about 21 μm (with the thickness t2 determined to be about 20 μm), the wire grid device 2 is found to operate as a polarizer for a terahertz wave band achieving TM transmission power from about 10.76 to about 17.65% and a power extinction ratio exceeding −100 dB in a frequency band from 3 to 4 THz. With the interval d2 set at about 1 μm and the period p2 at about 71 μm (with the thickness t2 determined to be about 70 μm), and with the interval d2 set at about 1 μm and the period p2 at about 300 μm (with the thickness t2 determined to be about 299 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20*a* set at 3000 μm, the interval d2 at about 5 μm, and the period p2 at about 6 μm (with the thickness t2 determined to be about 1 μm), the wire grid device 2 is found to operate as an extremely favorable polarizer for a terahertz wave band achieving TM transmission power from about 99.15 to about 99.92% and a power extinction ratio exceeding −100 dB in a frequency band from 3 to 10 THz. With the interval d2 set at about 5 μm and the period p2 at about 10 μm (with the thickness t2 determined to be about 5 μm), the wire grid device 2 is found to operate as a favorable polarizer for a terahertz wave band achieving TM transmission power from about 77.20 to about 97.19% and a power extinction ratio exceeding −100 dB in a frequency band from 3 to 10 THz. With the interval d2 set at about 5 μm and the period p2 at about 15 μm (with the thickness t2 determined to be about 10 μm), the wire grid device 2 is found to operate as a favorable polarizer for a terahertz wave band achieving TM transmission power from about 39.21 to about 87.19% and a power extinction ratio exceeding −100 dB in a frequency band from 3 to 10 THz. With the interval d2 set at about 5 μm and the period p2 at about 25 μm (with the thickness t2 determined to be about 20 μm), the wire grid device 2 is found to operate as a polarizer for a terahertz wave band achieving TM transmission power from about 10.43 to about 55.57% and a power extinction ratio exceeding −100 dB in a frequency band from 3 to 9 THz. With the interval d2 set at about 5 μm and the period p2 at about 85 μm (with the thickness t2 determined to be about 80 μm), and with the interval d2 set at about 5 μm and the period p2 at about 300 μm (with the thickness t2 determined to be about 295 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20*a* set at 3000 μm, the interval d2 at about 10 μm, and the period p2 at about 11 μm (with the thickness t2 determined to be about 1 μm), the wire grid device 2 is found to operate as an extremely favorable polarizer for a terahertz wave band achieving TM transmission power from about 99.76 to about 99.98% and a power extinction ratio exceeding −100 dB in a frequency band from 3 to 10 THz. With the interval d2 set at about 10 μm and the period p2 at about 15 μm (with the thickness t2 determined to be about 5 μm), the wire grid device 2 is found to operate as a favorable polarizer for a terahertz wave band achieving TM transmission power from about 89.67 to about 98.93% and a power extinction ratio exceeding −100 dB in a frequency band from 3 to 10 THz. With the interval d2 set at about 10 μm and the period p2 at about 20 μm (with the thickness t2 determined to be about 10 μm), the wire grid device 2 is found to operate as a favorable polarizer for a terahertz wave band achieving TM transmission power from about 57.27 to about 94.21% and a power extinction ratio exceeding −100 dB in a frequency band from 3 to 10 THz. With the interval d2 set at about 10 μm and the period p2 at about 30 μm (with the thickness t2 determined to be about 20 μm), the wire grid device 2 is found to operate as a polarizer for a terahertz wave band achieving TM transmission power from about 13.35 to about 72.82% and a power extinction ratio exceeding −100 dB in a frequency band from 3 to 9 THz. With the interval d2 set at about 10 μm and the period p2 at about 100 μm (with the thickness t2 determined to be about 90 μm), and with the interval d2 set at about 10 μm and the period p2 at about 300 μm (with the thickness t2 determined to be about 290 μm), favorable TM transmission power is not achieved in a frequency band from 3 to 10 THz. In these cases, the wire grid device 2 is found to be substantially inoperable as a polarizer for a terahertz wave band.

With the width a2 of the grid part 20*a* set at 3000 μm, the interval d2 at about 23 μm, and the period p2 at about 24 μm (with the thickness t2 determined to be about 1 μm), TM transmission power from about 99.95 to 100% is achieved in a frequency band from 3 to 10 THz. Meanwhile, a power extinction ratio is −100 dB or more in a frequency band from 3 to 6 THz and is −0 dB in a frequency band from 7 to 10 THz. In this case, the wire grid device 2 is found to operate as a favorable polarizer for a terahertz wave band in a frequency band from 3 to 6 THz. Likewise, with the interval d2 set at about 23 μm and the period p2 at about 28 μm (with the thickness t2 determined to be about 5 μm), the wire grid device 2 is found to operate as a favorable polarizer for a terahertz wave band achieving TM transmission power from about 98.67 to about 99.68% and a power extinction ratio of −100 dB or more in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. Likewise, with the interval d2 set at about 23 μm and the period p2 at about 33 μm (with the thickness t2 determined to be about 10 μm), the wire grid device 2 is found to operate as a favorable polarizer for a terahertz wave band achieving TM transmission power from about 91.02 to about 97.94% and a power extinction ratio of −100 dB or more in a frequency band from 3 to 6 THz. Meanwhile, a power extinction ratio is −0 dB in a frequency band from 7 to 10 THz. In this case, the wire grid device 2 is found to be inoperable as a polarizer in a frequency band from 7 to 10 THz. Likewise, with the interval d2 set at about 23 μm and the period p2 at about 43 μm (with the thickness t2 determined to be about 20 μm), the wire grid device 2 is found to operate as a favorable polarizer for a terahertz wave band achieving TM transmission power from about 46.57 to about 86.74% and a power extinction ratio of −100 dB or more in a frequency band from 3 to 6 THz. Meanwhile, a power extinction ratio is −0 dB in a frequency band from 7 to 10 THz. Thus, the wire grid device 2 is found to be inoperable as a polarizer in a frequency band from 7 to 10 THz. With the interval d2 set at about 23 µm and the period p2 at about 93 µm (with the thickness t2 determined to be about 70 µm), and with the interval d2 set at about 23 µm and the period p2 at about 300 µm (with the thickness t2 determined to be about 277 µm), favorable TM transmission power is not achieved in a frequency band from 3 to 10 THz. In these cases, the wire grid device 2 is found to be substantially inoperable as a polarizer for a terahertz wave band.

With the width a2 of the grid part 20a set at 3000 µm, and with the interval d2 set at about 50 µm, about 100 µm, and about 150 µm, a power extinction ratio is −0.0 dB in a frequency band from 3 to 10 THz with any dimension of the period p2. Thus, the wire grid device 2 is found to be inoperable as a polarizer in a frequency band from 3 to 10 THz with the interval d2 set at about 50 µm, about 100 µm, and about 150 µm.

As understood from above, with the width a2 of the grid part 20a set at 3000 µm, for making the wire grid device 2 operate as a polarizer for a terahertz wave band in a frequency band from 3 to 10 THz, an allowable range of the interval d2 is from about 1 to about 10 µm and an allowable range of the period p2 is from about 2 to about 20 µm. As understood from above, with the width a2 of the grid part 20a set at 3000 µm, for making the wire grid device 2 operate as a polarizer for a terahertz wave band in a frequency band from 3 to 6 THz, an allowable range of the interval d2 is from about 1 to about 23 µm and an allowable range of the period p2 is from about 2 to about 43 µm. With the width a2 of the grid part 20a set at 3000 µm, about 1 µm is too small for the interval d2 and the interval d2 set at about 10 µm works most effectively in a frequency band from 3 to 10 THz. In a frequency band from 3 to 6 THz, the interval d2 set in a range from about 10 to about 23 µm works most effectively.

Figure 46A:
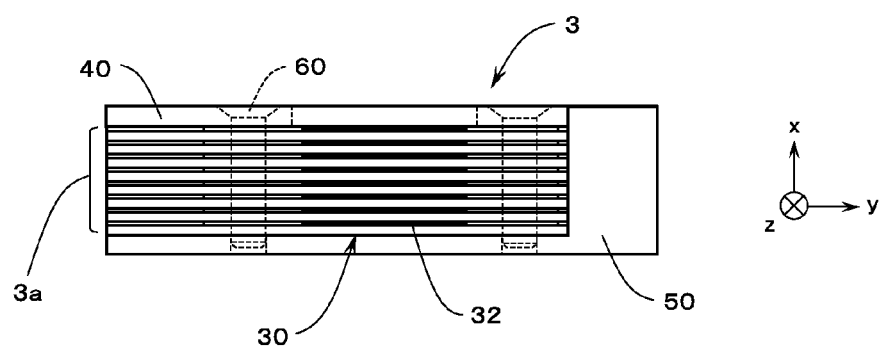
FIG. 46 includes a front view and a plan view, each showing the structure of a wire grid device according to a third embodiment of this invention.
Figure 46B:
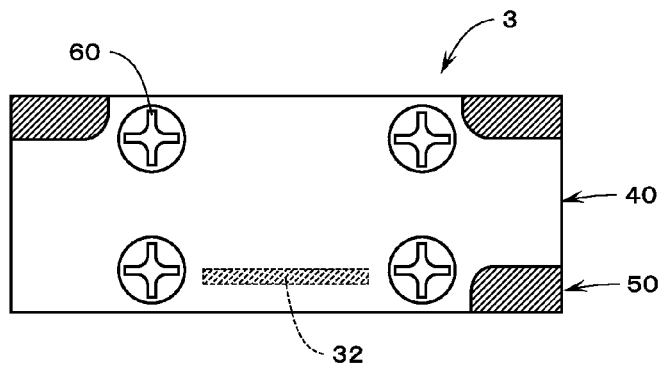
Figure 47:
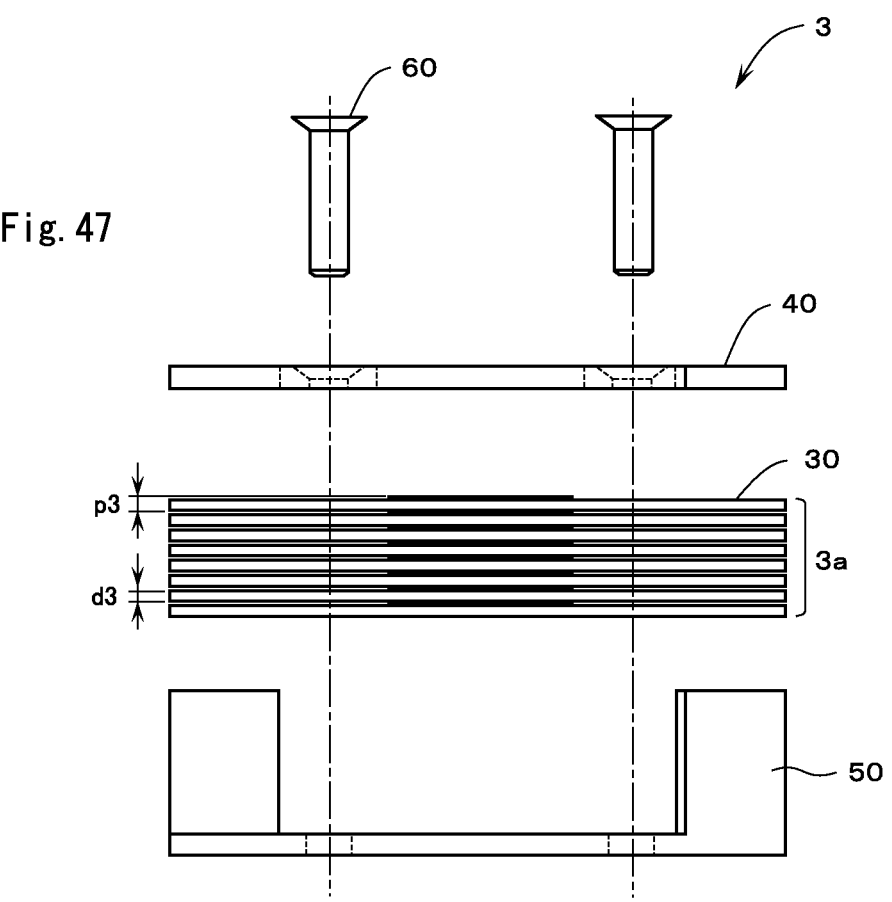
FIG. 47 is an exploded assembly view showing the structure of the wire grid device according to the third embodiment of this invention.

FIGS. 46 to 50 show the structure of a wire grid device 3 according to a third embodiment of this invention. FIGS. 46A and 46B are a front view and a plan view respectively showing the structure of the wire grid device 3 according to the third embodiment. FIG. 47 is an exploded assembly view showing the structure of the wire grid device 3 according to the third embodiment. FIG. 48A is a plan view showing the structure of a film substrate in the wire grid device 3 according to the third embodiment and FIG. 48B is a perspective view showing the structure of a film substrate stack in the wire grid device 3 according to the third embodiment. FIGS. 49A and 49B are a plan view and a front view respectively showing the structure of a base in the wire grid device 3 according to the third embodiment. FIGS. 50A and 50B are a plan view and a front view respectively showing the structure of a retainer plate in the wire grid device 3 according to the third embodiment.

Figure 49A:
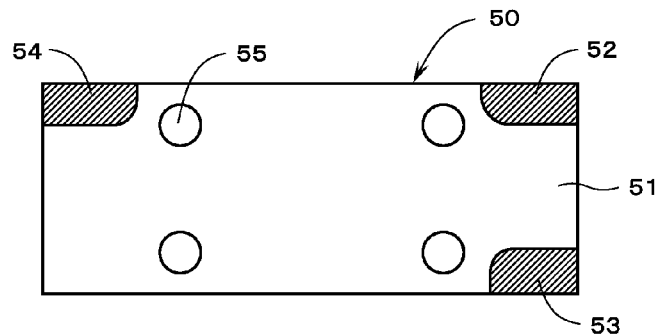
FIG. 49 includes a plan view and a front view, each showing the structure of a base in the wire grid device according to the third embodiment of this invention.
Figure 49B:
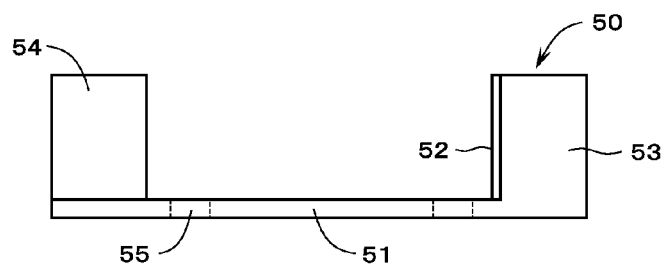

As shown in these drawings, the wire grid device 3 of the third embodiment includes a base 50, a film substrate stack 3a with a plurality of stacked film substrates 30, and a retainer plate 40. The base 50 shown in FIGS. 49A and 49B is made of metal such as an aluminum alloy. The base 50 includes: a bottom 51 like a horizontally-long rectangular flat plate; and a first upright column 52, a second upright column 53, and a third upright column 54 extending vertically to a given height from three corners except one corner of the upper surface of the bottom 51. The first to third upright columns 52 to 54 have horizontally-long rectangular cross sections. One of the corners of each of the first to third upright columns 52 to 54 facing the center of the base 50 is provided with an R part and is rounded. Four screw holes 55 are formed in the bottom 51.

Figure 50A:
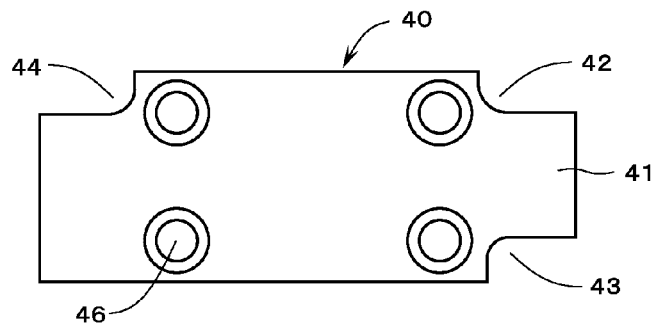
FIG. 50 includes a plan view and a front view, each showing the structure of a retainer plate in the wire grid device according to the third embodiment of this invention.
Figure 50B:
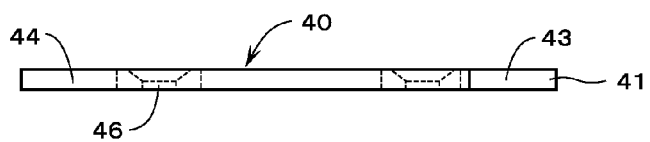
Figure 81:
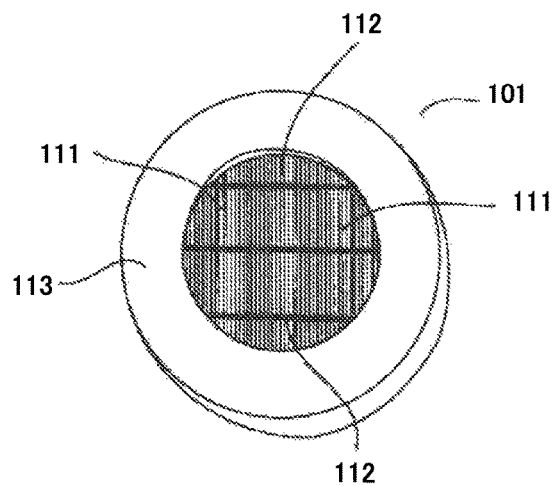
FIG. 81 is a perspective view showing the structure of a conventional metal plate for a wire grid.
Figure 82:
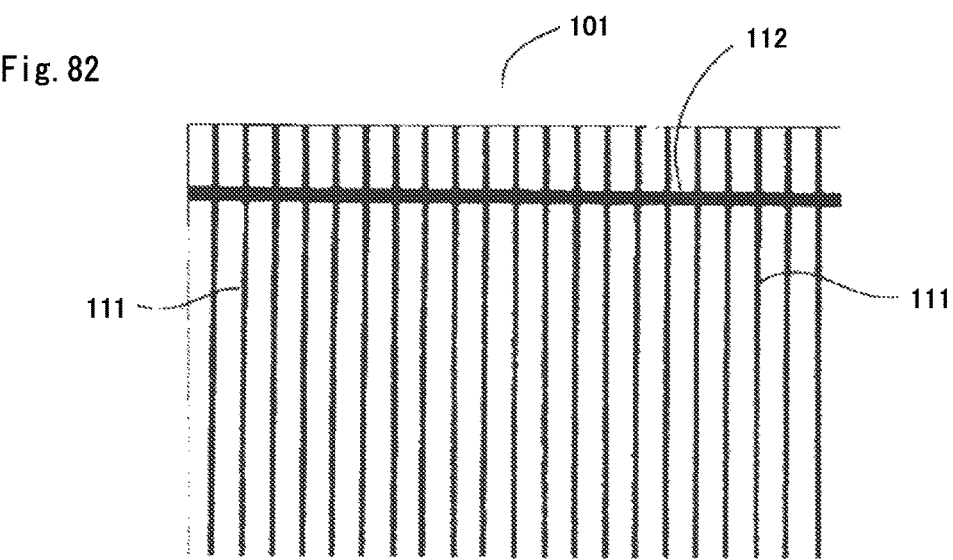
FIG. 82 is an enlarged plan view of a part showing the structure of the conventional metal plate for a wire grid.
Figure 83A:
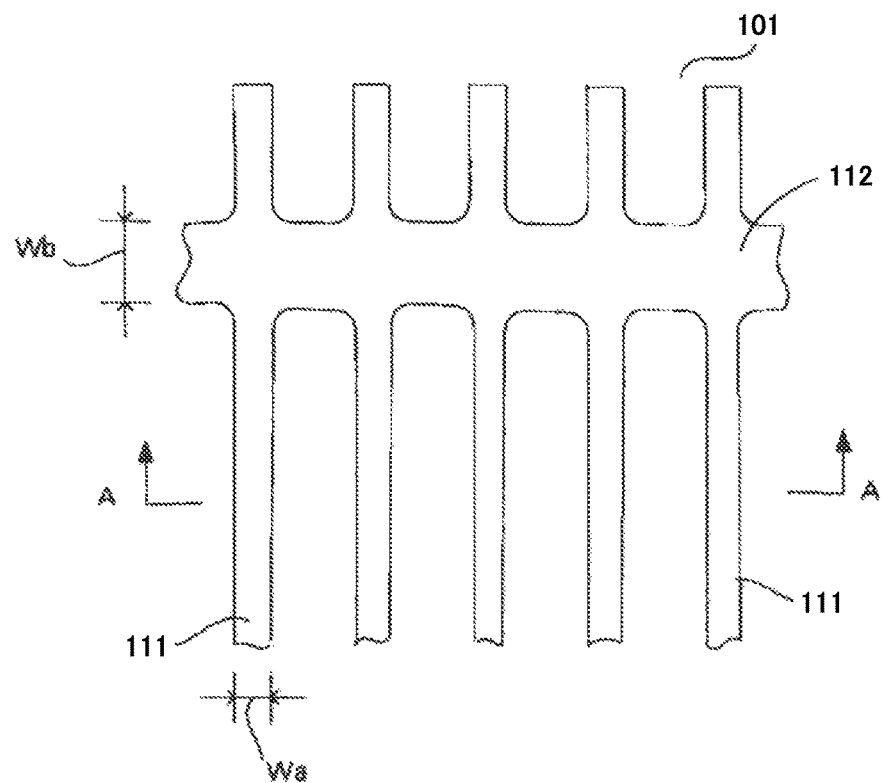
FIG. 83 is an enlarged plan view of a different part showing the structure of the conventional metal plate for a wire grid.
Figure 83B:
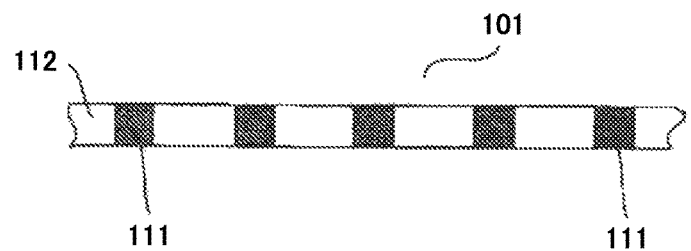
Figure 84:
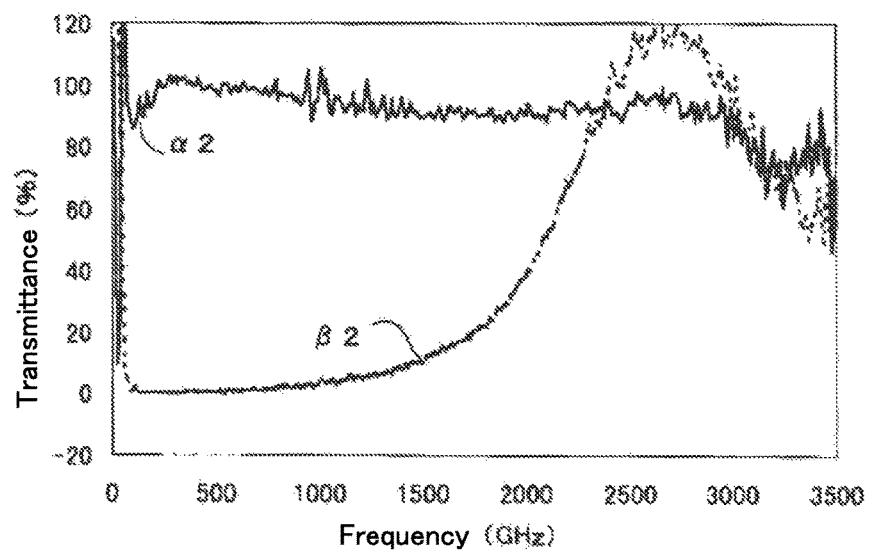
FIG. 84 is a view showing the characteristics of the conventional metal plate for a wire grid.

The retainer plate 40 shown in FIGS. 50A and 50B is made of metal such as an aluminum alloy. The retainer plate 40 includes a flat plate part 41 like a horizontally-long rectangular flat plate. The flat plate part 41 has a first cutout 42, a second cutout 43, and a third cutout 44 formed at three corners of the flat plate part 41 except one corner and having shapes substantially the same as the cross-sectional shapes of the first to third upright columns 52 to 54 respectively. Thus, if the retainer plate 40 is combined with the base 50, the first to third upright columns 52 to 54 are fitted in the first to third cutouts 42 to 44 respectively. The flat plate part 41 is provided with four through holes 46 formed in positions same as those of the screw holes 55 in the base 50. The four through holes 46 are countersunk.

The film substrate 30 in the wire grid device 3 of the third embodiment is formed of a polymer film 31 having an outer shape substantially the same as that of the retainer plate 40, and a horizontally-long metal thin plate 32 provided on the polymer film 31. The polymer film 31 has a shape like a horizontally-long rectangular flat plate and has an attachment part 31b and an attachment part 31c formed on opposite sides of the polymer film 31. A rectangular cutout 36 is formed between the attachment parts 31b and 31c. A horizontally-long holding part 31a holding the metal thin plate 32 is formed on one side of a central area. A first cutout 33, a second cutout 34, and a third cutout 35 having shapes same as the cross-sectional shapes of the first to third upright columns 52 to 54 respectively are formed in one corner of the attachment part 31b and two corners of the attachment part 31c corresponding to the positions of the first to third upright columns 52 to 54. The horizontally-long rectangular metal thin plate 32 is formed by being deposited on or affixed to one surface of the holding part 31a. Alternatively, the metal thin plate 32 is formed by etching a metal thin film made of Cu deposited on one surface of the polymer film 31. The metal thin plate 32 has a length L3, a width a3, and a thickness t3. In this case, lengths from opposite edges of the holding part 31a to corresponding long sides of the metal thin plate 32 are both b3. The metal thin plate 32 is formed on a substantially central portion of the holding part 31a. The attachment parts 31b and 31c are provided with four holes 37 formed in positions corresponding to the positions of the four screw holes 55 formed in the base 50.

Dimensions as parameters about the film substrate stack 3a include d3 indicating an interval between the metal thin plates 32, t3 indicating the thickness of the metal thin plate 32, and a period p3 of arrangement of the metal thin plate 32. The period p3 is determined as follows: p3=d3+t3.

Figure 48A:
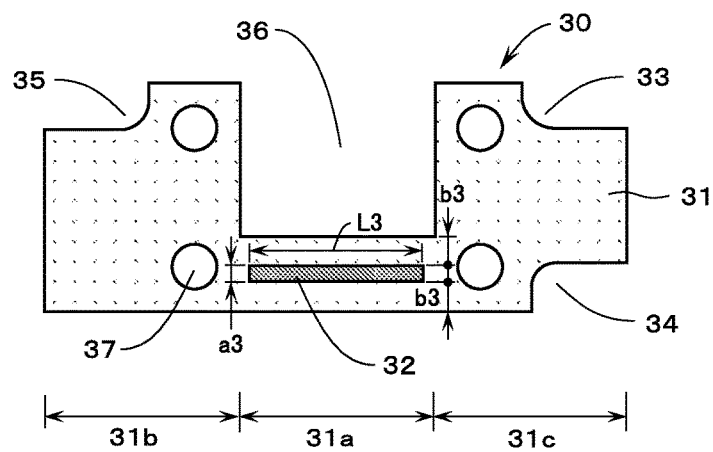
FIG. 48 includes a plan view showing the structure of a film substrate in the wire grid device according to the third embodiment of this invention and a perspective view showing the structure of a film substrate stack in the wire grid device according to the third embodiment of this invention.
Figure 48B:
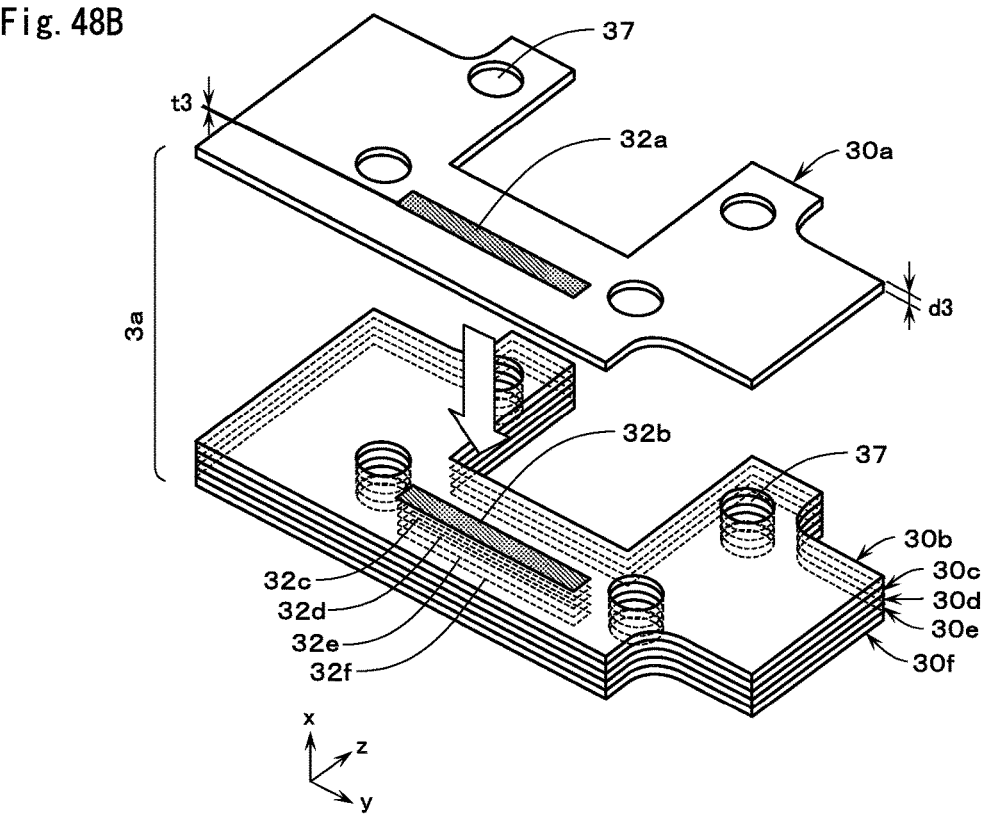

The film substrate stack 3a is formed by stacking a plurality of the film substrates 30 of the aforementioned structure while aligning the film substrates 30, as shown in FIG. 48B. A film substrate 30a, a film substrate 30b, a film substrate 30c, a film substrate 30d, a film substrate 30e, and a film substrate 30f of FIG. 48B have the same structure as the film substrate 30 of FIG. 48A. The film substrate stack 3a of FIG. 48B is formed of the six film substrates 30a to 30f. Meanwhile, the film substrate stack 3a is shown schematically in FIG. 48B and is actually formed by stacking dozens of film substrates 30 or more. In the film substrate stack 3a, a metal thin plate 32a, a metal thin plate 32b, a metal thin plate 32c, a metal thin plate 32d, a metal thin plate 32e, and a metal thin plate 32f formed on the film substrates 30a to 30f respectively overlap in the same position and an interval between adjacent ones of the metal thin plates 32 is d corresponding to the thickness of the polymer film 31. In this way, parallel flat plates are configured by the plurality of metal thin plates 32 overlapping vertically, thereby forming a wire grid.

As shown in FIG. 47, the film substrate stack 3a formed in the aforementioned way is arranged on the base 50 and housed in the base 50. While the film substrate stack 3a is housed, the first to third upright columns 52 to 54 of the base 50 are respectively fitted in the first to third cutouts 33 to 35 in each film substrate 30 of the film substrate stack 3a. In this way, each film substrate 30 of the film substrate stack 3a is aligned with the base 50 while being housed in the base 50. The four holes 37 in each film substrate 30 of the film substrate stack 3a are aligned with the four screw holes 55 in the base 50.

After the film substrate stack 3a is housed in the base 50, the retainer plate 40 is arranged on the base 50 to be placed on the film substrate stack 3a housed in the base 50. At this time, the first to third upright columns 52 to 54 of the base 50 are respectively fitted in the first to third cutouts 42 to 44 in the retainer plate 40 to align the retainer plate 40 with the base 50. Further, the four through holes 46 in the retainer plate 40 are aligned with the four holes 37 in each film substrate 30 of the film substrate stack 3a and with the four screw holes 55 in the base 50.

Attachment screws 60 are passed through all the four through holes 46 in the retainer plate 40. Then, the four attachment screws 60 are passed through the holes 37 in each film substrate 30 of the film substrate stack 3a and are threadedly engaged with all the screw holes 55 in the base 50. This forms tight contact between the film substrates 30, thereby assembling the wire grid device 3 of the third embodiment shown in FIGS. 46A and 46B. In the wire grid device 3 of the third embodiment, as a result of the presence of the flat plate part 41 of the retainer plate 40, the holding parts 31a of the film substrates 30, on which the metal thin plates 32 are formed, contact each other under pressure. Thus, the interval between the metal thin plates 32 is maintained stably. FIG. 46A shows how all the metal thin plates 32 as parallel flat plates on the corresponding the film substrates 30 of the film substrate stack 3a are vertically arranged parallel to each other to form the wire grid. In this case, the interval between the metal thin plates 32 as parallel flat plates is a parameter that determines the performance of the wire grid device 3. This interval is determined uniquely using the thickness of the film substrate 30. Specifically, in the wire grid device 3 of the third embodiment, the film substrate stack 3a including the metal thin plates 32 as parallel flat plates is caught between the base 50 and the retainer plate 40 fixedly attached to each other with the four attachment screws 60. This maintains the gap between the metal thin plates 32 as parallel flat plates considerably stably. Thus, even if being produced on a large scale, the wire grid device 3 can still maintain this interval at a constant value stably, thereby increasing the yield of the wire grid device 3. The four attachment screws 60 are countersunk screws, so that the heads of the attachment screws 60 are accommodated in the four countersunk through holes 46 in the retainer plate 40. By threadedly engaging the attachment screws 60, the base 50, the film substrate stack 3a, and the retainer plate 40 are aligned with each other and attached fixedly to each other.

Parameters about the wire grid device 3 of the third embodiment include the interval d3 between the metal thin plates 32, the width a3 of the metal thin plate 32 in a propagation direction (z-axis direction), the thickness t3 of the metal thin plate 32, the length L3 of the metal thin plate 32 in the horizontal direction, and the period p3 (=d3+t3) of arrangement of the metal thin plate 32.

With the aforementioned parameters about the wire grid device 3 of the third embodiment, the width a3 of the metal thin plate 32 corresponding to a length in a propagation direction (z-axis direction) was set at the following three values: 50 μm, 1000 μm, and 2000 μm. The interval d3 between the metal thin plates 32 was set in a range from 10 to 150 μm and the period p3 (=d3+t3) was set in a range from 10.01 to 300 μm. Virtual periodic boundary walls were arranged outside the wire grid device 3 of the third embodiment and a two-dimensional analytic model was designed by extracting one of these periodic boundary walls by employing the mode-matching method. Then, TM transmission power [%] in the TM mode and a power extinction ratio [dB] were analyzed at frequencies of 0.1 THz, 0.5 THz, 1.0 THz, and 1.5 THz. Results of this analysis are shown in the tables in FIGS. 51 to 53. A power extinction ratio was determined in consideration of a propagation coefficient in the TE mode in a parallel flat plate configured by the metal thin plate 32, as described above. This is for reason that, if an amplitude direction of the electric field of a terahertz wave is orthogonal to the horizontal direction in which the metal thin plate 32 extends (TM mode), the transmissive arrangement is produced, whereas if the amplitude direction of the electric field of the terahertz wave agrees with the horizontal direction in which the metal thin plate 32 extends (TE mode), the blocking arrangement is produced.

FIG. 51 is a table showing analysis results obtained with the width a3 of the metal thin plate 32 set at 50 μm. FIG. 52 is a table showing analysis results obtained with the width a3 of the metal thin plate 32 set at 1000 μm. FIG. 53 is a table showing analysis results obtained with the width a3 of the metal thin plate 32 set at 2000 μm. The analysis results in each of these cases are obtained by setting the interval d3 between the metal thin plates 32 at 10 μm, 50 μm, 100 μm, and 150 μm, and by making the period p3 (=d3+t3) settable at a value from 10.01 to 150 μm that depends on the interval d3. In these cases, the metal thickness t3 of the metal thin plate 32 is also defined in the tables and a value of the thickness t3 is calculated as follows: t3=p3−d3. Further, the complex index of refraction of the polymer film 31 was set at about 1.53+j0.0064.

As can be seen from FIG. 51 showing analysis results obtained with the width a3 of the metal thin plate 32 set at 50 μm, TM transmission power oscillates vertically at each of the aforementioned frequencies from 0.1 to 1.5 THz. This oscillation results from multiple reflection of a transmitted wave between the metal thin plates 32 and this multiple reflection generates peaks and troughs of TM transmission power in a manner that depends on a frequency. As the period p3 increases to increase the thickness t3 of the metal thin plate 32, TM transmission power is reduced. This is for reason that, increase in the thickness t3 of the metal thin plate 32 increases a ratio of the area of an end surface of the metal thin plate 32 at an opening surface of the film substrate stack 3a as an incident surface for a terahertz wave, thereby increasing the rate of reflection of the incident wave at the end surface. Additionally, increase in the interval d3 is found to reduce a power extinction ratio. A power extinction ratio is also found to be reduced seriously by increase in a frequency to finally become −0 dB. This is for reason that, if the frequency of a terahertz wave to incident on a parallel flat configured by the metal thin plate 32 exceeds a cut-off frequency of the parallel flat plate, transmission of the terahertz wave becomes unavoidable in both the TM mode and the TE mode. In this case, the wire grid device 3 does not operate as a polarizer.

As can be seen from FIG. 51, with the width a3 of the metal thin plate 32 set at 50 µm, the interval d3 at about 10 µm, and the period p3 at about 10.01 µm (with the thickness t3 determined to be about 0.01 µm), the wire grid device 3 operates as an extremely favorable polarizer for a terahertz wave band achieving TM transmission power from about 84.14 to about 99.63% and a power extinction ratio exceeding −100 dB in a frequency band from 0.1 to 1.5 THz. With the interval d3 set at about 10 µm and the period p3 at about 10.1µm (with the thickness t3 determined to be about 0.1 µm), the wire grid device 3 is found to operate as an extremely favorable polarizer for a terahertz wave band achieving TM transmission power from about 83.54 to about 99.63% and a power extinction ratio exceeding −100 dB in a frequency band from 0.1 to 1.5 THz. With the interval d3 set at about 10 µm and the period p3 at about 10.5 µm (with the thickness t3 determined to be about 0.5 µm), the wire grid device 3 is found to operate as an extremely favorable polarizer for a terahertz wave band achieving TM transmission power from about 80.88 to about 99.62% and a power extinction ratio exceeding −100 dB in a frequency band from 0.1 to 1.5 THz. With the interval d3 set at about 10 µm and the period p3 at about 50 µm (with the thickness t3 determined to be about 40 µm), the wire grid device 3 is found to operate as a favorable polarizer for a terahertz wave band achieving TM transmission power of about 90.54% and a power extinction ratio exceeding −100 dB in a frequency band of 1.0 THz. With the interval d3 set at about 10 µm and the period p3 at about 100 µm (with the thickness t3 determined to be about 90 µm), the wire grid device 3 is found to operate as a favorable polarizer for a terahertz wave band achieving TM transmission power of about 54.79% and a power extinction ratio exceeding −100 dB in a frequency band of 1.0 THz.

With the interval d3 set at about 50 µm and the period p3 at about 50.01 µm (with the thickness t3 determined to be about 0.01 µm), the wire grid device 3 is found to operate as a polarizer for a terahertz wave band achieving TM transmission power from about 84.19 to about 99.63% and a power extinction ratio from about −17.1 to −26.5 dB in a frequency band from 0.1 to 1.5 THz. With the interval d3 set at about 50 µm and the period p3 at about 50.1 µm (with the thickness t3 determined to be about 0.1 µm), the wire grid device 3 is found to operate as a polarizer for a terahertz wave band achieving TM transmission power from about 84.07 to about 99.63% and a power extinction ratio from about −17.1 to −26.5 dB in a frequency band from 0.1 to 1.5 THz. With the interval d3 set at about 50 µm and the period p3 at about 50.5 µm (with the thickness t3 determined to be about 0.5 µm), the wire grid device 3 is found to operate as a polarizer for a terahertz wave band achieving TM transmission power from about 83.54 to about 99.63% and a power extinction ratio from about −17.1 to −26.5 dB in a frequency band from 0.1 to 1.5 THz. With the interval d3 set at about 50 µm and the period p3 at about 100 µm (with the thickness t3 determined to be about 50 µm), the wire grid device 3 is found to operate as a polarizer for a terahertz wave band achieving TM transmission power from about 35.49 to about 97.67% and a power extinction ratio from about −13.9 to −22.8 dB in a frequency band from 0.1 to 1.5 THz.

As understood from above, with the width a3 of the metal thin plate 32 set at 50 µm, for making the wire grid device 3 operate as a polarizer for a terahertz wave band, an allowable range of the interval d3 is from 10 to 50 µm and an allowable range of the period p3 is from 10.01 to 100 µm.

By referring to FIG. 52 showing analysis results obtained with the width a3 of the metal thin plate 32 set at 1000 µm, TM transmission power oscillates vertically at each of the aforementioned frequencies from 0.1 to 1.5 THz. This oscillation results from the reason given above. As described above, as the period p3 increases to increase the thickness t3 of the metal thin plate 32, TM transmission power tends to be reduced. Further, as the interval d3 increases, a power extinction ratio tends to be reduced at a higher frequency.

As can be seen from FIG. 52, with the width a3 of the metal thin plate 32 set at 1000 µm, the interval d3 at about 10 µm, and the period p3 at about 10.01 µm (with the thickness t3 determined to be about 0.01 µm), the wire grid device 3 operates as an extremely favorable polarizer for a terahertz wave band achieving TM transmission power from about 82.27 to about 84.80% and a power extinction ratio exceeding −100 dB in a frequency band from 0.1 to 1.5 THz. With the interval d3 set at about 10 µm and the period p3 at about 10.1µm (with the thickness t3 determined to be about 0.1 µm), the wire grid device 3 is found to operate as an extremely favorable polarizer for a terahertz wave band achieving TM transmission power from about 81.73 to about 84.58% and a power extinction ratio exceeding −100 dB in a frequency band from 0.1 to 1.5 THz. With the interval d3 set at about 10 µm and the period p3 at about 10.5 µm (with the thickness t3 determined to be about 0.5 µm), the wire grid device 3 is found to operate as an extremely favorable polarizer for a terahertz wave band achieving TM transmission power from about 79.29 to about 83.58% and a power extinction ratio exceeding −100 dB in a frequency band from 0.1 to 1.5 THz.

With the interval d3 set at about 50 µm and the period p3 at about 50.01 µm (with the thickness t3 determined to be about 0.01 µm), the wire grid device 3 is found to operate as an extremely favorable polarizer for a terahertz wave band achieving TM transmission power from about 82.32 to about 84.82% and a power extinction ratio exceeding −100 dB in a frequency band from 0.1 to 1.5 THz. With the interval d3 set at about 50 µm and the period p3 at about 50.1 µm (with the thickness t3 determined to be about 0.1 µm), the wire grid device 3 is found to operate as an extremely favorable polarizer for a terahertz wave band achieving TM transmission power from about 82.21 to about 84.77% and a power extinction ratio exceeding −100 dB in a frequency band from 0.1 to 1.5 THz. With the interval d3 set at about 50 µm and the period p3 at about 50.5 µm (with the thickness t3 determined to be about 0.5 µm), the wire grid device 3 is found to operate as an extremely favorable polarizer for a terahertz wave band achieving TM transmission power from about 81.73 to about 84.58% and a power extinction ratio exceeding about −100 dB in a frequency band from 0.1 to 1.5 THz. With the interval d3 set at about 50 µm and the period p3 at about 100 µm (with the thickness t3 determined to be about 50 µm), the wire grid device 3 is found to operate as a polarizer for a terahertz wave band achieving TM transmission power from about 34.74 to 63.01% and a power extinction ratio exceeding about −100 dB in a frequency band from 0.1 to 1.5 THz.

With the interval d3 set at about 100 µm and the period p3 at about 100.01 µm (with the thickness t3 determined to be about 0.01 µm), the wire grid device 3 is found to operate as an extremely favorably polarizer for a terahertz wave band achieving TM transmission power from about 82.33 to about 83.35% and a power extinction ratio exceeding −100 dB in a frequency band from 0.1 to 0.5 THz. With the interval d3 set at about 100 µm and the period p3 at about 100.1 µm (with the thickness t3 determined to be about 0.1 µm), the wire grid device 3 is found to operate as an extremely favorable polarizer for a terahertz wave band achieving TM transmission power from about 82.27 to about 83.29% and a power extinction ratio exceeding −100 dB in a frequency band from 0.1 to 0.5 THz. With the interval d3 set at about 100 µm and the period p3 at about 100.5 µm (with the thickness t3 determined to be about 0.5 µm), the wire grid device 3 operates as an extremely favorable polarizer for a terahertz wave band achieving TM transmission power from about 82.03 to about 83.02% and a power extinction ratio exceeding about −100 dB in a frequency band from 0.1 to 0.5 THz.

With the interval d3 set at about 150 µm and the period p3 at about 150.01 µm (with the thickness t3 determined to be about 0.01 µm), the wire grid device 3 is found to operate as a polarizer for a terahertz wave band achieving TM transmission power from about 82.33 to about 83.35% and a power extinction ratio exceeding about −100 dB in a frequency band from 0.1 to 0.5 THz. With the interval d3 set at about 150 µm and the period p3 at about 150.1 µm (with the thickness t3 determined to be about 0.1 µm), the wire grid device 3 is found to operate as a polarizer for a terahertz wave band achieving TM transmission power from about 82.29 to about 83.31% and a power extinction ratio exceeding about −100 dB in a frequency band from 0.1 to 0.5 THz. With the interval d3 set at about 150 µm and the period p3 at about 150.5 µm (with the thickness t3 determined to be about 0.5 µm), the wire grid device 3 is found to operate as a polarizer for a terahertz wave band achieving TM transmission power from about 82.13 to about 83.14% and a power extinction ratio exceeding about −100 dB in a frequency band from 0.1 to 0.5 THz. With the interval d3 set at about 150 µm and the period p3 at about 300 µm (with the thickness t3 determined to be about 150 µm), the wire grid device 3 is found to operate as a polarizer for a terahertz wave band achieving TM transmission power from about 34.75 to about 36.71% and a power extinction ratio exceeding about −100 dB in a frequency band from 0.1 to 0.5 THz.

As understood from above, by increasing the width a3 of the metal thin plate 32 corresponding to a length in a propagation direction from 50 to 1000 µm, an allowable range of the interval d3 and an allowable range of the period p3 for making the wire grid device 3 operate as a polarizer for a terahertz wave band are expanded to a range from 10 to 150 µm and to a range from 10.01 to 300 µm respectively.

By referring to FIG. 53 showing analysis results obtained with the width a3 of the metal thin plate 32 set at 2000 µm, TM transmission power oscillates vertically at each of the aforementioned frequencies from 0.1 to 1.5 THz. This oscillation results from the reason given above. As described above, as the period p3 increases to increase the thickness t3 of the metal thin plate 32, TM transmission power tends to be reduced. Further, as the interval d3 increases, a power extinction ratio tends to be reduced at a higher frequency.

As can be seen from FIG. 53, with the width a3 of the metal thin plate 32 set at 2000 µm, the interval d3 at about 10 µm, and the period p3 at about 10.01 µm (with the thickness t3 determined to be about 0.01 µm), the wire grid device 3 operates as an extremely favorable polarizer for a terahertz wave band achieving TM transmission power from about 78.85 to about 85.65% and a power extinction ratio exceeding −100 dB in a frequency band from 0.1 to 1.5 THz. With the interval d3 set at about 10 µm and the period p3 at about 10.1 µm (with the thickness t3 determined to be about 0.1 µm), the wire grid device 3 is found to operate as an extremely favorable polarizer for a terahertz wave band achieving TM transmission power from about 78.76 to about 85.60% and a power extinction ratio exceeding −100 dB in a frequency band from 0.1 to 1.5 THz. With the interval d3 set at about 10 µm and the period p3 at about 10.5 µm (with the thickness t3 determined to be about 0.5 µm), the wire grid device 3 is found to operate as an extremely favorable polarizer for a terahertz wave band achieving TM transmission power from about 78.34 to about 85.36% and a power extinction ratio exceeding −100 dB in a frequency band from 0.1 to 1.5 THz. With the interval d3 set at about 10 µm and the period p3 at about 50 µm (with the thickness t3 determined to be about 40 µm), the wire grid device 3 is found to operate as a polarizer for a terahertz wave band achieving TM transmission power from about 21.36 to about 51.59% and a power extinction ratio exceeding −100 dB in a frequency band from 0.1 to 1.5 THz. With the interval d3 set at about 10 µm and the period p3 at about 100 µm (with the thickness t3 determined to be about 90 µm), the wire grid device 3 is found to operate as a polarizer for a terahertz wave band achieving TM transmission power of about 28.63% and a power extinction ratio exceeding −100 dB in a frequency band of 1.0 THz.

With the interval d3 set at about 50 µm and the period p3 at about 50.01 µm (with the thickness t3 determined to be about 0.01 µm), the wire grid device 3 is found to operate as an extremely favorable polarizer for a terahertz wave band achieving TM transmission power from about 82.93 to about 83.07% and a power extinction ratio exceeding −100 dB in a frequency band from 0.1 to 1.5 THz. With the interval d3 set at about 50 µm and the period p3 at about 50.1 µm (with the thickness t3 determined to be about 0.1 µm), the wire grid device 3 is found to operate as an extremely favorable polarizer for a terahertz wave band achieving TM transmission power from about 82.87 to about 83.03% and a power extinction ratio exceeding −100 dB in a frequency band from 0.1 to 1.5 THz. With the interval d3 set at about 50 µm and the period p3 at about 50.5 µm (with the thickness t3 determined to be about 0.5 µm), the wire grid device 3 is found to operate as an extremely favorable polarizer for a terahertz wave band achieving TM transmission power from about 78.76 to about 85.60% and a power extinction ratio exceeding about −100 dB in a frequency band from 0.1 to 1.5 THz. With the interval d3 set at about 50 µm and the period p3 at about 100 µm (with the thickness t3 determined to be about 50 µm), the wire grid device 3 is found to operate as a polarizer for a terahertz wave band achieving TM transmission power from about 34.80 to about 80.69% and a power extinction ratio exceeding about −100 dB in a frequency band from 0.1 to 1.5 THz.

With the interval d3 set at about 100 µm and the period p3 at about 100.01 µm (with the thickness t3 determined to be about 0.01 µm), the wire grid device 3 is found to operate as an extremely favorable polarizer for a terahertz wave band achieving TM transmission power from about 82.93 to about 83.07% and a power extinction ratio exceeding −100 dB in a frequency band from 0.1 to 0.5 THz. With the interval d3 set at about 100 µm and the period p3 at about 100.1 µm (with the thickness t3 determined to be about 0.1 µm), the wire grid device 3 is found to operate as an extremely favorable polarizer for a terahertz wave band achieving TM transmission power from about 82.87 to about 83.03% and a power extinction ratio exceeding −100 dB in a frequency band from 0.1 to 0.5 THz. With the interval d3 set at about 100 µm and the period p3 at about 100.5 µm (with the thickness t3 determined to be about 0.5 µm), the wire grid device 3 operates as an extremely favorable polarizer for a terahertz wave band achieving TM transmission power from about 82.61 to about 82.85% and a power extinction ratio exceeding about −100 dB in a frequency band from 0.1 to 0.5 THz. With the interval d3 set at about 100 μm and the period p3 at about 300 μm (with the thickness t3 determined to be about 200 μm), the wire grid device 3 operates as a polarizer for a terahertz wave band achieving TM transmission power of about 26.49% and a power extinction ratio exceeding about −100 dB in a frequency band of 0.5 THz.

With the interval d3 set at about 150 μm and the period p3 at about 150.01 μm (with the thickness t3 determined to be about 0.01 μm), the wire grid device 3 is found to operate as a polarizer for a terahertz wave band achieving TM transmission power from about 82.94 to about 83.07% and a power extinction ratio exceeding about −100 dB in a frequency band from 0.1 to 0.5 THz. With the interval d3 set at about 150 μm and the period p3 at about 150.1 μm (with the thickness t3 determined to be about 0.1 μm), the wire grid device 3 is found to operate as a polarizer for a terahertz wave band achieving TM transmission power from about 82.90 to about 83.04% and a power extinction ratio exceeding about −100 dB in a frequency band from 0.1 to 0.5 THz. With the interval d3 set at about 150 μm and the period p3 at about 150.5 μm (with the thickness t3 determined to be about 0.5 μm), the wire grid device 3 is found to operate as an extremely favorable polarizer for a terahertz wave band achieving TM transmission power from about 82.72 to about 82.92% and a power extinction ratio exceeding about −100 dB in a frequency band from 0.1 to 0.5 THz. With the interval d3 set at about 150 μm and the period p3 at about 300 μm (with the thickness t3 determined to be about 150 μm), the wire grid device 3 is found to operate as a polarizer for a terahertz wave band achieving TM transmission power from about 34.85 to about 45.74% and a power extinction ratio exceeding about −100 dB in a frequency band from 0.1 to 0.5 THz.

As understood from above, by further increasing the width a3 of the metal thin plate 32 corresponding to a length in a propagation direction to 2000 μm, an allowable range of the interval d3 and an allowable range of the period p3 for making the wire grid device 3 operate as a polarizer for a terahertz wave band are expanded to a range from 10 to 150 μm and to a range from 10.01 to 300 μm respectively. Thus, the wire grid device 3 of the third embodiment is found to operate as a polarizer for a terahertz wave band having favorable characteristics that cannot be achieved conventionally.

Next, with the aforementioned parameters about the wire grid device 3 of the third embodiment, TM transmission power [%] in the TM mode and a power extinction ratio [dB] were analyzed in a high-frequency range in a terahertz wave band at a frequency from 2 to 10 THz. Results of this analysis are shown in the tables in FIGS. 54 to 80. In this case, the width a3 of the metal thin plate 32 corresponding to a length in a propagation direction (z-axis direction) was set at the following three values: 50 μm, 1000 μm, and 2000 μm. The interval d3 between the metal thin plates 32 was set in a range from 1 to 150 μm and the period p3 (=d3+t3) was set in a range from 1.01 to 300 μm. Virtual periodic boundary walls were arranged outside the wire grid device 3 of the third embodiment and a two-dimensional analytic model was designed by extracting one of these periodic boundary walls by employing the mode-matching method. An extinction ratio was determined in consideration of a propagation coefficient in the TE mode in a parallel flat plate configured by the metal thin plate 32, as described above.

FIGS. 54 to 62 are tables each showing analysis results obtained with the width a3 of the metal thin plate 32 set at 50 μm. FIGS. 63 to 71 are tables each showing analysis results obtained with the width a3 of the metal thin plate 32 set at 1000 μm. FIGS. 72 to 80 are tables each showing analysis results obtained with the width a3 of the metal thin plate 32 set at 2000 μm. The analysis results in each of these cases are obtained by setting the interval d3 between the metal thin plates 32 at 1 μm, 5 μm, 10 μm, 23 μm, 50 μm, 100 μm, and 150 μm, and by making the period p3 (=d3+t3) settable at a value from 1.01 to 300 μm that depends on the interval d3. In these cases, the metal thickness t3 of the metal thin plate 32 is also defined in the tables and a value of the thickness t3 is calculated as follows: t3=p3−d3. Further, the complex index of refraction of the polymer film 31 was set at about 1.53+j0.0064.

By referring to FIGS. 54 to 62 showing analysis results obtained with the width a3 of the metal thin plate 32 set at 50 μm, TM transmission power oscillates vertically at each of the aforementioned frequencies from 2 to 10 THz. This oscillation results from the reason given above. As described above, as the period p3 increases to increase the thickness t3 of the metal thin plate 32, TM transmission power tends to be reduced. Further, as the interval d3 increases, a power extinction ratio tends to be reduced at a higher frequency.

As can be seen from the drawings from FIGS. 54 to 62, with the width a3 of the metal thin plate 32 set at 50 μm, the interval d3 at about 1 μm, and the period p3 at about 1.01 μm (with the thickness t3 determined to be about 0.01 μm), the wire grid device 3 operates as an extremely favorable polarizer for a terahertz wave band achieving TM transmission power from about 83.35 to about 99.92% and a power extinction ratio exceeding −100 dB in a frequency band from 2 to 10 THz. With the interval d3 set at about 1 μm and the period p3 at about 1.1 μm (with the thickness t3 determined to be about 0.1 μm), the wire grid device 3 is found to operate as an extremely favorable polarizer for a terahertz wave band achieving TM transmission power from about 77.31 to about 99.87% and a power extinction ratio exceeding −100 dB in a frequency band from 2 to 10 THz. With the interval d3 set at about 1 μm and the period p3 at about 1.5 μm (with the thickness t3 determined to be about 0.5 μm), the wire grid device 3 is found to operate as a favorable polarizer for a terahertz wave band achieving TM transmission power from about 53.91 to about 99.59% and a power extinction ratio exceeding −100 dB in a frequency band from 2 to 10 THz. With the interval d3 set at about 1 μm and the period p3 at about 11 μm (with the thickness t3 determined to be about 10 μm), the wire grid device 3 is found to operate as a polarizer for a terahertz wave band achieving TM transmission power from about 13.71 to about 58.50% and a power extinction ratio exceeding −100 dB in frequency bands of 2 THz, 4 THz, and 6 THz. With the interval d3 set at about 1 μm and the period p3 at about 31 μm (with the thickness t3 determined to be about 30 μm), the wire grid device 3 is found to operate as a favorable polarizer for a terahertz wave band achieving TM transmission power of about 11.25% and a power extinction ratio exceeding −100 dB in a frequency band of 2 THz. With the interval d3 set at about 1 μm and the period p3 at about 300 μm (with the thickness t3 determined to be about 299 μm), favorable TM transmission power is not achieved in a frequency band from 2 to 10 THz. In this case, the wire grid device 3 is found to be substantially inoperable as a polarizer for a terahertz wave band.

With the width a3 of the metal thin plate 32 set at 50 μm, the interval d3 at about 5 μm, and the period p3 at about 5.01

μm (with the thickness t3 determined to be about 0.01 μm), the wire grid device 3 is found to operate as an extremely favorable polarizer for a terahertz wave band achieving TM transmission power from about 83.89 to about 99.92% and a power extinction ratio exceeding −100 dB in a frequency band from 2 to 10 THz. With the interval d3 set at about 5 μm and the period p3 at about 5.1 μm (with the thickness t3 determined to be about 0.1 μm), the wire grid device 3 is found to operate as an extremely favorable polarizer for a terahertz wave band achieving TM transmission power from about 82.68 to about 99.91% and a power extinction ratio exceeding −100 dB in a frequency band from 2 to 10 THz. With the interval d3 set at about 5 μm and the period p3 at about 5.5 μm (with the thickness t3 determined to be about 0.5 μm), the wire grid device 3 is found to operate as a favorable polarizer for a terahertz wave band achieving TM transmission power from about 77.32 to about 99.87% and a power extinction ratio exceeding −100 dB in a frequency band from 2 to 10 THz. With the interval d3 set at about 5 μm and the period p3 at about 20 μm (with the thickness t3 determined to be about 15 μm), the wire grid device 3 is found to operate as a polarizer for a terahertz wave band achieving TM transmission power from about 10.57 to about 81.79% and a power extinction ratio exceeding −100 dB in a frequency band from 2 to 10 THz. With the interval d3 set at about 5 μm and the period p3 at about 85 μm (with the thickness t3 determined to be about 80 μm), and with the interval d3 set at about 5 μm and the period p3 at about 300 μm (with the thickness t3 determined to be about 295 μm), favorable TM transmission power is not achieved in a frequency band from 2 to 10 THz. In these cases, the wire grid device 3 is found to be substantially inoperable as a polarizer for a terahertz wave band.

With the width a3 of the metal thin plate 32 set at 50 μm, the interval d3 at about 10 μm, and the period p3 at about 10.01 μm (with the thickness t3 determined to be about 0.01 μm), the wire grid device 3 is found to operate as an extremely favorable polarizer for a terahertz wave band achieving TM transmission power from about 83.95 to about 99.92% and a power extinction ratio exceeding −100 dB in a frequency band from 2 to 9 THz. Meanwhile, in a frequency band of 10 THz, setting the interval d3 at about 10 μm or more results in a power extinction ratio of −0 dB. In this case, the wire grid device 3 is found to be inoperable as a polarizer. With the interval d3 set at about 10 μm and the period p3 at about 10.1μm (with the thickness t3 determined to be about 0.1 μm), the wire grid device 3 is found to operate as an extremely favorable polarizer for a terahertz wave band achieving TM transmission power from about 83.35 to about 99.91% and a power extinction ratio exceeding −100 dB in a frequency band from 2 to 9 THz. With the interval d3 set at about 10 μm and the period p3 at about 10.5 μm (with the thickness t3 determined to be about 0.5 μm), the wire grid device 3 is found to operate as a favorable polarizer for a terahertz wave band achieving TM transmission power from about 80.67 to about 99.89% and a power extinction ratio exceeding −100 dB in a frequency band from 2 to 9 THz. With the interval d3 set at about 10 μm and the period p3 at about 50 μm (with the thickness t3 determined to be about 40 μm), the wire grid device 3 is found to operate as a polarizer for a terahertz wave band achieving TM transmission power from about 13.56 to about 44.61% and a power extinction ratio exceeding −100 dB in frequency bands of 2 THz, 4 THz, and 5 THz. With the interval d3 set at about 10 μm and the period p3 at about 100 μm (with the thickness t3 determined to be about 90μm), and with the interval d3 set at about 10 μm and the period p3 at about 300 μm (with the thickness t3 determined to be about 290 μm), favorable TM transmission power is not achieved in a frequency band from 2 to 10 THz. In these cases, the wire grid device 3 is found to be substantially inoperable as a polarizer for a terahertz wave band.

With the width a3 of the metal thin plate 32 set at 50 μm, the interval d3 at about 23 μm, and the period p3 at about 23.01 μm (with the thickness t3 determined to be about 0.01 μm), the wire grid device 3 is found to operate as a favorable polarizer for a terahertz wave band achieving TM transmission power from about 83.99 to about 99.92% and a power extinction ratio from about −20.4 to about −52.4 dB in a frequency band from 2 to 4 THz. Meanwhile, in a frequency band from 5 to 10 THz, setting the interval d3 at about 23 μm or more results in a power extinction ratio of −0 dB. In this case, the wire grid device 3 is found to be inoperable as a polarizer. With the interval d3 set at about 23 μm and the period p3 at about 23.1 μm (with the thickness t3 determined to be about 0.1 μm), the wire grid device 3 is found to operate as a polarizer for a terahertz wave band achieving TM transmission power from about 83.73 to about 99.92% and a power extinction ratio from about −20.4 to about −52.4 dB in a frequency band from 2 to 4 THz. With the interval d3 set at about 23 μm and the period p3 at about 23.5 μm (with the thickness t3 determined to be about 0.5 μm), the wire grid device 3 is found to operate as a polarizer for a terahertz wave band achieving TM transmission power from about 82.56 to about 99.91% and a power extinction ratio from about −20.4 to about −52.4 dB in a frequency band from 2 to 4 THz. With the interval d3 set at about 23 μm and the period p3 at about 43 μm (with the thickness t3 determined to be about 20 μm), the wire grid device 3 is found to operate as a polarizer for a terahertz wave band achieving TM transmission power from about 41.06 to about 92.23% and a power extinction ratio from about −18.9 to about −52.0 dB in a frequency band from 2 to 4 THz. With the interval d3 set at about 23 μm and the period p3 at about 123 μm (with the thickness t3 determined to be about 100 μm), and with the interval d3 set at about 23 μm and the period p3 at about 300 μm (with the thickness t3 determined to be about 277 μm), favorable TM transmission power is not achieved in a frequency band from 2 to 10 THz. In these cases, the wire grid device 3 is found to be substantially inoperable as a polarizer for a terahertz wave band.

With the width a3 of the metal thin plate 32 set at 50 μm, and with the interval d3 set at about 50 μm, about 100 μm, and about 150 μm, a power extinction ratio is −0.0 dB in a frequency band from 2 to 10 THz with any dimension of the period p3. Thus, the wire grid device 3 is found to be inoperable as a polarizer in a frequency band from 2 to 10 THz with the interval d3 set at about 50 μm, about 100 μm, and about 150 μm.

As understood from above, with the width a3 of the metal thin plate 32 set at 50 μm, for making the wire grid device 3 operate as a polarizer for a terahertz wave band in a frequency band from 2 to 10 THz, an allowable range of the interval d3 is from about 1 to about 5 μm and an allowable range of the period p3 is from about 1.01 to about 20 μm. As understood from above, with the width a3 of the metal thin plate 32 set at 50 μm, for making the wire grid device 3 operate as a polarizer for a terahertz wave band in a frequency band from 2 to 4 THz, an allowable range of the interval d3 is from about 1 to about 23 μm and an allowable range of the period p3 is from about 1.01 to about 43 μm. With the width a3 of the metal thin plate 32 set at 50 μm, the interval d3 set at about 10 μm works most effectively in a frequency band from 2 to 10 THz. In a frequency band from 2 to 4 THz, the interval d3 set in a range from about 10 to about 23 µm works most effectively.

By referring to FIGS. 63 to 71 showing analysis results obtained with the width a3 of the metal thin plate 32 set at 1000 µm, TM transmission power oscillates vertically at each of the aforementioned frequencies from 2 to 10 THz. This oscillation results from the reason given above. As described above, as the period p3 increases to increase the thickness t3 of the metal thin plate 32, TM transmission power tends to be reduced. Further, as the interval d3 increases, a power extinction ratio tends to be reduced at a higher frequency.

As can be seen from the drawings from FIGS. 63 to 71, with the width a3 of the metal thin plate 32 set at 1000 µm, the interval d3 at about 1 µm, and the period p3 at about 1.01 µm (with the thickness t3 determined to be about 0.01 µm), the wire grid device 3 operates as an extremely favorable polarizer for a terahertz wave band achieving TM transmission power from about 83.59 to about 99.77% and a power extinction ratio exceeding −100 dB in a frequency band from 2 to 10 THz. With the interval d3 set at about 1 µm and the period p3 at about 1.1 µm (with the thickness t3 determined to be about 0.1 µm), the wire grid device 3 is found to operate as an extremely favorable polarizer for a terahertz wave band achieving TM transmission power from about 77.60 to about 99.66% and a power extinction ratio exceeding −100 dB in a frequency band from 2 to 10 THz. With the interval d3 set at about 1 µm and the period p3 at about 1.5 µm (with the thickness t3 determined to be about 0.5 µm), the wire grid device 3 is found to operate as a favorable polarizer for a terahertz wave band achieving TM transmission power from about 54.20 to about 98.84% and a power extinction ratio exceeding −100 dB in a frequency band from 2 to 10 THz. With the interval d3 set at about 1 µm and the period p3 at about 11 µm (with the thickness t3 determined to be about 10 µm), the wire grid device 3 is found to operate as a polarizer for a terahertz wave band achieving TM transmission power from about 16.37 to about 27.07% and a power extinction ratio exceeding −100 dB in frequency bands of 5 THz and 9 THz. With the interval d3 set at about 1 µm and the period p3 at about 31 µm (with the thickness t3 determined to be about 30 µm), the wire grid device 3 is found to operate as a favorable polarizer for a terahertz wave band achieving TM transmission power of about 33.20% and a power extinction ratio exceeding −100 dB in a frequency band of 9 THz. With the interval d3 set at about 1 µm and the period p3 at about 300 µm (with the thickness t3 determined to be about 299 µm), favorable TM transmission power is not achieved in a frequency band from 2 to 10 THz. In this case, the wire grid device 3 is found to be substantially inoperable as a polarizer for a terahertz wave band.

With the width a3 of the metal thin plate 32 set at 1000 µm, the interval d3 at about 5 µm, and the period p3 at about 5.01 µm (with the thickness t3 determined to be about 0.01 µm), the wire grid device 3 is found to operate as an extremely favorable polarizer for a terahertz wave band achieving TM transmission power from about 84.12 to about 99.78% and a power extinction ratio exceeding −100 dB in a frequency band from 2 to 10 THz. With the interval d3 set at about 5 µm and the period p3 at about 5.1 µm (with the thickness t3 determined to be about 0.1 µm), the wire grid device 3 is found to operate as an extremely favorable polarizer for a terahertz wave band achieving TM transmission power from about 82.93 to about 99.76% and a power extinction ratio exceeding −100 dB in a frequency band from 2 to 10 THz. With the interval d3 set at about 5 µm and the period p3 at about 5.5 µm (with the thickness t3 determined to be about 0.5 µm), the wire grid device 3 is found to operate as a favorable polarizer for a terahertz wave band achieving TM transmission power from about 77.56 to about 99.62% and a power extinction ratio exceeding −100 dB in a frequency band from 2 to 10 THz. With the interval d3 set at about 5 µm and the period p3 at about 20 µm (with the thickness t3 determined to be about 15 µm), the wire grid device 3 is found to operate as a polarizer for a terahertz wave band achieving TM transmission power from about 9.87 to about 96.97% and a power extinction ratio exceeding −100 dB in a frequency band from 2 to 10 THz. With the interval d3 set at about 5 µm and the period p3 at about 85 µm (with the thickness t3 determined to be about 80 µm), and with the interval d3 set at about 5 µm and the period p3 at about 300 µm (with the thickness t3 determined to be about 295 µm), favorable TM transmission power is not achieved in a frequency band from 2 to 10 THz. In these cases, the wire grid device 3 is found to be substantially inoperable as a polarizer for a terahertz wave band.

With the width a3 of the metal thin plate 32 set at 1000 µm, the interval d3 at about 10 µm, and the period p3 at about 10.01 µm (with the thickness t3 determined to be about 0.01 µm), the wire grid device 3 is found to operate as an extremely favorable polarizer for a terahertz wave band achieving TM transmission power from about 84.19 to about 99.78% and a power extinction ratio exceeding −100 dB in a frequency band from 2 to 9 THz. Meanwhile, in a frequency band of 10 THz, setting the interval d3 at about 10 µm or more results in a power extinction ratio of −0 dB. In this case, the wire grid device 3 is found to be inoperable as a polarizer. With the interval d3 set at about 10 µm and the period p3 at about 10.1µm (with the thickness t3 determined to be about 0.1 µm), the wire grid device 3 is found to operate as an extremely favorable polarizer for a terahertz wave band achieving TM transmission power from about 83.59 to about 99.77% and a power extinction ratio exceeding −100 dB in a frequency band from 2 to 9 THz. With the interval d3 set at about 10 µm and the period p3 at about 10.5 µm (with the thickness t3 determined to be about 0.5 µm), the wire grid device 3 is found to operate as a favorable polarizer for a terahertz wave band achieving TM transmission power from about 80.90 to about 99.70% and a power extinction ratio exceeding −100 dB in a frequency band from 2 to 9 THz. With the interval d3 set at about 10 µm and the period p3 at about 50 µm (with the thickness t3 determined to be about 40 µm), the wire grid device 3 is found to operate as a polarizer for a terahertz wave band achieving TM transmission power from about 10.91 to 100% and a power extinction ratio exceeding −100 dB in a frequency band from 3 to 4 THz. With the interval d3 set at about 10 µm and the period p3 at about 100 µm (with the thickness t3 determined to be about 90 µm), and with the interval d3 set at about 10 µm and the period p3 at about 300 µm (with the thickness t3 determined to be about 290 µm), favorable TM transmission power is not achieved in a frequency band from 2 to 10 THz. In these cases, the wire grid device 3 is found to be substantially inoperable as a polarizer for a terahertz wave band.

With the width a3 of the metal thin plate 32 set at 1000 µm, the interval d3 at about 23 µm, and the period p3 at about 23.01 µm (with the thickness t3 determined to be about 0.01 µm), the wire grid device 3 is found to operate as a polarizer for a terahertz wave band achieving TM transmission power from about 84.85 to about 95.12% and a power extinction ratio exceeding −100 dB in a frequency band from 2 to 4 THz. Meanwhile, in a frequency band from 5 to 10 THz, setting the interval d3 at about 23 µm or more results in a power extinction ratio of −0 dB. In this case, the wire grid device 3 is found to be inoperable as a polarizer. With the interval d3 set at about 23 µm and the period p3 at about 23.01 µm (with the thickness t3 determined to be about 0.1 µm), the wire grid device 3 is found to operate as a polarizer for a terahertz wave band achieving TM transmission power from about 84.60 to about 95.03% and a power extinction ratio exceeding −100 dB in a frequency band from 2 to 4 THz. With the interval d3 set at about 23 µm and the period p3 at about 23.5 µm (with the thickness t3 determined to be about 0.5 µm), the wire grid device 3 is found to operate as a polarizer for a terahertz wave band achieving TM transmission power from about 83.47 to about 94.65% and a power extinction ratio exceeding −100 dB in a frequency band from 2 to 4 THz. With the interval d3 set at about 23 µm and the period p3 at about 43 µm (with the thickness t3 determined to be about 20 µm), the wire grid device 3 is found to operate as a polarizer for a terahertz wave band achieving TM transmission power from about 38.71 to about 95.63% and a power extinction ratio exceeding −100 dB in a frequency band from 2 to 4 THz. With the interval d3 set at about 23 µm and the period p3 at about 123 µm (with the thickness t3 determined to be about 100 µm), and with the interval d3 set at about 23 µm and the period p3 at about 300 µm (with the thickness t3 determined to be about 277 µm), favorable TM transmission power is not achieved in a frequency band from 2 to 10 THz. In these cases, the wire grid device 3 is found to be substantially inoperable as a polarizer for a terahertz wave band.

With the width a3 of the metal thin plate 32 set at 1000 µm, and with the interval d3 set at about 50 µm, about 100 µm, and about 150 µm, a power extinction ratio is −0.0 dB in a frequency band from 2 to 10 THz with any dimension of the period p3. Thus, the wire grid device 3 is found to be inoperable as a polarizer in a frequency band from 2 to 10 THz with the interval d3 set at about 50 µm, about 100 µm, and about 150 µm.

As understood from above, with the width a3 of the metal thin plate 32 set at 1000 µm, for making the wire grid device 3 operate as a polarizer for a terahertz wave band in a frequency band from 2 to 10 THz, an allowable range of the interval d3 is from about 1 to about 5 µm and an allowable range of the period p3 is from about 1.01 to about 20 µm. As understood from above, with the width a3 of the metal thin plate 32 set at 1000 µm, for making the wire grid device 3 operate as a polarizer for a terahertz wave band in a frequency band from 2 to 4 THz, an allowable range of the interval d3 is from about 1 to about 23 µm and an allowable range of the period p3 is from about 1.01 to about 43 µm. With the width a3 of the metal thin plate 32 set at 1000 µm, the interval d3 set at about 10 µm works most effectively in a frequency band from 2 to 10 THz. In a frequency band from 2 to 4 THz, the interval d3 set in a range from about 10 to about 23 µm works most effectively.

By referring to FIGS. 72 to 80 showing analysis results obtained with the width a3 of the metal thin plate 32 set at 2000 µm, TM transmission power oscillates vertically at each of the aforementioned frequencies from 2 to 10 THz. This oscillation results from the reason given above. As described above, as the period p3 increases to increase the thickness t3 of the metal thin plate 32, TM transmission power tends to be reduced. Further, as the interval d3 increases, a power extinction ratio tends to be reduced at a higher frequency.

As can be seen from the drawings from FIGS. 72 to 80, with the width a3 of the metal thin plate 32 set at 2000 µm, the interval d3 at about 1 µm, and the period p3 at about 1.01 µm (with the thickness t3 determined to be about 0.01 µm), the wire grid device 3 operates as an extremely favorable polarizer for a terahertz wave band achieving TM transmission power from about 83.26 to about 99.10% and a power extinction ratio exceeding −100 dB in a frequency band from 2 to 10 THz. With the interval d3 set at about 1 µm and the period p3 at about 1.1 µm (with the thickness t3 determined to be about 0.1 µm), the wire grid device 3 is found to operate as an extremely favorable polarizer for a terahertz wave band achieving TM transmission power from about 77.19 to about 98.67% and a power extinction ratio exceeding −100 dB in a frequency band from 2 to 10 THz. With the interval d3 set at about 1 µm and the period p3 at about 1.5 µm (with the thickness t3 determined to be about 0.5 µm), the wire grid device 3 is found to operate as a favorable polarizer for a terahertz wave band achieving TM transmission power from about 53.69 to about 95.92% and a power extinction ratio exceeding −100 dB in a frequency band from 2 to 10 THz. With the interval d3 set at about 1 µm and the period p3 at about 11 µm (with the thickness t3 determined to be about 10 µm), the wire grid device 3 is found to operate as a polarizer for a terahertz wave band achieving TM transmission power from about 13.69 to about 25.89% and a power extinction ratio exceeding −100 dB in frequency bands of 5 THz and 7 THz. With the interval d3 set at about 1 µm and the period p3 at about 31 µm (with the thickness t3 determined to be about 30 µm), the wire grid device 3 is found to operate as a favorable polarizer for a terahertz wave band achieving TM transmission power of about 12.08% and a power extinction ratio exceeding −100 dB in a frequency band of 7 THz. With the interval d3 set at about 1 µm and the period p3 at about 300 µm (with the thickness t3 determined to be about 299 µm), favorable TM transmission power is not achieved in a frequency band from 2 to 10 THz. In this case, the wire grid device 3 is found to be substantially inoperable as a polarizer for a terahertz wave band.

With the width a3 of the metal thin plate 32 set at 2000 µm, the interval d3 at about 5 µm, and the period p3 at about 5.01 µm (with the thickness t3 determined to be about 0.01 µm), the wire grid device 3 is found to operate as an extremely favorable polarizer for a terahertz wave band achieving TM transmission power from about 83.80 to about 99.13% and a power extinction ratio exceeding −100 dB in a frequency band from 2 to 10 THz. With the interval d3 set at about 5 µm and the period p3 at about 5.1 µm (with the thickness t3 determined to be about 0.1 µm), the wire grid device 3 is found to operate as an extremely favorable polarizer for a terahertz wave band achieving TM transmission power from about 82.59 to about 99.05% and a power extinction ratio exceeding −100 dB in a frequency band from 2 to 10 THz. With the interval d3 set at about 5 µm and the period p3 at about 5.5 µm (with the thickness t3 determined to be about 0.5 µm), the wire grid device 3 is found to operate as a favorable polarizer for a terahertz wave band achieving TM transmission power from about 77.18 to about 98.61% and a power extinction ratio exceeding −100 dB in a frequency band from 2 to 10 THz. With the interval d3 set at about 5 µm and the period p3 at about 20 µm (with the thickness t3 determined to be about 15 µm), the wire grid device 3 is found to operate as a polarizer for a terahertz wave band achieving TM transmission power from about 9.61 to about 99.31% and a power extinction ratio exceeding −100 dB in a frequency band from 2 to 10 THz. With the interval d3 set at about 5 µm and the period p3 at about 85 µm (with the thickness t3 determined to be about 80 µm), and with the interval d3 set at about 5 µm and the period p3 at about 300 µm (with the thickness t3 determined to be about 295 µm), favorable TM transmission power is not achieved in a frequency band from 2 to 10 THz. In these cases, the wire grid device 3 is found to be substantially inoperable as a polarizer for a terahertz wave band.

With the width a3 of the metal thin plate 32 set at 2000 µm, the interval d3 at about 10 µm, and the period p3 at about 10.01 µm (with the thickness t3 determined to be about 0.01 µm), the wire grid device 3 is found to operate as an extremely favorable polarizer for a terahertz wave band achieving TM transmission power from about 83.87 to about 99.14% and a power extinction ratio exceeding −100 dB in a frequency band from 2 to 9 THz. Meanwhile, in a frequency band of 10 THz, setting the interval d3 at about 10 µm or more results in a power extinction ratio of −0 dB. In this case, the wire grid device 3 is found to be inoperable as a polarizer. With the interval d3 set at about 10 µm and the period p3 at about 10.1µm (with the thickness t3 determined to be about 0.1 µm), the wire grid device 3 is found to operate as an extremely favorable polarizer for a terahertz wave band achieving TM transmission power from about 83.26 to about 99.10% and a power extinction ratio exceeding −100 dB in a frequency band from 2 to 9 THz. With the interval d3 set at about 10 µm and the period p3 at about 10.5 µm (with the thickness t3 determined to be about 0.5 µm), the wire grid device 3 is found to operate as a favorable polarizer for a terahertz wave band achieving TM transmission power from about 80.55 to about 98.88% and a power extinction ratio exceeding −100 dB in a frequency band from 2 to 9 THz. With the interval d3 set at about 10 µm and the period p3 at about 50 µm (with the thickness t3 determined to be about 40 µm), the wire grid device 3 is found to operate as a polarizer for a terahertz wave band achieving TM transmission power from about 7.50 to about 42.35% and a power extinction ratio exceeding −100 dB in a frequency band from 2 to 4 THz. With the interval d3 set at about 10 µm and the period p3 at about 100 µm (with the thickness t3 determined to be about 90 µm), the wire grid device 3 is found to operate as a polarizer for a terahertz wave band achieving TM transmission power of about 43.26% and a power extinction ratio exceeding −100 dB in a frequency band of 2 THz. With the interval d3 set at about 10 µm and the period p3 at about 300 µm (with the thickness t3 determined to be about 290 µm), favorable TM transmission power is not achieved in a frequency band from 2 to 10 THz. In this case, the wire grid device 3 is found to be substantially inoperable as a polarizer for a terahertz wave band.

With the width a3 of the metal thin plate 32 set at 2000 µm, the interval d3 at about 23 µm, and the period p3 at about 23.01 µm (with the thickness t3 determined to be about 0.01 µm), the wire grid device 3 is found to operate as a polarizer for a terahertz wave band achieving TM transmission power from about 86.91 to about 95.12% and a power extinction ratio exceeding −100 dB in a frequency band from 2 to 4 THz. Meanwhile, in a frequency band from 5 to 10 THz, setting the interval d3 at about 23 µm or more results in a power extinction ratio of −0 dB. In this case, the wire grid device 3 is found to be inoperable as a polarizer. With the interval d3 set at about 23 µm and the period p3 at about 23.1 µm (with the thickness t3 determined to be about 0.1 µm), the wire grid device 3 is found to operate as a polarizer for a terahertz wave band achieving TM transmission power from about 86.69 to about 95.03% and a power extinction ratio exceeding −100 dB in a frequency band from 2 to 4 THz. With the interval d3 set at about 23 µm and the period p3 at about 23.5 µm (with the thickness t3 determined to be about 0.5 µm), the wire grid device 3 is found to operate as a polarizer for a terahertz wave band achieving TM transmission power from about 85.72 to about 94.63% and a power extinction ratio exceeding −100 dB in a frequency band from 2 to 4 THz. With the interval d3 set at about 23 µm and the period p3 at about 43 µm (with the thickness t3 determined to be about 20 µm), the wire grid device 3 is found to operate as a polarizer for a terahertz wave band achieving TM transmission power from about 45.71 to about 82.22% and a power extinction ratio exceeding −100 dB in a frequency band from 2 to 4 THz. With the interval d3 set at about 23 µm and the period p3 at about 123 µm (with the thickness t3 determined to be about 100 µm), the wire grid device 3 is found to operate as a polarizer for a terahertz wave band achieving TM transmission power of about 45.89% and a power extinction ratio exceeding −100 dB in a frequency band of 2 THz. With the interval d3 set at about 23 µm and the period p3 at about 300 µm (with the thickness t3 determined to be about 277 µm), favorable TM transmission power is not achieved in a frequency band from 2 to 10 THz. In this case, the wire grid device 3 is found to be substantially inoperable as a polarizer for a terahertz wave band.

With the width a3 of the metal thin plate 32 set at 2000 µm, and with the interval d3 set at about 50 µm, about 100 µm, and about 150 µm, a power extinction ratio is −0.0 dB in a frequency band from 2 to 10 THz with any dimension of the period p3. Thus, the wire grid device 3 is found to be inoperable as a polarizer in a frequency band from 2 to 10 THz with the interval d3 set at about 50 µm, about 100 µm, and about 150 µm.

As understood from above, with the width a3 of the metal thin plate 32 set at 2000 µm, for making the wire grid device 3 operate as a polarizer for a terahertz wave band in a frequency band from 2 to 10 THz, an allowable range of the interval d3 is from about 1 to about 5 µm and an allowable range of the period p3 is from about 1.01 to about 20 µm. As understood from above, with the width a3 of the metal thin plate 32 set at 2000 µm, for making the wire grid device 3 operate as a polarizer for a terahertz wave band in a frequency band from 2 to 4 THz, an allowable range of the interval d3 is from about 1 to about 23 µm and an allowable range of the period p3 is from about 1.01 to about 43 µm. With the width a3 of the metal thin plate 32 set at 2000 µm, the interval d3 set at about 10 µm works most effectively in a frequency band from 2 to 10 THz. In a frequency band from 2 to 4 THz, the interval d3 set in a range from about 10 to about 23 µm works most effectively.

INDUSTRIAL APPLICABILITY

The aforementioned dimensions given in relation to the wire grid device according to this invention described above are not restrictive but merely illustrative. Even if the upper limit and the lower limit of the range of each dimension are slightly expanded, for example, the wire grid device according to this invention is still capable of achieving an extinction ratio that cannot be achieved conventionally in a terahertz wave band.

The aforementioned analysis results given in FIGS. 10 to 13, which show the analysis results about the wire grid device of the second embodiment, also apply to the wire grid device of the first embodiment. Specifically, in the wire grid device according to each of the first and second embodiments of this invention, the length a of a parallel flat plate in a propagation direction is preferably set in a range from about 50 to about 3000 µm. With the length a set at about 50 µm, the interval d between parallel flat plates is preferably set in a range from about 10 to about 50 µm and a period of the parallel flat plate is preferably set in a range from about 11 to about 50 µm. With the length a set in a range from about 1000 to about 3000 µm, the interval d between the parallel flat plates is preferably set in a range from about 10 to about 150 µm and the period of the parallel flat plate is preferably set in a range from about 11 to about 300 µm. In this case, setting the length of the parallel flat plate in the propagation direction at 1000 µm or more makes the wire grid device operate as a polarizer for a terahertz wave band achieving TM transmission power of about 40% or more and an extinction ratio exceeding −100 dB in many frequency ranges from 0.1 to 2.5 THz.

With the width a2 of the grid part 20a corresponding to the length of a parallel flat plate in a propagation direction set in a range from 50 to 3000 µm, for making the wire grid device according to each of the first and second embodiments of this invention operate as a polarizer for a terahertz wave band in a frequency band from 3 to 10 THz, an allowable range of the interval d2 is found to be from about 1 to about 10 µm and an allowable range of the period p2 is found to be from about 2 to about 20 µm. With the width a2 of the grid part 20a set in a range from 50 to 3000 µm, for making the wire grid device according to each of the first and second embodiments of this invention operate as a polarizer for a terahertz wave band in a frequency band from 3 to 6 THz, an allowable range of the interval d2 is found to be from about 1 to about 23 µm and an allowable range of the period p2 is found to be from about 2 to about 43 µm. With the width a2 of the grid part 20a set in a range from 50 to 3000 µm, the interval d2 set at about 10 µm works most effectively in a frequency band from 3 to 10 THz. In a frequency band from 3 to 6 THz, the interval d2 set in a range from about 10 to about 23 µm works most effectively.

In the wire grid device according to the second embodiment of this invention, the number of grid plates to be stacked is determined in a manner such that a dimension obtained by stacking the grid plates through spacers reaches the dimension of the height of an opening required for the wire grid device.

In this case, an interval between parallel flat plates forming the wire grid of the wire grid device according to the second embodiment is a parameter that determines the performance of the wire grid device. Even if being produced on a large scale by assembly, the wire grid device according to the second embodiment of this invention can still maintain this interval at a constant value stably, thereby increasing the yield of this wire grid device. Additionally, a frequency band to be applied can be changed by only changing the thickness of the spacer.

In the wire grid device of the first embodiment, slits may be formed in a substantially entire region of a frame to extend parallel to a side of the frame.

In the wire grid device according to the third embodiment of this invention, the length a of a parallel flat plate in a propagation direction is preferably set in a range from about 50 to about 2000 µm. With the length a set at about 50 µm, the interval d between parallel flat plates is preferably set in a range from about 10 to about 50 µm and a period of the parallel flat plate is preferably set in a range from about 10.01 to about 100 µm. With the length a set in a range from about 1000 to about 2000 µm, the interval d between the parallel flat plates is preferably set in a range from about 10 to about 150 µm and the period of the parallel flat plate is preferably set in a range from about 10.01 to about 300 µm. In this case, setting the length of the parallel flat plate in the propagation direction at 1000 µm or more makes the wire grid device operate as a polarizer for a terahertz wave band achieving TM transmission power of about 40% or more and an extinction ratio exceeding −100 dB in many frequency ranges from 0.1 to 1.5 THz.

With the width a3 of the metal thin plate 32 corresponding to the length of a parallel flat plate in a propagation direction set in a range from 50 to 2000 µm, for making the wire grid device according to the third embodiment of this invention operate as a polarizer for a terahertz wave band in a frequency band from 2 to 10 THz, an allowable range of the interval d3 is found to be from about 1 to about 5 µm and an allowable range of the period p3 is found to be from about 1.01 to about 20 µm. With the width a3 of the metal thin plate 32 set in a range from 50 to 2000 µm, for making the wire grid device according to the third embodiment of this invention operate as a polarizer for a terahertz wave band in a frequency band from 2 to 4 THz, an allowable range of the interval d3 is found to be from about 1 to about 23 µm and an allowable range of the period p3 is found to be from about 1.01 to about 43 µm. With the width a3 of metal thin plate 32 set in a range from 50 to 2000 µm, the interval d3 set at about 10 µm works most effectively in a frequency band from 2 to 10 THz. In a frequency band from 2 to 4 THz, the interval d3 set in a range from about 10 to about 23 µm works most effectively.

An interval between metal thin plates as parallel flat plates forming the wire grid of the wire grid device according to the third embodiment of this invention is a parameter that determines the performance of the wire grid device. This interval is determined uniquely using the thickness of the film substrate. Specifically, even if being produced on a large scale, the wire grid device according to the third embodiment of this invention can still maintain this interval at a constant value stably, thereby increasing the yield of this wire grid device. Additionally, a frequency band to be applied can be changed by only changing the thickness of the film substrate. Further, the polymer film is described as a cycloolefin polymer film. However, this is not the only applicable film but any film is applicable as long as a film to be applied is made of a material of a low dielectric dissipation factor in a terahertz wave band. Instead of using a film, a film-like substance may be formed on a surface of the metal thin plate. As an example, the metal thin plates may be spaced at a given interval so as to face each other by applying or pasting an insulating substance such as resin on the surface of each metal thin plate to a given thickness.

REFERENCE SIGNS LIST

1 Wire grid device
2 Wire grid device
2a Grid plate stack
3 Wire grid device
3a Film substrate stack
10 Frame
11 Slit
12 Grid
13 Electric wall
14 Periodic boundary wall
20 Grid plate
20a Grid part
20b Cutout
20c Fixing part
20d Through hole
21 Spacer 21a Body part
21b Through hole
22 Upper base
22a Hole
23 Lower base
23a Screw part
24 Attachment screw
30 Film substrate
30a to 30f Film substrate
31 Polymer film
31a Holding part
31b Attachment part
31c Attachment part
32 Metal thin plate
30a, 32b Metal thin plate
33 First cutout
34 Second cutout
35 Third cutout
36 Rectangular cutout
37 Hole
40 Retainer plate
41 Flat plate part
42 First cutout
43 Second cutout
44 Third cutout
46 Through hole
50 Base
51 Bottom
52 First upright column
53 Second upright column
54 Third upright column
55 Screw hole
60 Attachment screw
101 Metal plate for wire grid
111 Vertical bridge part
112 Cross bridge part
113 Flange part

The invention claimed is:

1. A wire grid device for a terahertz wave band comprising a plurality of grid plates having grid parts of elongated rectangular metal thin plates, the grid plates being stacked in such a manner that the grid parts are spaced at a given interval and face each other, wherein
spacers are inserted between first ends and between opposite ends of adjacent ones of the grid plates to form a slit between the grid parts of the adjacent grid plates, thereby forming a grid plate stack, and
the grid parts of the grid plate stack form parallel flat plates, and wherein
with a width of each of the grid parts corresponding to the length of each of the parallel flat plates in a propagation direction set at about 50 µm, an interval between the grid parts is set in a range from about 10 to about 50 µm and a period of arrangement of each of the grid parts is set in a range from about 11 to about 50 µm, or
with the width of each of the grid parts set in a range from about 1000 to about 3000 µm, the interval is set in a range from about 10 to about 150 µm and the period is set in a range from about 11 to about 300 µm.

2. The wire grid device for a terahertz wave band according to claim 1, further comprising:
a lower base of a flat plate having a screw part formed in each of opposite sides of the lower base; and
an upper base of a flat plate having a hole formed in each of opposite sides of the upper base so as to correspond to a position where the screw part is formed, wherein
a through hole is formed in each of the first end and the opposite end of each of the grid plates so as to correspond to the position where the screw part is formed and a position where the hole is formed,
each of the spacers has a through hole, and
the wire grid device is assembled by placing the grid plate stack between the lower base and the upper base, passing attachment means penetrating the hole in the upper base through the through hole in each of the grid plates of the grid plate stack and through the through hole in each of the spacers of the grid plate stack in order to threadedly engage the attachment means with the screw part in the lower base.

3. A wire grid device for a terahertz wave band comprising a plurality of grid plates having grid parts of elongated rectangular metal thin plates, the grid plates being stacked in such a manner that the grid parts are spaced at a given interval and face each other, wherein
spacers are inserted between first ends and between opposite ends of adjacent ones of the grid plates to form a slit between the grid parts of the adjacent grid plates, thereby forming a grid plate stack, and
the grid parts of the grid plate stack form parallel flat plates, and wherein
with a width of each of the grid parts corresponding to the length of each of the parallel flat plates in a propagation direction set in a range from about 50 to about 3000 µm, for making the wire grid device operate as a polarizer for a terahertz wave band in a frequency band from 3 to 10 THz, an allowable range of an interval between the grid parts is from about 1 to about 10 µm and an allowable range of a period of arrangement of each of the grid parts is from about 2 to about 20 µm.

4. The wire grid device for a terahertz wave band according to claim 3, further comprising:
a lower base of a flat plate having a screw part formed in each of opposite sides of the lower base; and
an upper base of a flat plate having a hole formed in each of opposite sides of the upper base so as to correspond to a position where the screw part is formed, wherein
a through hole is formed in each of the first end and the opposite end of each of the grid plates so as to correspond to the position where the screw part is formed and a position where the hole is formed,
each of the spacers has a through hole, and
the wire grid device is assembled by placing the grid plate stack between the lower base and the upper base, passing attachment means penetrating the hole in the upper base through the through hole in each of the grid plates of the grid plate stack and through the through hole in each of the spacers of the grid plate stack in order to threadedly engage the attachment means with the screw part in the lower base.

5. A wire grid device for a terahertz wave band comprising a plurality of grid plates having grid parts of elongated rectangular metal thin plates, the grid plates being stacked in such a manner that the grid parts are spaced at a given interval and face each other, wherein
spacers are inserted between first ends and between opposite ends of adjacent ones of the grid plates to form a slit between the grid parts of the adjacent grid plates, thereby forming a grid plate stack, and
the grid parts of the grid plate stack form parallel flat plates, and wherein
with a width of each of the grid parts corresponding to the length of each of the parallel flat plates in a propagation direction set in a range from 50 to 3000 µm, for making the wire grid device operate as a polarizer for a terahertz wave band in a frequency band from 3 to 6 THz, an allowable range of an interval between the grid parts is from about 1 to about 23 μm and an allowable range of a period of arrangement of each of the grid parts is from about 2 to about 43 μm.

6. The wire grid device for a terahertz wave band according to claim 5, further comprising:
a lower base of a flat plate having a screw part formed in each of opposite sides of the lower base; and
an upper base of a flat plate having a hole formed in each of opposite sides of the upper base so as to correspond to a position where the screw part is formed, wherein
a through hole is formed in each of the first end and the opposite end of each of the grid plates so as to correspond to the position where the screw part is formed and a position where the hole is formed,
each of the spacers has a through hole, and
the wire grid device is assembled by placing the grid plate stack between the lower base and the upper base, passing attachment means penetrating the hole in the upper base through the through hole in each of the grid plates of the grid plate stack and through the through hole in each of the spacers of the grid plate stack in order to threadedly engage the attachment means with the screw part in the lower base.

7. A wire grid device for a terahertz wave band comprising parallel flat plates configured by stacking a plurality of film substrates formed of rectangular films each having an elongated rectangular metal thin plate formed on a substantially central portion of one surface of the film, wherein
with a width of the metal thin plate corresponding to a length in a propagation direction set at about 50 μm, an interval between the film substrates is set in a range from about 10 to about 50 μm and a period of stacking of each of the film substrates is set in a range from about 10.01 to about 100 μm, or
with the width of the metal thin plate set in a range from about 1000 to about 2000 μm, the interval between the film substrates is set in a range from about 10 to about 150 μm and the period of stacking of each of the film substrates is set in a range from about 10.01 to about 300 μm, and wherein
with the width of the metal thin plate corresponding to the length of each of the parallel flat plates in a propagation direction set in a range from about 50 to about 2000 μm, for making the wire grid device operate as a polarizer for a terahertz wave band in a frequency band from 2 to 10 THz, an allowable range of the interval is from about 1 to about 5 μm and an allowable range of the period is from about 1.01 to about 20 μm.

8. The wire grid device for a terahertz wave band according to claim 7, further comprising:
a base having a bottom of a flat plate and a plurality of upright columns extending vertically from the upper surface of the bottom;
a film substrate stack formed of the plurality of stacked film substrates each having cutouts formed in positions corresponding to the positions of the upright columns of the base; and
a retainer plate having a flat plate part of a flat plate and cutouts formed in positions of the flat plate part corresponding to the positions of the upright columns of the base,
wherein the film substrate stack is housed in the base while being aligned with the base using the plurality of upright columns, the retainer plate is placed on the film substrate stack, and a screw penetrating the retainer plate is threadedly engaged with the base.

9. A wire grid device for a terahertz wave band comprising parallel flat plates configured by stacking a plurality of film substrates formed of rectangular films each having an elongated rectangular metal thin plate formed on a substantially central portion of one surface of the film, wherein
with a width of the metal thin plate corresponding to a length in a propagation direction set at about 50 μm, an interval between the film substrates is set in a range from about 10 to about 50 μm and a period of stacking of each of the film substrates is set in a range from about 10.01 to about 100 μm, or
with the width of the metal thin plate set in a range from about 1000 to about 2000 μm, the interval between the film substrates is set in a range from about 10 to about 150 μm and the period of stacking of each of the film substrates is set in a range from about 10.01 to about 300 μm, and wherein
with the width of the metal thin plate corresponding to the length of each of the parallel flat plates in a propagation direction set in a range from about 50 to about 2000 μm, for making the wire grid device operate as a polarizer for a terahertz wave band in a frequency band from 2 to 4 THz, an allowable range of the interval is from about 1 to about 23 μm and an allowable range of the period is from about 1.01 to about 43 μm.

10. The wire grid device for a terahertz wave band according to claim 9, comprising:
a base having a bottom of a flat plate and a plurality of upright columns extending vertically from the upper surface of the bottom;
a film substrate stack formed of the plurality of stacked film substrates each having cutouts formed in positions corresponding to the positions of the upright columns of the base; and
a retainer plate having a flat plate part of a flat plate and cutouts formed in positions of the flat plate part corresponding to the positions of the upright columns of the base,
wherein the film substrate stack is housed in the base while being aligned with the base using the plurality of upright columns, the retainer plate is placed on the film substrate stack, and a screw penetrating the retainer plate is threadedly engaged with the base.

* * * * *